US012223915B2

(12) United States Patent
Kim et al.

(10) Patent No.: US 12,223,915 B2
(45) Date of Patent: Feb. 11, 2025

(54) PIXEL AND GATE DRIVING CIRCUIT

(71) Applicant: Samsung Display Co., LTD., Yongin-si (KR)

(72) Inventors: Minjoo Kim, Yongin-si (KR); Wonkyu Kwak, Yongin-si (KR); Minwoo Byun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/406,135

(22) Filed: Jan. 6, 2024

(65) Prior Publication Data

US 2024/0321212 A1 Sep. 26, 2024

(30) Foreign Application Priority Data

Mar. 23, 2023 (KR) ........................ 10-2023-0038264
May 2, 2023 (KR) ........................ 10-2023-0057226

(51) Int. Cl.
*G09G 3/3266* (2016.01)

(52) U.S. Cl.
CPC ... *G09G 3/3266* (2013.01); *G09G 2300/0417* (2013.01); *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 8,564,512 | B2 | 10/2013 | Chung | |
| 8,830,156 | B2 | 9/2014 | Kim et al. | |
| 8,913,090 | B2 | 12/2014 | Chung et al. | |
| 10,467,973 | B2 | 11/2019 | Ko et al. | |
| 10,997,925 | B2 | 5/2021 | Choi | |
| 2005/0057580 | A1 * | 3/2005 | Yamano ................. | G09G 3/325 345/690 |
| 2011/0102403 | A1 * | 5/2011 | Kim ..................... | G09G 3/3233 345/76 |
| 2014/0300399 | A1 * | 10/2014 | Miyake ............ | H03K 3/356026 327/296 |

(Continued)

FOREIGN PATENT DOCUMENTS

| | | | |
|---|---|---|---|
| KR | 100570995 | B1 | 4/2006 |
| KR | 1020110048751 | A | 5/2011 |

(Continued)

*Primary Examiner* — Parul H Gupta
(74) *Attorney, Agent, or Firm* — CANTOR COLBURN LLP

(57) ABSTRACT

A pixel includes: a light-emitting diode; a first transistor; a second transistor connected to a gate of the first transistor and to a data line; a third transistor connected to the gate of the first transistor and to a first voltage line; a fourth transistor connected to the first transistor and a second voltage line; a fifth transistor connected to the first transistor and to a third voltage line; and a sixth transistor connected to the first transistor and to the light-emitting diode, where a gate signal supplied to a gate of the sixth transistor is a signal obtained by shifting a gate signal supplied to a gate of the fifth transistor by a certain time.

20 Claims, 52 Drawing Sheets

(56) References Cited

U.S. PATENT DOCUMENTS

| | | | |
|---|---|---|---|
| 2014/0333600 | A1 | 11/2014 | Lee et al. |
| 2021/0027702 | A1 | 1/2021 | Park et al. |
| 2023/0027500 | A1 | 1/2023 | Kwon et al. |
| 2023/0066949 | A1 | 3/2023 | Jeong et al. |
| 2023/0073923 | A1 | 3/2023 | Heo et al. |
| 2023/0154406 | A1 | 5/2023 | Kim et al. |

FOREIGN PATENT DOCUMENTS

| | | | |
|---|---|---|---|
| KR | 101058115 | B1 | 8/2011 |
| KR | 101127582 | B1 | 3/2012 |
| KR | 1020140134045 | A | 11/2014 |
| KR | 20190012448 | A | 2/2019 |
| KR | 102024116 | B1 | 11/2019 |
| KR | 20200026474 | A | 3/2020 |
| KR | 20200129242 | A | 11/2020 |
| KR | 1020210011554 | A | 2/2021 |
| KR | 20210149976 | A | 12/2021 |
| KR | 102470761 | B1 | 11/2022 |
| KR | 1020230034469 | A | 3/2023 |
| KR | 1020230034822 | A | 3/2023 |

* cited by examiner

PIXEL AND GATE DRIVING CIRCUIT

This application claims priority to Korean Patent Application No. 10-2023-0038264, filed on Mar. 23, 2023, and Korean Patent Application No. 10-2023-0057226, filed on May 2, 2023, and all the benefits accruing therefrom under 35 U.S.C. § 119, the contents of which in their entirety are herein incorporated by reference.

BACKGROUND

1. Field

One or more embodiments relate to a pixel, a gate driving circuit configured to output a gate signal to a pixel, and a display device including a pixel and a gate driving circuit.

2. Description of the Related Art

A display device includes a pixel unit including a plurality of pixels, a gate driving circuit, and a data driving circuit. The gate driving circuit includes stages connected to gate lines, and the stages supply gate signals to the respective gate lines.

SUMMARY

One or more embodiments include a display device, in which a dead space is minimized and power consumption is reduced.

Additional aspects will be set forth in part in the description which follows and, in part, will be apparent from the description, or may be learned by practice of the presented embodiments of the disclosure.

According to one or more embodiments, a pixel includes: a light-emitting diode; a first transistor; a second transistor connected to a gate of the first transistor and to a data line; a third transistor connected to the gate of the first transistor and to a first voltage line; a fourth transistor connected to the first transistor and to a second voltage line; a fifth transistor connected to the first transistor and to a third voltage line; and a sixth transistor connected to the first transistor and to the light-emitting diode, where a gate signal supplied to a gate of the sixth transistor is a signal obtained by shifting a gate signal supplied to a gate of the fifth transistor by a certain time.

A gate signal supplied to a gate of the fourth transistor may be a signal obtained by shifting a gate signal supplied to a gate of the third transistor by a certain time.

The pixel may further include a seventh transistor connected to the first transistor and to the third voltage line, wherein a gate signal supplied to a gate of the third transistor and a gate signal supplied to a gate of the seventh transistor may be the same.

A gate signal supplied to a gate of the fourth transistor may be a signal obtained by shifting a gate signal supplied to a gate of the third transistor by a certain time.

A gate signal supplied to a gate of the fourth transistor may be a signal obtained by shifting a gate signal supplied to a gate of the second transistor by a certain time.

The pixel may further include an eighth transistor connected to the first transistor and to a fourth voltage line, wherein a gate signal supplied to a gate of the fourth transistor and a gate signal supplied to a gate of the eighth transistor may be the same.

According to one or more embodiments, a pixel includes: a light-emitting diode; a first transistor; a second transistor connected to a gate of the first transistor and to a data line; a third transistor connected to the gate of the first transistor and to a first voltage line; a fourth transistor connected to the first transistor and to a second voltage line; a fifth transistor connected to the first transistor and to a third voltage line; a sixth transistor connected to the first transistor and to the light-emitting diode; a seventh transistor connected to the first transistor and to the third voltage line; and an eighth transistor connected to the first transistor and to a fourth voltage line, where a gate signal supplied to a gate of the fifth transistor and a gate signal supplied to a gate of the sixth transistor are the same, and a gate signal supplied to a gate of the fourth transistor and a gate signal supplied to a gate of the eighth transistor are the same.

According to one or more embodiments, a gate driving circuit for outputting gate signals to a plurality of pixels connected to a first gate line, a second gate line, a third gate line, a fourth gate line, and a fifth gate line, the gate driving circuit includes a first driving circuit configured to output a first gate signal sequentially to the first gate line in a first row and to the first gate line in a second row immediately adjacent to the first row, a second driving circuit configured to output a fourth gate signal simultaneously to the fourth gate line in the first row and to the fourth gate line in the second row, and a third driving circuit configured to output a third gate signal simultaneously to the third gate line in the first row and to the third gate line in the second row, wherein the fourth gate signal output by the second driving circuit is supplied to the fifth gate line in a third row, the first gate signal output by the first driving circuit or the third gate signal output by the third driving circuit is supplied to the second gate line in a fourth row, and the third row and the fourth row are rows spaced apart from the first row by two or more rows.

The third row may be a row preceding the first row by two or more rows, the second driving circuit may include a plurality of second stages and a plurality of second dummy stages, and the plurality of second dummy stages may be located behind a last second stage from among the plurality of second stages.

When the first gate signal output by the first driving circuit is supplied to the second gate line in the fourth row, the fourth row may be a row succeeding the first row by two or more rows, the first driving circuit may include a plurality of first stages and a plurality of first dummy stages, and the plurality of first dummy stages may be located in front of the forefront first stage from among the plurality of first stages.

When the third gate signal output by the third driving circuit is supplied to the second gate line in the fourth row, the fourth row may be a row succeeding the first row by two or more rows, the third driving circuit may include a plurality of third stages and a plurality of third dummy stages, and the plurality of third dummy stages may be located in front of the forefront third stage from among the plurality of third stages.

The gate driving circuit may further include a first gate driving circuit and a second gate driving circuit, which face each other with a pixel unit, in which the plurality of pixels are arranged, therebetween, wherein the first gate driving circuit and the second gate driving circuit may each include the first driving circuit, the second driving circuit, and the third driving circuit.

Thin-film transistors included in the gate driving circuit may be formed simultaneously with thin-film transistors of a pixel circuit configured to drive the plurality of pixels, through the same process.

Thin-film transistors included in the gate driving circuit may be N-channel oxide thin-film transistors.

According to one or more embodiments, a gate driving circuit for outputting gate signals to a plurality of pixels connected to a first gate line, a second gate line, a third gate line, a fourth gate line, and a fifth gate line, the gate driving circuit includes: a first driving circuit configured to output a first gate signal sequentially to the first gate line in a first row and to the first gate line in a second row immediately adjacent to the first row; a second driving circuit configured to output a fourth gate signal simultaneously to the fourth gate line in the first row and to the fourth gate line in the second row; a third driving circuit configured to output a third gate signal simultaneously to the third gate line in the first row and to the third gate line in the second row; and a fourth driving circuit configured to output the second gate signal simultaneously to the second gate line in the first row and to the second gate line in the second row, where the fourth gate signal output by the second driving circuit is supplied to the fifth gate line in the first row or the fifth gate line in a third row.

When the fourth gate signal output by the second driving circuit is supplied to the fifth gate line in the third row, the third row may be a row preceding the first row by two or more rows, the second driving circuit may include a plurality of stages and a plurality of dummy stages, and the plurality of dummy stages may be located behind a last stage from among the plurality of stages.

When the fourth gate signal output by the second driving circuit is supplied to the fifth gate line in the first row, the fourth gate signal may be simultaneously supplied to the fifth gate line in the second row.

The gate driving circuit may further include a first gate driving circuit and a second gate driving circuit, which face each other with a pixel unit, in which the plurality of pixels are arranged, therebetween, the first gate driving circuit may include the first driving circuit, the second driving circuit, and the third driving circuit, and the second gate driving circuit may include the first driving circuit, the third driving circuit, and the fourth driving circuit.

Thin-film transistors included in the gate driving circuit may be formed simultaneously with thin-film transistors of a pixel circuit configured to drive the plurality of pixels, through the same process.

Thin-film transistors included in the gate driving circuit may be N-channel oxide thin-film transistors.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
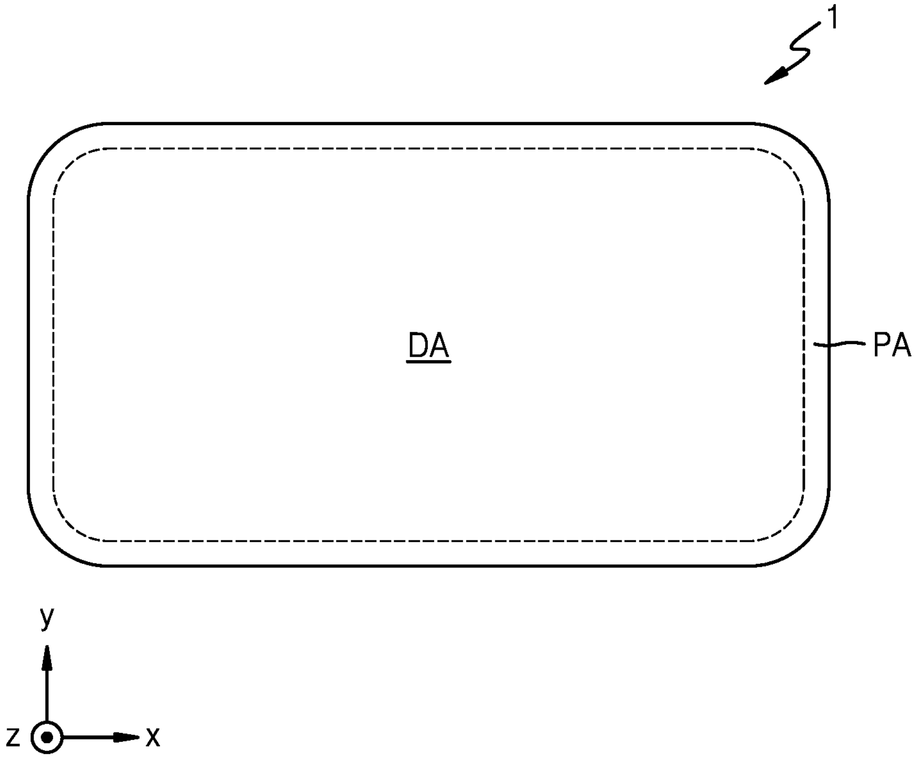
FIGS. 1A and 1B are views schematically showing a display device according to embodiments.

The disclosure may have various modifications and various embodiments, and specific embodiments are illustrated in the drawings and are described in detail in the detailed description. Effects and features of the disclosure and methods of achieving the same will become apparent with reference to embodiments described in detail with reference to the drawings. However, the disclosure is not limited to the embodiments described below, and may be implemented in various forms.

In the following embodiments, the terms "first", "second", etc. are not used in a limited sense and are used to distinguish one element from another element.

In the following embodiments, an expression used in the singular encompasses the expression of the plural, unless it has a clearly different meaning in the context.

In the following embodiments, it will be further understood that the terms "comprise" and/or "comprising" used herein specify the presence of stated features or elements, but do not preclude the presence or addition of one or more other features or elements.

It will be understood that when a layer, region, or element is referred to as being "formed on" another layer, area, or element, it can be directly or indirectly formed on the other layer, region, or element. That is, for example, intervening layers, regions, or elements may be present.

In the drawings, for convenience of description, sizes of elements may be exaggerated or reduced. In other words, because sizes and thicknesses of elements in the drawings are arbitrarily illustrated for convenience of explanation, the disclosure is not necessarily limited thereto.

As used herein, the term "and/or" includes any and all combinations of one or more of the associated listed items. Throughout the disclosure, the expression "at least one of a, b, and c" indicates only a, only b, only c, both a and b, both a and c, both b and c, all of a, b, and c, or variations thereof.

According to embodiments, a case where X and Y are connected to each other may include a case where X and Y are electrically connected to each other, a case where X and Y are functionally connected to each other, and a case where X and Y are physically connected to each other, with or without intervening elements (for example, direct or indirect connection). Here, X and Y may be objects (for example, apparatuses, devices, circuits, wires, electrodes, terminals, conductive layers, or layers). Accordingly, such a connection is not limited to a certain connection relationship, for example, a connection relationship indicated in drawings or detailed description, and may include connection relationships other than that indicated in the drawings or detailed description.

A case where X and Y are electrically connected to each other may include, for example, a case where X and Y are directly connected to each other, and a case where at least one device (for example, a switch, a transistor, a capacitor, an inductor, a resistor, or a diode) enabling an electric connection between X and Y is connected between X and Y.

According to embodiments, the term "on" used in association with a device state may refer to an activated state of a device, and the term "off" may refer to a deactivated state of the device. The term "on" used in association with a signal received by a device may refer to a signal activating the device, and the term "off" may refer to a signal deactivating the device. A device may be activated by a voltage of a high level or a low level. For example, a P-channel transistor (P-type transistor) may be activated by a low-level voltage, and an N-channel transistor (N-type transistor) may be activated by a high-level voltage. Accordingly, it should be understood that "on" voltages for the P-type transistor and the N-type transistor are opposite voltage levels (low versus high).

According to embodiments, an x direction, a y direction, and a z direction are not limited to directions in three axes on an orthogonal coordinate system, but may be interpreted in a broad sense including the three axes. For example, the x direction, the y direction, and the z direction may be perpendicular to one another, or may represent different directions that are not perpendicular to one another.

A display device according to embodiments of the disclosure is an apparatus for displaying a moving image or a still image, and may be used as a display screen of not only portable electronic devices, such as a mobile phone, a smart phone, a tablet personal computer ("PC"), a mobile communication terminal, an electronic notebook, an electronic book, a portable multimedia player ("PMP"), a navigation device, and an ultra-mobile PC ("UMPC"), but also various products, such as a television, a laptop computer, a monitor, a billboard, and Internet of things ("IoT"). Also, a display device according to an embodiment may be used for a wearable device, such as a smart watch, a watch phone, a glasses-type display, or a head mounted display ("HMD"). In addition, a display device according to an embodiment may be used as a panel of a vehicle, a center information display ("CID") arranged on a center fascia or dashboard of a vehicle, a room mirror display replacing a side mirror of a vehicle, or a display arranged on a rear surface of a front seat, as entertainment for a back seat of a vehicle. Also, a display device may be a flexible device.

Figure 1B:
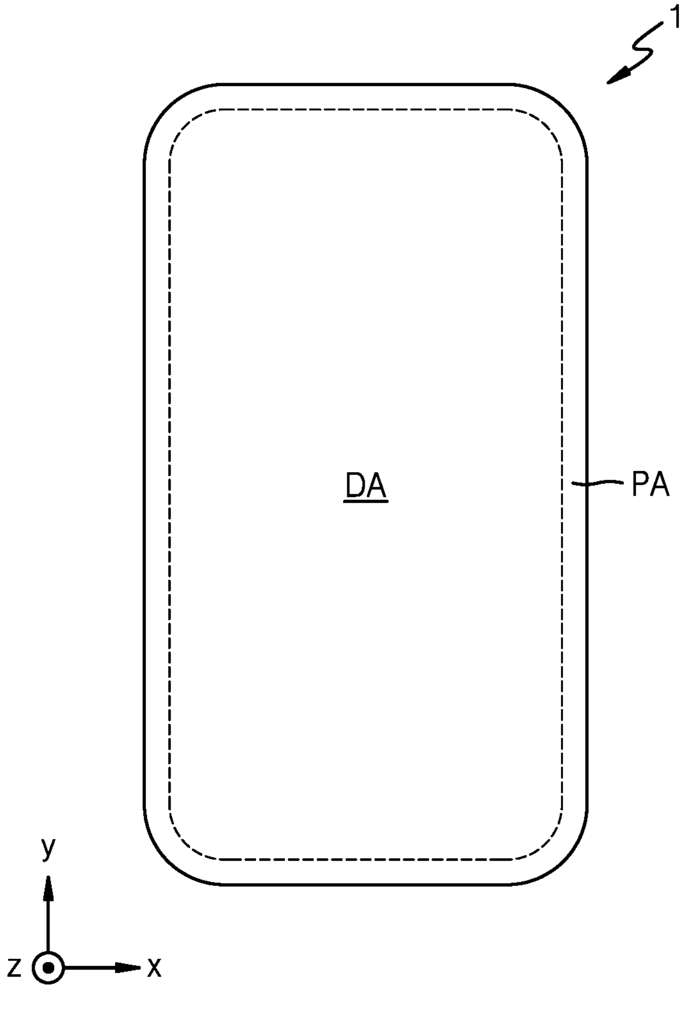
Figure 2:
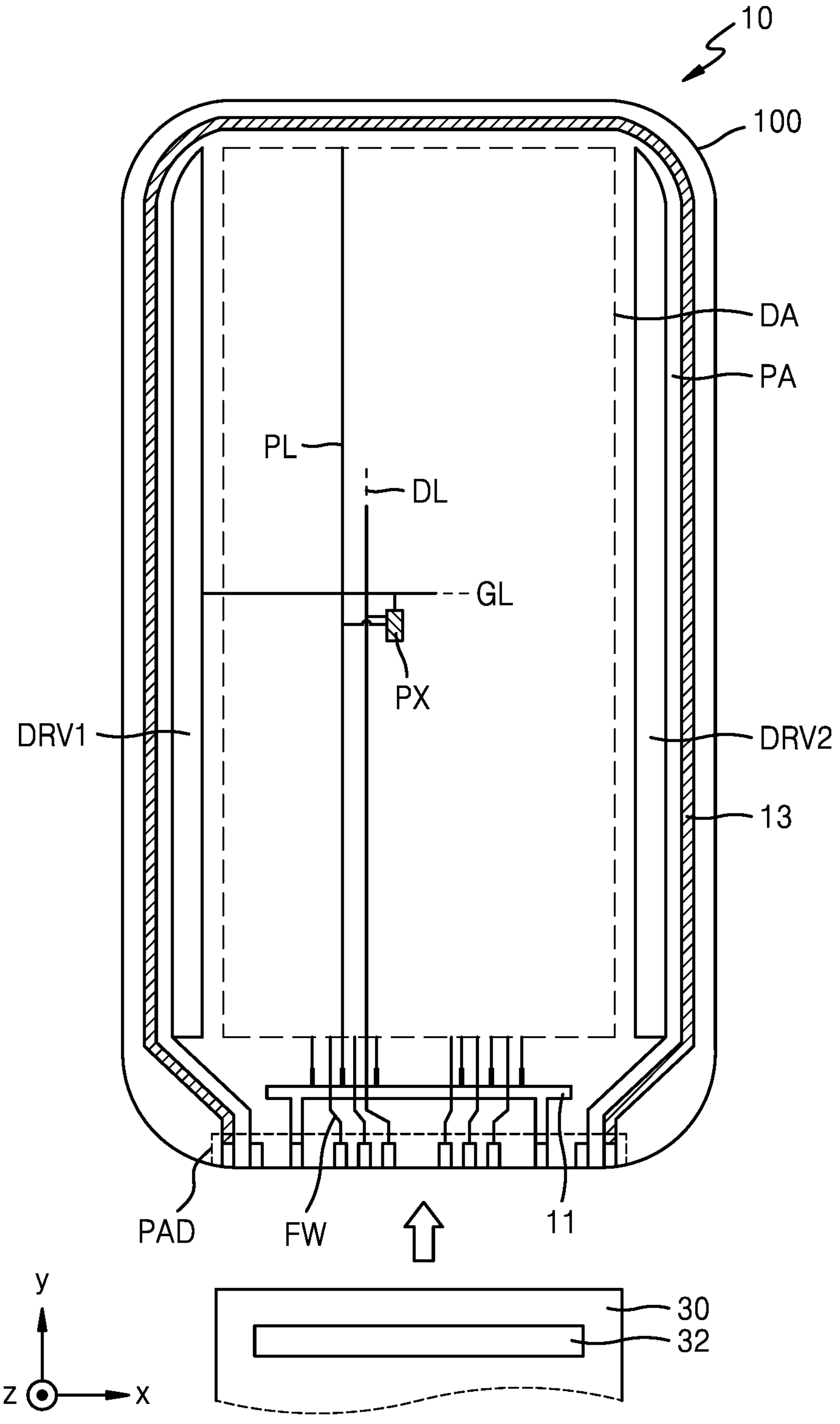
FIG. 2 is a diagram schematically showing a display device according to an embodiment.

FIGS. 1A and 1B are views schematically showing a display device 1 according to embodiments. FIG. 2 is a diagram schematically showing the display device 1 according to an embodiment.

Referring to FIGS. 1A and 1B, the display device 1 may include a display area DA where an image is displayed, and a peripheral area PA outside the display area DA. The display area DA may be entirely surrounded by the peripheral area PA.

When the display area DA is viewed in a plane, the display area DA may have a rectangular shape. According to another embodiment, the display area DA may have a polygonal shape, such as a triangle, a pentagon, or a hexagon, or may have a circular shape, an oval shape, or an atypical shape. The display area DA may have a round shape at a corner of an edge. According to an embodiment, the display device 1 may include the display area DA in which a length in an x direction is longer than a length in a y direction, as shown in FIG. 1A. According to another embodiment, the display device 1 may include the display area DA in which the length in the y direction is longer than the length in the x direction, as shown in FIG. 1B.

The display device 1 may include a display panel 10, and a cover window (not shown) protecting the display panel 10 may be further disposed on the display panel 10.

Various elements included in the display panel 10 may be arranged on a substrate 100. The substrate 100 may include the display area DA and the peripheral area PA surrounding the display area DA.

A plurality of pixels PX may be arranged in the display area DA. A plurality of gate lines GL, a plurality of data lines DL, and the plurality of pixels PX connected thereto may be arranged in the display area DA. The plurality of pixels PX may realize an image by being arranged in various forms, such as a stripe arrangement, a pentile arrangement, a diamond arrangement, and a mosaic arrangement. Each pixel PX may include an organic light-emitting diode OLED as a display element (light-emitting device), and the organic light-emitting diode OLED may be connected to a pixel circuit. The pixel circuit may include a plurality of transistors and at least one capacitor. The pixel PX may be configured to emit, for example, red, green, blue, or white light through the organic light-emitting diode OLED. Each pixel PX may be connected to a corresponding gate line GL from among the plurality of gate lines GL, and a corresponding data line DL from among the plurality of data lines DL.

The gate lines GL may each extend in the x direction (a row direction) and be connected to the pixels PX located in the same row. The gate lines GL may each be configured to transmit a gate signal to the pixels PX in the same row. The data lines DL may each extend in the y direction (a column direction) and be connected to the pixels PX located in the same column. The data lines DL may each be configured to transmit a data signal to each of the pixels PX in the same column, in synchronization with the gate signal. Each pixel PX may be connected to a driving voltage line PL to receive a driving voltage ELVDD. The driving voltage lines PL may each extend in the y direction (column direction) to be connected to the pixels PX located in the same column.

In FIG. 2, the pixel PX is connected to one gate line GL, but an embodiment of the disclosure is not limited thereto. The pixel PX may be connected to one or more gate lines GL in another embodiment.

Each of the pixel circuits configured to drive the pixels PX may be connected (e.g., electrically connected) to outer circuits arranged in the peripheral area PA. A first gate driving circuit DRV1, a second gate driving circuit DRV2, a terminal portion PAD, a driving voltage supply line 11, and a common voltage supply line 13 may be arranged in the peripheral area PA.

According to an embodiment, the peripheral area PA may be a non-display area where the pixels PX are not arranged. According to another embodiment, a portion of the peripheral area PA may be embodied as the display area DA. For example, the plurality of pixels PX may be arranged by overlapping the outer circuit, in at least one corner of the peripheral area PA. Accordingly, a dead area may be reduced and the display area DA may be expanded.

The first gate driving circuit DRV1 may be connected to the plurality of gate lines GL and configured to apply a gate signal to each of the pixel circuits configured to drive the pixels PX, through the gate lines GL. The second gate driving circuit DRV2 may be located on an opposite side of the first gate driving circuit DRV1, with respect to the display area DA, and may be approximately parallel to the first gate driving circuit DRV1. According to an embodiment, the pixel circuits of the pixels PX of the display area DA may be connected (e.g., electrically connected) to the first gate driving circuit DRV1 and the second gate driving circuit DRV2. According to another embodiment, some of the pixel circuits of the pixels PX of the display area DA may be connected (e.g., electrically connected) to the first gate driving circuit DRV1, and the remaining pixel circuits may be electrically connected to the second gate driving circuit DRV2. The second gate driving circuit DRV2 may be omitted.

The terminal portion PAD may be arranged at one side of the substrate 100. The terminal portion PAD may not be covered by an insulating layer, but may be exposed and connected to a display circuit board 30. A display driving unit 32 may be arranged in the display circuit board 30.

The display driving unit 32 includes a data driving circuit, wherein the data driving circuit may be connected to the plurality of data lines DL and configured to generate the data signal, and the generated data signal may be transmitted to the pixel circuits of the pixels PX through fanout lines FW and the data lines DL connected to the fanout lines FW.

The display driving unit 32 includes a power supply circuit, wherein the power supply circuit may be configured to supply the driving voltage ELVDD to the driving voltage supply line 11 and supply a common voltage ELVSS to the common voltage supply line 13. The driving voltage ELVDD may be applied to the pixel circuits of the pixels PX through the driving voltage line PL connected to the driving voltage supply line 11, and the common voltage ELVSS may be applied to an opposing electrode of the display element through the common voltage supply line 13.

The display driving unit 32 includes a controller, wherein the controller may be configured to generate a control signal transmitted to the first gate driving circuit DRV1, the second gate driving circuit DRV2, the data driving circuit, and the power supply circuit.

The driving voltage supply line 11 may be connected to the terminal portion PAD and may extend in the x direction from below the display area DA. The common voltage supply line 13 may be connected to the terminal portion PAD and may partially surround the display area DA by having a loop shape in which one side is opened.

A portion or all of the first gate driving circuit DRV1 and second gate driving circuit DRV2 may be directly formed in the peripheral area PA of the substrate 100 during a process of configuring the pixel circuit in the display area DA of the substrate 100. The display driving unit 32 may be formed in the form of an integrated circuit chip and disposed on the display circuit board 30 that is connected (e.g., electrically connected) to the terminal portion PAD arranged on one side of the substrate 100. The display circuit board 30 may be a flexible printed circuit board ("FPCB"). According to another embodiment, the display driving unit 32 may be directly disposed on the substrate 100 in a chip-on-glass ("COG") or chip-on-plastic ("COP") manner.

According to an embodiment, the plurality of transistors included in the pixel circuits of the display area DA, and a plurality of transistors included in the outer circuits, for example, the first gate driving circuit DRV1 and the second gate driving circuit DRV2, of the peripheral area PA may be N-type oxide thin-film transistors. The plurality of transistors included in the outer circuits of the peripheral area PA and the plurality of transistors included in the pixel circuits of the display area DA may be simultaneously formed through the same process. According to another embodiment, the plurality of transistors included in the pixel circuits of the display area DA may be N-type oxide thin-film transistors, and the plurality of transistors included in the outer circuits of the peripheral area PA may be a P-type silicon thin-film transistors.

A semiconductor layer of an oxide thin-film transistor may include an oxide. An oxide semiconductor may include, as a Zn oxide-based material, a Zn oxide, an In—Zn oxide, or a Ga—In—Zn oxide. According to some embodiments, the oxide semiconductor may be an In—Ga—Zn—O ("IGZO") semiconductor, in which metals, such as indium (In) and gallium (Ga), are contained in ZnO. According to an embodiment, the oxide thin-film transistor may be a low temperature polycrystalline oxide ("LTPO") thin-film transistor. A silicon thin-film transistor may be a low temperature poly-silicon ("LTPS") thin-film transistor, in which a semiconductor layer includes amorphous silicon or polysilicon).

Figure 3:
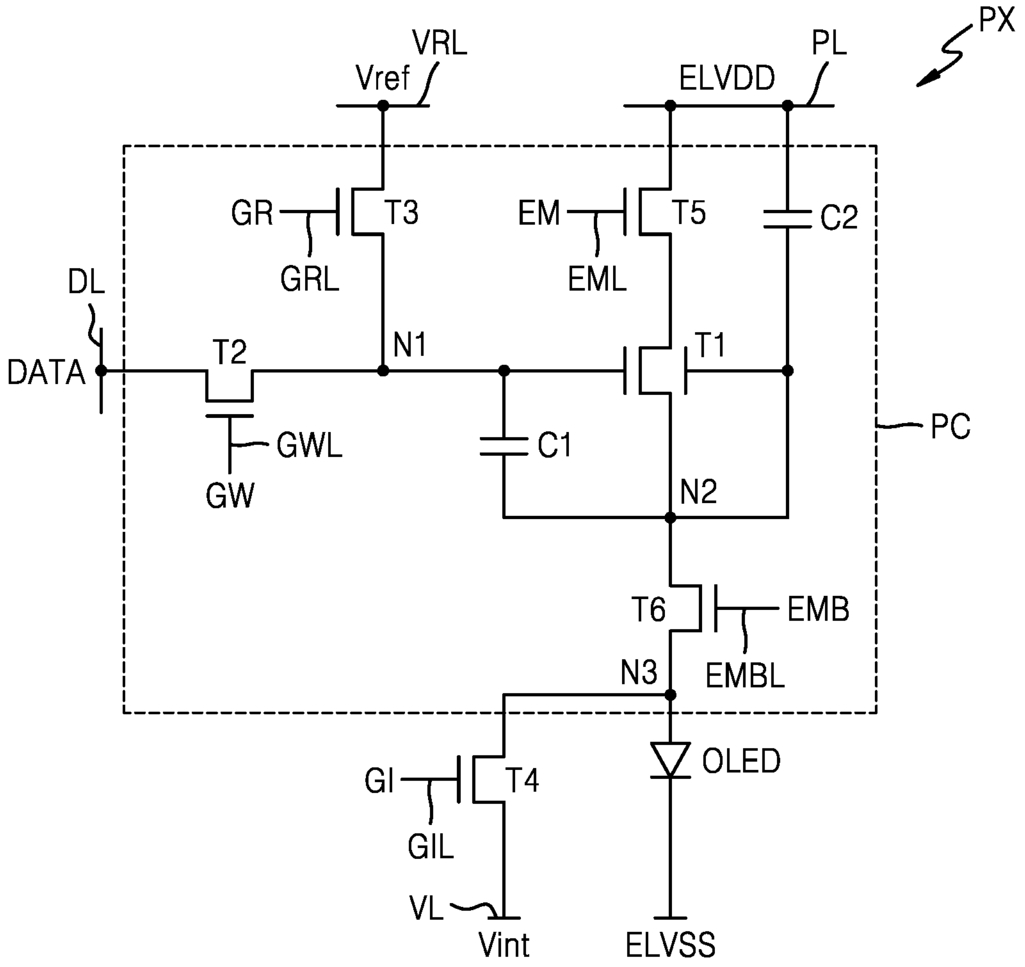
FIG. 3 is an equivalent circuit diagram of a pixel according to an embodiment.
Figure 4:
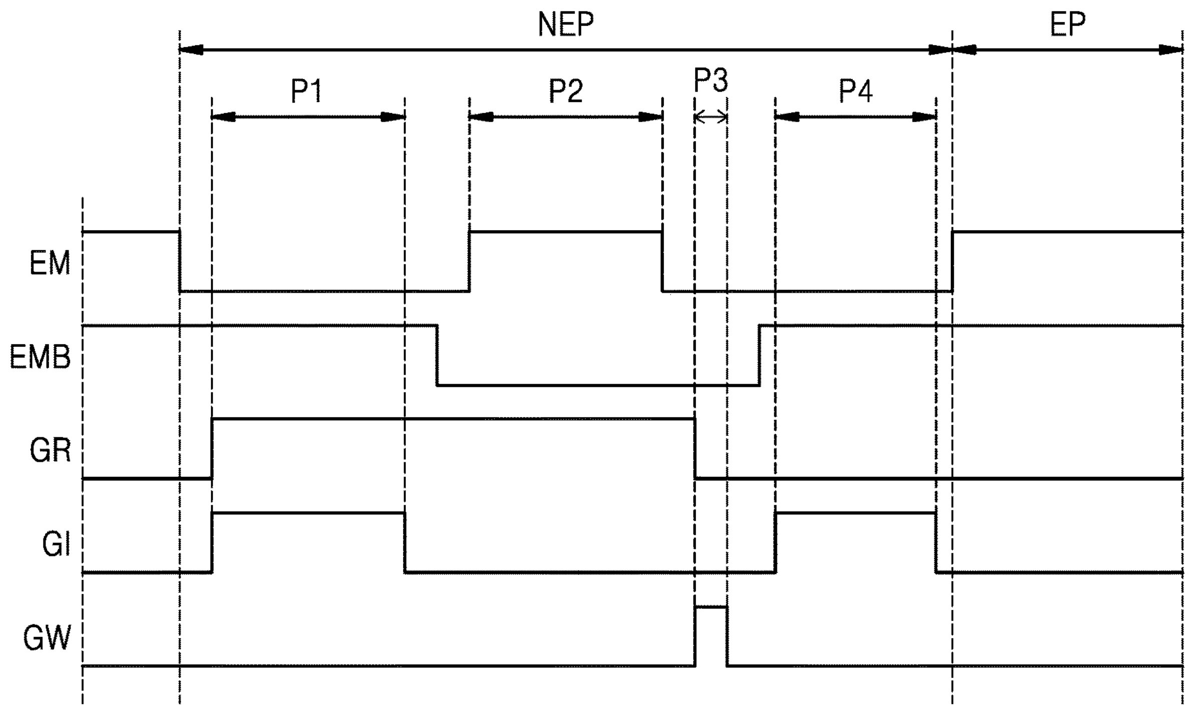
FIG. 4 is a diagram showing signals for describing an operation of the pixel of FIG. 3.

FIG. 3 is an equivalent circuit diagram of the pixel PX according to an embodiment. FIG. 4 is a diagram showing signals for describing an operation of the pixel PX of FIG. 3.

Referring to FIG. 3, the pixel PX may include a pixel circuit PC and the organic light-emitting diode OLED, as a display element, connected to the pixel circuit PC.

The pixel PX may be connected to a first gate line GWL configured to transmit a first gate signal GW, a second gate line GIL configured to transmit a second gate signal GI, a third gate line GRL configured to transmit a third gate signal GR, a fourth gate line EML configured to transmit a fourth gate signal EM, a fifth gate line EMBL configured to transmit a fifth gate signal EMB, and the data line DL configured to transmit a data signal. Light emission of the pixel PX is controlled by the fourth gate signal EM and the fifth gate signal EMB, and thus the fourth gate signal EM and the fifth gate signal EMB may be referred to as emission control signals, and the fourth gate line EML and the fifth gate line EMBL may be referred to as emission control lines. Also, the pixel PX may be connected to the driving voltage line PL configured to transmit the driving voltage ELVDD, a reference voltage line VRL configured to transmit a reference voltage Vref, and an initialization voltage line VL configured to transmit an initialization voltage Vint.

According to an embodiment, the plurality of transistors included in the pixel circuit PC may be an N-type oxide thin-film transistor. An oxide thin-film transistor may be an LTPO thin-film transistor, in which a semiconductor layer includes an oxide. However, this is only an example, and the N-type transistors are not limited thereto. For another example, the semiconductor layer included in the N-type transistor may include an inorganic semiconductor (for example, amorphous silicon or polysilicon) or an organic semiconductor.

The pixel circuit PC may include first to sixth transistors T1 to T6, and first and second capacitors C1 and C2. The first transistor T1 may be a driving transistor configured to output a driving current corresponding to the data signal, and the second to sixth transistors T2 to T6 may be switching transistors configured to transmit signals. A first terminal (first electrode) and a second terminal (second electrode) of each of the first to sixth transistors T1 to T6 may be a source or a drain, according to voltages of the first terminal and the second terminal. For example, according to the voltages of the first terminal and the second terminal, the first terminal may be a drain and the second terminal may be a source, or the first terminal may be a source and the second terminal may be a drain. A node to which a first gate of the first transistor T1 is connected may be defined as a first node N1, and a node to which the second terminal of the first transistor T1 is connected may be defined as a second node N2.

The first transistor T1 may be connected between the driving voltage line PL and the second node N2. The first transistor T1 may include a gate, the first terminal, and the second terminal connected to the second node N2. The first transistor T1 may include the first gate connected to the first node N1. The first transistor T1 may further include a second gate connected to its second terminal. The first gate and the second gate may be arranged on different layers while facing each other. For example, the first gate and second gate of the first transistor T1 may face each other with a semiconductor layer therebetween.

The first gate of the first transistor T1 may be connected to the second terminal of the second transistor T2, the first terminal of the third transistor T3, and the first capacitor C1. The second gate of the first transistor T1 may be connected to the first terminal of the sixth transistor T6, the first capacitor C1, and the second capacitor C2. The first terminal of the first transistor T1 may be connected to the driving voltage line PL via the fifth transistor T5, and the second terminal thereof may be connected to the organic light-emitting diode OLED via the sixth transistor T6. The first terminal of the first transistor T1 may be connected to the second terminal of the fifth transistor T5. The second terminal of the first transistor T1 may be connected to the first terminal of the sixth transistor T6, the first capacitor C1, and the second capacitor C2. The first transistor T1 may be configured to control a current amount of the driving current flowing through the organic light-emitting diode OLED by receiving a data signal DATA according to a switching operation of the second transistor T2.

The second transistor T2 (a write transistor) may be connected between the data line DL and the first gate of the first transistor T1. The second transistor T2 may include a gate connected to the first gate line GWL, the first terminal connected to the data line DL, and the second terminal connected to the first node N1. The second terminal of the second transistor T2 may be connected to the first gate of the first transistor T1, the first terminal of the third transistor T3, and the first capacitor C1. The second transistor T2 is turned on by the first gate signal GW transmitted to the first gate line GWL to connect (e.g., electrically connect) the data line DL and the first node N1 to each other, and may be configured to transmit the data signal DATA transmitted to the data line DL to the first node N1.

The third transistor T3 (a first initialization transistor) may be connected between the first gate of the first transistor T1 and the reference voltage line VRL (In other words, the reference voltage line VRL may be referred to as a "first voltage line".). The third transistor T3 may include a gate connected to the third gate line GRL, the first terminal connected to the first node N1, and the second terminal connected to the reference voltage line VRL. The first terminal of the third transistor T3 may be connected to the first gate of the first transistor T1, the second terminal of the second transistor T2, and the first capacitor C1. The third transistor T3 may be turned on by the third gate signal GR transmitted to the third gate line GRL to transmit the reference voltage Vref transmitted to the reference voltage line VRL to the first node N1.

The fourth transistor T4 (a second initialization transistor or a reset transistor) may be connected between the sixth transistor T6 and the initialization voltage line VL (In other words, the initialization voltage line VL may be referred to as a "second voltage line".). The fourth transistor T4 may be connected between the organic light-emitting diode OLED and the initialization voltage line VL. The fourth transistor T4 may include a gate connected to the second gate line GIL, the first terminal connected to a third node N3, and the second terminal connected to the initialization voltage line VL. The first terminal of the fourth transistor T4 may be connected to the second terminal of the sixth transistor T6 and the organic light-emitting diode OLED. The fourth transistor T4 may be turned on by the second gate signal GI transmitted to the second gate line GIL to transmit the initialization voltage Vint transmitted to the initialization voltage line VL to the third node N3.

The fifth transistor T5 (a first emission control transistor) may be connected between the driving voltage line PL (In other words, the driving voltage line PL may be referred to as a "third voltage line".) and the first transistor T1. The fifth transistor T5 may include a gate connected to the fourth gate line EML, a first terminal connected to the driving voltage line PL, and a second terminal connected to the first terminal of the first transistor T1. The fifth transistor T5 may be turned on or off according to the fourth gate signal EM transmitted to the fourth gate line EML.

The sixth transistor T6 (a second emission control transistor) may be connected between the first transistor T1 and the organic light-emitting diode OLED. The sixth transistor T6 may be connected between the second node N2 and the third node N3. The sixth transistor T6 may include a gate connected to the fifth gate line EMBL, the first terminal connected to the second node N2, and the second terminal connected to the third node N3. The first terminal of the sixth transistor T6 may be connected to the second terminal of the first transistor T1, the first capacitor C1, and the second capacitor C2. The second terminal of the sixth transistor T6 may be connected to the first terminal of the fourth transistor T4 and a pixel electrode of the organic light-emitting diode OLED. The sixth transistor T6 may be turned on or off according to the fifth gate signal EMB transmitted to the fifth gate line EMBL.

The first capacitor C1 may be connected between the first gate of the first transistor T1 and the second terminal of the first transistor T1. A first electrode of the first capacitor C1 may be connected to the first node N1 and a second electrode thereof may be connected to the second node N2. The first electrode of the first capacitor C1 may be connected to the first gate of the first transistor T1, the second terminal of the second transistor T2, and the first terminal of the third transistor T3. The second electrode of the first capacitor C1 may be connected to the second terminal and second gate of the first transistor T1, the second electrode of the second capacitor C2, and the first terminal of the sixth transistor T6. The first capacitor C1 may be configured to store a voltage corresponding to the data signal DATA and a threshold voltage of the first transistor T1, as a storage capacitor.

The second capacitor C2 may be connected between the driving voltage line PL and the second node N2. A first electrode of the second capacitor C2 may be connected to the driving voltage line PL. A second electrode of the second capacitor C2 may be connected to the second terminal and second gate of the first transistor T1, the second electrode of the first capacitor C1, and the first terminal of the sixth transistor T6. Capacitance of the first capacitor C1 may be greater than capacitance of the second capacitor C2.

The organic light-emitting diode OLED may be connected to the first transistor T1 through the sixth transistor T6. The organic light-emitting diode OLED may include the pixel electrode (anode) connected to the third node N3 and the opposing electrode (cathode) facing the pixel electrode, and the opposing electrode may receive the common voltage ELVSS. The opposing electrode may be a common electrode for the plurality of pixels PX.

The pixel PX may display an image in units of frames. Referring to FIG. 4, one frame may include a non-emitting period NEP during which the pixel PX does not emit light, and an emitting period EP during which the pixel PX emits light. The non-emitting period NEP may include a first period P1, a second period P2, a third period P3, and a fourth period P4.

Each of the first gate signal GW, the second gate signal GI, the third gate signal GR, the fourth gate signal EM, and the fifth gate signal EMB may have a high-level voltage (first level voltage) for some periods and a low-level voltage (second level voltage) for some periods. Here, a high-level voltage may be a gate-on voltage for turning a transistor on, and a low-level voltage may be a gate-off voltage for turning a transistor off.

The first period P1 may be a first initialization period where the first node N1 connected to the first gate of the first transistor T1 and the third node N3 connected to the pixel electrode of the organic light-emitting diode OLED are initialized. During the first period P1, the second gate signal GI of a gate-on voltage may be supplied (applied) to the second gate line GIL, the third gate signal GR of a gate-on voltage may be supplied to the third gate line GRL, and the fifth gate signal EMB of a gate-on voltage may be supplied to the fifth gate line EMBL. During the first period P1, the first gate signal GW and the fourth gate signal EM may be supplied in gate-off voltages.

The sixth transistor T6 may be turned on by the fifth gate signal EMB, the fourth transistor T4 may be turned on by the second gate signal GI, and the third transistor T3 may be turned on by the third gate signal GR. The first gate of the first transistor T1, i.e., the first node N1, may be initialized to the reference voltage Vref by the turned-on third transistor T3. The second terminal of the first transistor T1 and the pixel electrode of the organic light-emitting diode OLED may be initialized to the initialization voltage Vint by the turned-on sixth transistor T6 and turned-on fourth transistor T4. The pixel electrode of the organic light-emitting diode OLED is reset to the initialization voltage Vint during the first period P1, and thus the first period P1 may be referred to as a reset period.

The second period P2 may be a compensation period where the threshold voltage of the first transistor T1 is compensated for. During the second period P2, the third gate signal GR of a gate-on voltage may be supplied to the third gate line GRL, and the fourth gate signal EM of a gate-on voltage may be supplied to the fourth gate line EML. The first gate signal GW, the second gate signal GI, and the fifth gate signal EMB may be supplied in gate-off voltages.

The third transistor T3 may be turned on by the third gate signal GR, and the fifth transistor T5 may be turned on by the fourth gate signal EM. Accordingly, the first transistor T1 may be turned on as the reference voltage Vref is supplied to the first node N1 and the driving voltage ELVDD is supplied to the first terminal of the first transistor T1. The first transistor T1 may be turned off when a voltage of the second terminal of the first transistor T1 reaches a difference (Vref-Vth) between the reference voltage Vref and a threshold voltage Vth of the first transistor T1. The threshold voltage Vth of the first transistor T1 may be compensated for, as a voltage corresponding to the threshold voltage Vth of the first transistor T1 is stored in the first capacitor C1.

The third period P3 may be a write period where a data signal is supplied to the pixel PX. During the third period P3, the first gate signal GW of a gate-on voltage may be supplied to the first gate line GWL. The second gate signal GI, the third gate signal GR, the fourth gate signal EM, and the fifth gate signal EMB may be supplied in gate-off voltages.

The second transistor T2 may be turned on by the first gate signal GW, and the turned-on second transistor T2 may be configured to transmit the data signal DATA from the data line DL to the first node N1, i.e., the first gate of the first transistor T1. Accordingly, a voltage of the first node N1 may be changed from the reference voltage Vref to a voltage corresponding to the data signal DATA. Here, a voltage of the second node N2 may also change in response to a voltage change amount of the first node N1. A voltage of the second node N2 may be a voltage $(Vref-Vth+\alpha\times(DATA-Vref))$ changed according to a capacity ratio ($\alpha$=C1/(C1+C2)) of the first capacitor C1 and the second capacitor C2. Accordingly, the threshold voltage Vth of the first transistor T1 and the voltage corresponding to the data signal DATA may be charged in the first capacitor C1.

The fourth period P4 may be a second initialization period where the second node N2 connected to the second terminal of the first transistor T1 and the third node N3 connected to the pixel electrode of the organic light-emitting diode OLED are initialized before the emitting period EP after data write. The second gate signal GI of a gate-on voltage may be supplied to the second gate line GIL, and the fifth gate signal EMB of a gate-on voltage may be supplied to the fifth gate line EMBL. Also, the first gate signal GW, the third gate signal GR, and the fourth gate signal EM may be supplied in gate-off voltages.

The fourth transistor T4 may be turned on by the second gate signal GI, and the sixth transistor T6 may be turned on by the fifth gate signal EMB. The initialization voltage Vint may be transmitted to the pixel electrode of the organic light-emitting diode OLED by the turned-on fourth transistor T4, and the second node N2 and the third node N3 may share an electric charge by the turned-on sixth transistor T6.

The emitting period EP may be a period during which the organic light-emitting diode OLED emits light. During the emitting period EP, the fourth gate signal EM of a gate-on voltage may be supplied to the fourth gate line EML and the fifth gate signal EMB of a gate-on voltage may be supplied to the fifth gate line EMBL. The first gate signal GW, the second gate signal GI, and the third gate signal GR may be supplied in gate-off voltages.

The fifth transistor T5 may be turned on by the fourth gate signal EM, and the driving voltage ELVDD may be supplied to the first terminal of the first transistor T1 by the turned-on fifth transistor T5. The first transistor T1 may output a voltage corresponding to the data signal DATA, which was stored in the first capacitor C1, i.e., a driving current ($Id(Vgs\text{-}Vth)^2$) having magnitude corresponding to a voltage (Vgs-Vth) obtained by subtracting the threshold voltage Vth of the first transistor T1 from a gate-source voltage Vgs of the first transistor T1, the driving current may flow through the organic light-emitting diode OLED through the sixth transistor T6 turned on by the fifth gate signal EMB, and the organic light-emitting diode OLED may emit light of luminance corresponding to the magnitude of the driving current.

Figure 5:
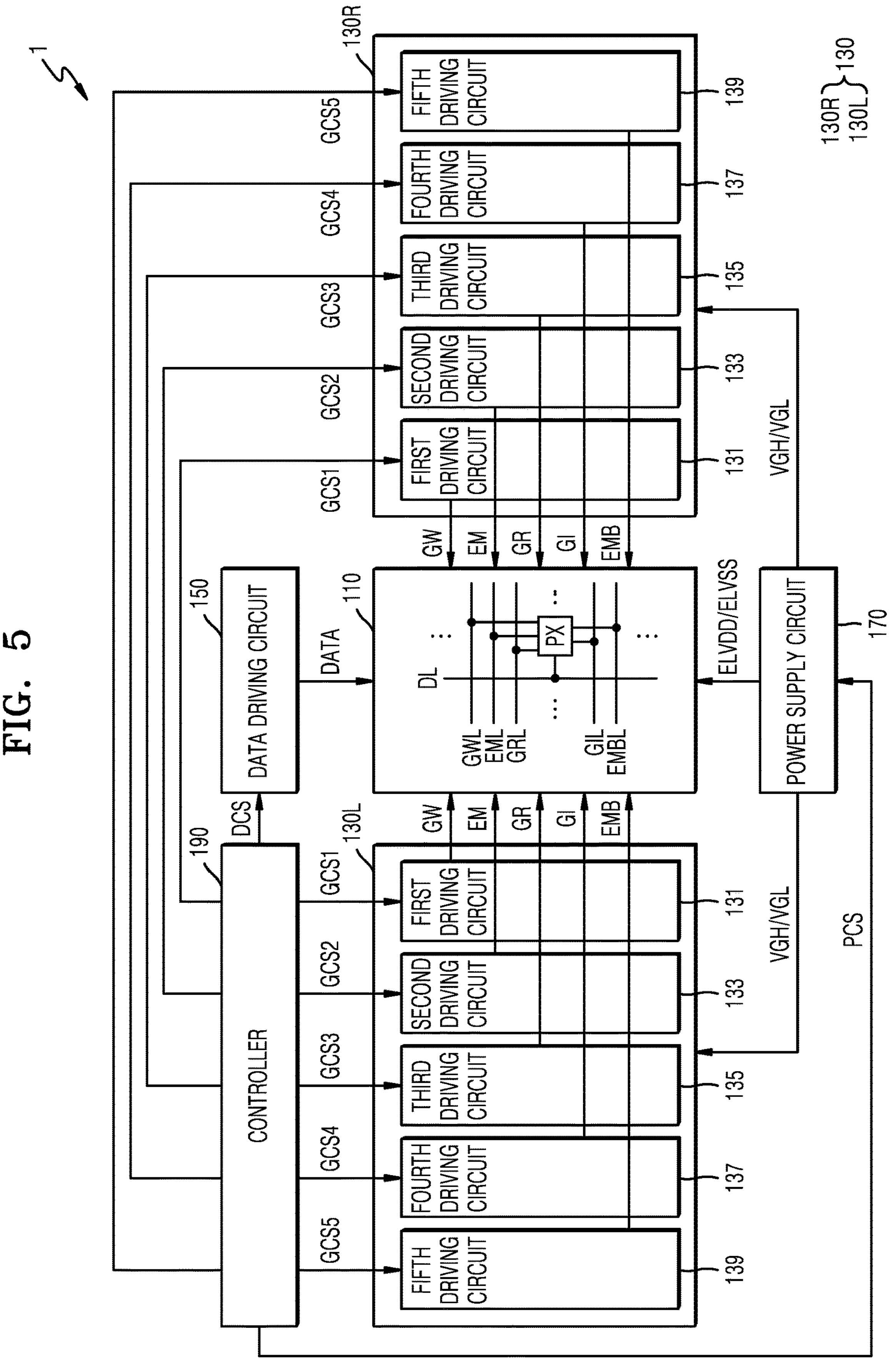
FIG. 5 is a diagram schematically showing a display device according to an embodiment.
Figure 6:
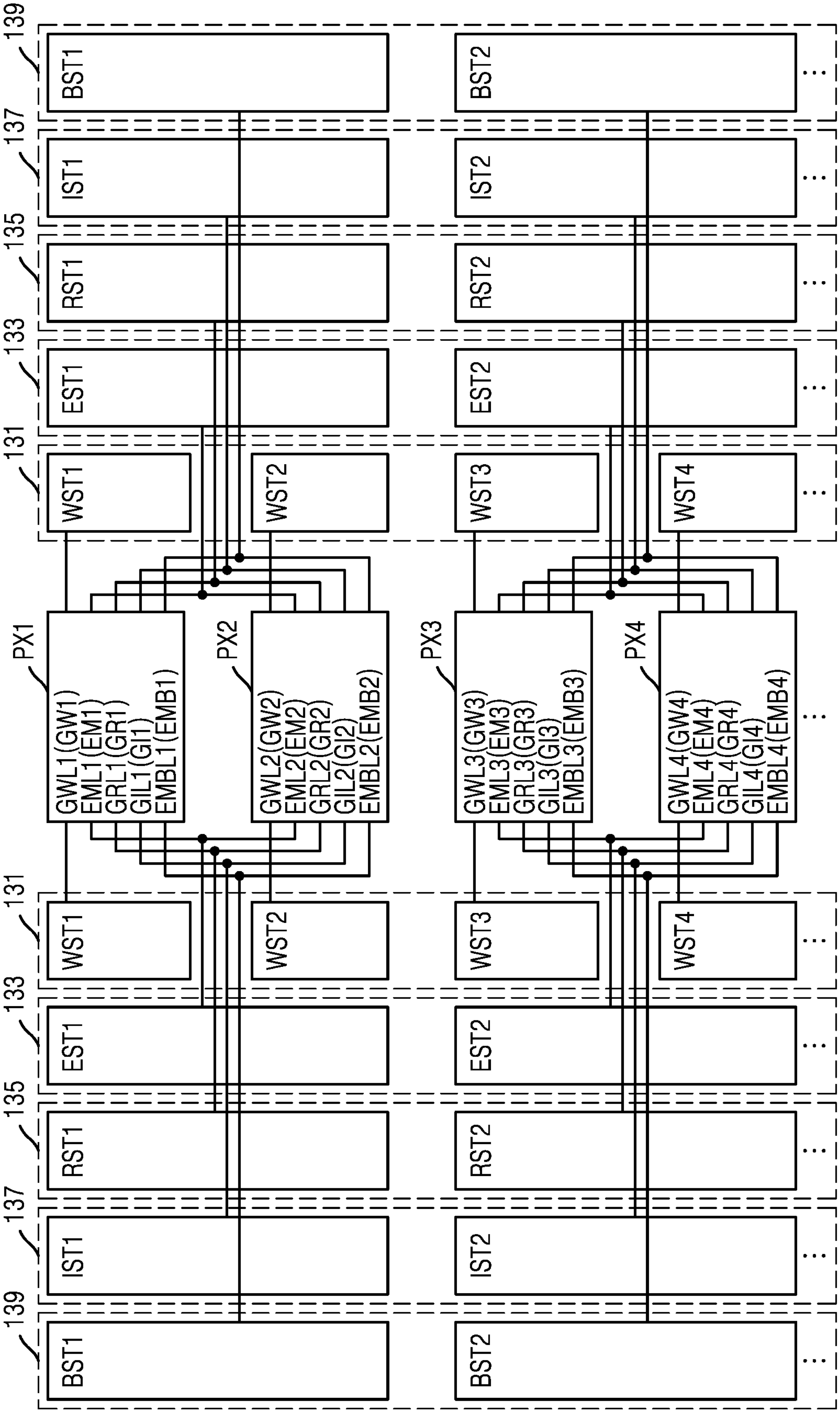
FIG. 6 is a diagram schematically showing a portion of a gate driving circuit of FIG. 5.
Figure 7:
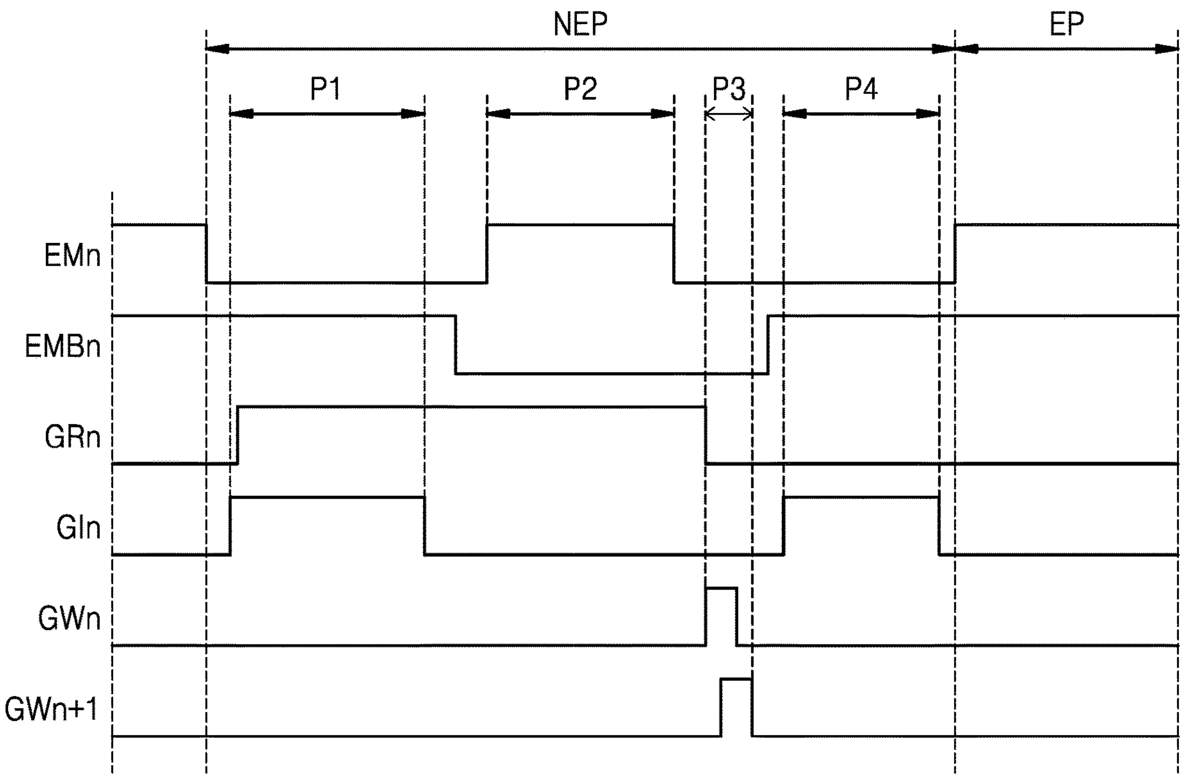
FIG. 7 is a diagram showing gate signals output by the gate driving circuit of FIG. 5.

FIG. 5 is a diagram schematically showing the display device 1 according to an embodiment. FIG. 6 is a diagram schematically showing a portion of a gate driving circuit 130 of FIG. 5. FIG. 7 is a diagram showing gate signals output by the gate driving circuit 130 of FIG. 5. FIG. 7 illustrates examples of gate signals supplied to an n-th row and an (n+1)th row. Hereinafter, for convenience of description, the pixel PX arranged in an arbitrary row and gate signals supplied to an arbitrary row will be described as examples.

As shown in FIG. 5, the display device 1 may include a pixel unit 110, the gate driving circuit 130, a data driving circuit 150, a power supply circuit 170, and a controller 190.

The pixel unit 110 may be provided in the display area DA. Various conductive lines configured to transmit an electric signal to be applied to the display area DA, outer circuits connected (e.g., electrically connected) to pixel circuits, and pads to which a printed circuit board or a driver IC chip is attached may be located in the peripheral area PA. For example, the gate driving circuit 130, the data driving circuit 150, the power supply circuit 170, and the controller 190 may be provided in the peripheral area PA.

A plurality of gate lines are spaced apart from each other in the y direction (for example, the column direction) at regular intervals, in the pixel unit 110. The gate lines may each extend in the x direction (for example, the row direction) and be connected to the pixels PX located in the same row (row line). In an embodiment, for example, the gate lines may include the first gate lines GWL, the second gate lines GIL, the third gate lines GRL, the fourth gate lines EML, and the fifth gate lines EMBL, and the first gate lines GWL, the second gate lines GIL, the third gate lines GRL, the fourth gate lines EML, and the fifth gate lines EMBL may be arranged in each row.

A plurality of data lines may be spaced apart from each other in the x direction at regular intervals, in the pixel unit 110. The data lines may each extend in the y direction and be connected to the pixels PX located in the same column (a column line).

The gate driving circuit 130 may be connected to the gate lines and configured to apply gate signals sequentially to the gate lines. The gate line may be connected to a gate of a transistor included in the pixel PX. The gate signal may be a gate control signal controlling on or off of the transistor. The gate signal may be a square wave signal including a gate-on voltage for turning the transistor on, and a gate-off voltage for turning the transistor off. According to an embodiment, a gate-on voltage may be a low-level voltage (first level voltage) or a high-level voltage (second level voltage).

The gate driving circuit 130 may include a first gate driving circuit 130L arranged at a left side of the pixel unit 110 and a second gate driving circuit 130R arranged at a right side of the pixel unit 110. The first gate driving circuit 130L and the second gate driving circuit 130R may each include a first driving circuit 131, a second driving circuit 133, a third driving circuit 135, a fourth driving circuit 137, and a fifth driving circuit 139.

The first driving circuit 131 may be connected to the plurality of first gate lines GWL, and configured to supply the first gate signal GW sequentially to the first gate lines GWL according to a first control signal GCS1. The second driving circuit 133 may be connected to the plurality of fourth gate lines EML, and configured to supply the fourth gate signal EM sequentially to the fourth gate lines EML according to a second control signal GCS2. The third driving circuit 135 may be connected to the plurality of third gate lines GRL, and configured to supply the third gate signal GR sequentially to the third gate lines GRL according to a third control signal GCS3. The fourth driving circuit 137 may be connected to the plurality of second gate lines GIL, and configured to supply the second gate signal GI sequentially to the second gate lines GIL according to a fourth control signal GCS4. The fifth driving circuit 139 may be connected to the plurality of fifth gate lines EMBL, and configured to supply the fifth gate signal EMB sequentially to the fifth gate lines EMBL according to a fifth control signal GCS5.

The data driving circuit 150 may be connected to the plurality of data lines DL, and configured to apply the data signal DATA indicating a grayscale to the data lines DL according to a sixth control signal DCS. The data driving circuit 150 may be configured to convert input image data having a grayscale input from the controller 190 into the data signal DATA in the form of a voltage or current.

The power supply circuit 170 may be configured to generate voltages to drive the pixel PX, according to a seventh control signal PCS. In an embodiment, for example, the power supply circuit 170 may be configured to generate the driving voltage ELVDD and the common voltage ELVSS, and supply the same to the pixels PX. The driving voltage ELVDD may be a high-level voltage provided to one end of a driving transistor connected to a first electrode (a pixel electrode or anode) of a display element included in the pixel PX. The common voltage ELVSS may be a low-level voltage provided to a second electrode (an opposing electrode or cathode) of the display element included in the pixel PX. The power supply circuit 170 may be configured to generate the reference voltage Vref and the initialization voltage Vint, and supply the same to the pixels PX. A voltage level of the driving voltage ELVDD may be greater than a voltage level of the common voltage ELVSS. A voltage level of the reference voltage Vref may be lower than the voltage level of the driving voltage ELVDD. A voltage level of the initialization voltage Vint may be lower than the voltage level of the common voltage ELVSS.

The power supply circuit 170 may be configured to generate a first voltage VGH and a second voltage VGL, which are to drive the gate driving circuit 130, and transmit the same to the gate driving circuit 130. A voltage level of the first voltage VGH may be greater than a voltage level of the second voltage VGL.

Referring to FIG. 6, the first driving circuit 131, the second driving circuit 133, the third driving circuit 135, the fourth driving circuit 137, and the fifth driving circuit 139 may each include a plurality of stages, and each stage may be configured to receive at least one clock signal and at least one voltage signal, and generate a corresponding gate signal.

The first driving circuit 131 may include a plurality of stages WST1, WST2, WST3, WST4, and so on, which are sequentially connected to each other, and the plurality of stages WST1, WST2, WST3, WST4, and so on may correspond to rows of the pixel unit 110, respectively. Each of the plurality of stages WST1, WST2, WST3, WST4, and so on may be configured to generate the first gate signal GW and output the same to the first gate line GWL of a corresponding row. The first gate signals GW output by the plurality of stages WST1, WST2, WST3, WST4, and so on may be sequentially shifted. In an embodiment, for example, the first gate signals GW may be sequentially output while being shifted at intervals of 1 horizontal period ("H"). Here, 1H may be 1/(driving frequency×vertical resolution). The number of stages of the first driving circuit 131 may be the same as the number of rows or the number of first gate lines GWL.

The second driving circuit 133 may include a plurality of stages EST1, EST2, and so on, which are sequentially connected to each other, and the plurality of stages EST1, EST2, and so on may each correspond to two rows (a pair of rows) of the pixel unit 110. Each of the plurality of stages EST1, EST2, and so on may be configured to generate the fourth gate signal EM and transmit the same to the fourth gate lines EML of the corresponding two rows. For example, the fourth gate signal EM may be simultaneously supplied to the two fourth gate lines EML arranged in the two rows, respectively. According to an embodiment, each of the plurality of stages EST1, EST2, and so on includes two output terminals, i.e., a first output terminal and a second output terminal, wherein one of two fourth gate lines EML may be connected to the first output terminal and the other one of the two fourth gate lines EML may be connected to the second output terminal. According to another embodiment, each of the plurality of stages EST1, EST2, and so on includes one output terminal, and the two fourth gate lines EML may be connected to the output terminal. The fourth gate signals EM output by the plurality of stages EST1, EST2, and so on may be sequentially shifted. For example, the fourth gate signals EM may be sequentially output while being shifted at intervals of 2H (2 horizontal periods). The number of stages of the second driving circuit 133 may be ½ of the number of rows or the number or ½ of the number of fourth gate lines EML.

The third driving circuit 135 may include a plurality of stages RST1, RST2, and so on, which are sequentially connected to each other, and the plurality of stages RST1, RST2, and so on may each correspond to two rows (a pair of rows) of the pixel unit 110. Each of the plurality of stages RST1, RST2, and so on may be configured to generate the third gate signal GR and transmit the same to the third gate lines GRL of the corresponding two rows. For example, the third gate signal GR may be simultaneously supplied to the two third gate lines GRL arranged in the two rows, respectively. According to an embodiment, each of the plurality of stages RST1, RST2, and so on includes two output terminals, i.e., a first output terminal and a second output terminal, wherein one of two third gate lines GRL may be connected to the first output terminal and the other one of the two third gate lines GRL may be connected to the second output terminal. According to another embodiment, each of the plurality of stages RST1, RST2, and so on includes one output terminal, and the two third gate lines GRL may be connected to the output terminal. The third gate signals GR output by the plurality of stages RST1, RST2, and so on may be sequentially shifted. For example, the third gate signals GR may be sequentially output while being shifted at intervals of 2H (2 horizontal periods). The number of stages of the third driving circuit 135 may be ½ of the number of rows or the number or ½ of the number of third gate lines GRL.

The fourth driving circuit 137 may include a plurality of stages IST1, IST2, and so on, which are sequentially connected to each other, and the plurality of stages IST1, IST2, and so on may each correspond to two rows (a pair of rows) of the pixel unit 110. Each of the plurality of stages IST1, IST2, and so on may be configured to generate the second gate signal GI and transmit the same to the second gate lines GIL of the corresponding two rows. For example, the second gate signal GI may be simultaneously supplied to the two second gate lines GIL arranged in the two rows, respectively. According to an embodiment, each of the plurality of stages IST1, IST2, and so on includes two output terminals, i.e., a first output terminal and a second output terminal, wherein one of two second gate lines GIL may be connected to the first output terminal and the other one of the two second gate lines GIL may be connected to the second output terminal. According to another embodiment, each of the plurality of stages IST1, IST2, and so on includes one output terminal, and the two second gate lines GIL may be connected to the output terminal. The second gate signals GI output by the plurality of stages IST1, IST2, and so on may be sequentially shifted. For example, the second gate signals GI may be sequentially output while being shifted at intervals of 2H (2 horizontal periods). The number of stages of the fourth driving circuit 137 may be ½ of the number of rows or the number or ½ of the number of second gate lines GIL.

The fifth driving circuit 139 may include a plurality of stages BST1, BST2, and so on, which are sequentially connected to each other, and the plurality of stages BST1, BST2, and so on may each correspond to two rows (a pair of rows) of the pixel unit 110. Each of the plurality of stages BST1, BST2, and so on may be configured to generate the fifth gate signal EMB and transmit the same to the fifth gate lines EMBL of the corresponding two rows. For example, the fifth gate signal EMB may be simultaneously supplied to the two fifth gate lines EMBL arranged in the two rows, respectively. According to an embodiment, each of the plurality of stages BST1, BST2, and so on includes two output terminals, i.e., a first output terminal and a second output terminal, wherein one of two fifth gate lines EMBL may be connected to the first output terminal and the other one of the two fifth gate lines EMBL may be connected to the second output terminal. According to another embodiment, each of the plurality of stages BST1, BST2, and so on includes one output terminal, and the two fifth gate lines EMBL may be connected to the output terminal. The fifth gate signals EMB output by the plurality of stages BST1, BST2, and so on may be sequentially shifted. For example, the fifth gate signals EMB may be sequentially output while being shifted at intervals of 2H (2 horizontal periods). The number of stages of the fifth driving circuit 139 may be ½ of the number of rows or the number or ½ of the number of fifth gate lines EMBL.

As shown in FIG. 6, the first stage WST1 of the first driving circuit 131 may be configured to output a first first-gate signal GW1 to a first gate line GWL1 connected to a first pixel PX1 arranged in a first row, and the second stage WST2 may be configured to output a second first-gate signal GW2 to a first gate line GWL2 connected to a second pixel PX2 arranged in a second row.

The fourth gate signal EM output by the first stage EST1 of the second driving circuit 133 may be simultaneously supplied as a first fourth-gate signal EM1 to a fourth gate line EML1 connected to the first pixel PX1, and as a second fourth-gate signal EM2 to a fourth gate line EML2 connected to the second pixel PX2. The fourth gate signal EM output by the second stage EST2 of the second driving circuit 133 may be simultaneously supplied as a third-fourth gate signal EM3 to a fourth gate line EML3 to a third pixel PX3 arranged in a third row, and as a fourth fourth-gate signal EM4 to a fourth gate line EML4 connected to a fourth pixel PX4 arranged in a fourth row.

The third gate signal GR output by the first stage RST1 of the third driving circuit 135 may be simultaneously supplied as a first third-gate signal GR1 to a third gate line GRL1 connected to the first pixel PX1, and as a second third-gate signal GR2 to a third gate line GRL2 connected to the second pixel PX2. The third gate signal GR output by the second stage RST2 of the third driving circuit 135 may be simultaneously supplied as a third third-gate signal GR3 to a third gate line GRL3 connected to the third pixel PX3, and as a fourth third-gate signal GR4 to a third gate line GRL4 connected to the fourth pixel PX4.

The second gate signal GI output by the first stage IST1 of the fourth driving circuit 137 may be simultaneously supplied as a first second-gate signal G11 to a second gate line GIL1 connected to the first pixel PX1, and as a second second-gate signal G12 to a second gate line GIL2 connected to the second pixel PX2. The second gate signal GI output by the second stage IST2 of the fourth driving circuit 137 may be simultaneously supplied as a third second-gate signal G13 to a second gate line GIL3 connected to the third pixel PX3, and as a fourth second-gate signal G14 to a second gate line GIL4 connected to the fourth pixel PX4.

The fifth gate signal EMB output by the first stage BST1 of the fifth driving circuit 139 may be simultaneously supplied as a first fifth-gate signal EMB1 to a fifth gate line EMBL1 connected to the first pixel PX1, and as a second fifth-gate signal EMB2 to a fifth gate line EMBL2 connected to the second pixel PX2. The fifth gate signal EMB output by the second stage BST2 of the fifth driving circuit 139 may be simultaneously supplied as a third-fifth gate signal EMB3 to a fifth gate line EMBL3 connected to the third pixel PX3, and as a fourth fifth-gate signal EMB4 to a fifth gate line EMBL4 connected to the fourth pixel PX4.

In the same way, as shown in FIG. 7, the second gate signal GI, the third gate signal GR, the fourth gate signal EM, and the fifth gate signal EMB may be applied to an n-th pixel arranged in an n-th row and an (n+1)th pixel arranged in an (n+1)th row, and a first gate signal GW[n] and a first gate signal GW[n+1] may be sequentially applied to the n-th pixel and the (n+1)th pixel.

Locations of the first driving circuit 131, second driving circuit 133, third driving circuit 135, fourth driving circuit 137, and fifth driving circuit 139 are not limited to those shown in FIGS. 5 and 6. Various embodiments may be realized, for example, locations of some driving circuits may be changed by changing some gate signals supplied to the pixel PX, and one of bisymmetric driving circuits may be omitted.

Figure 8:
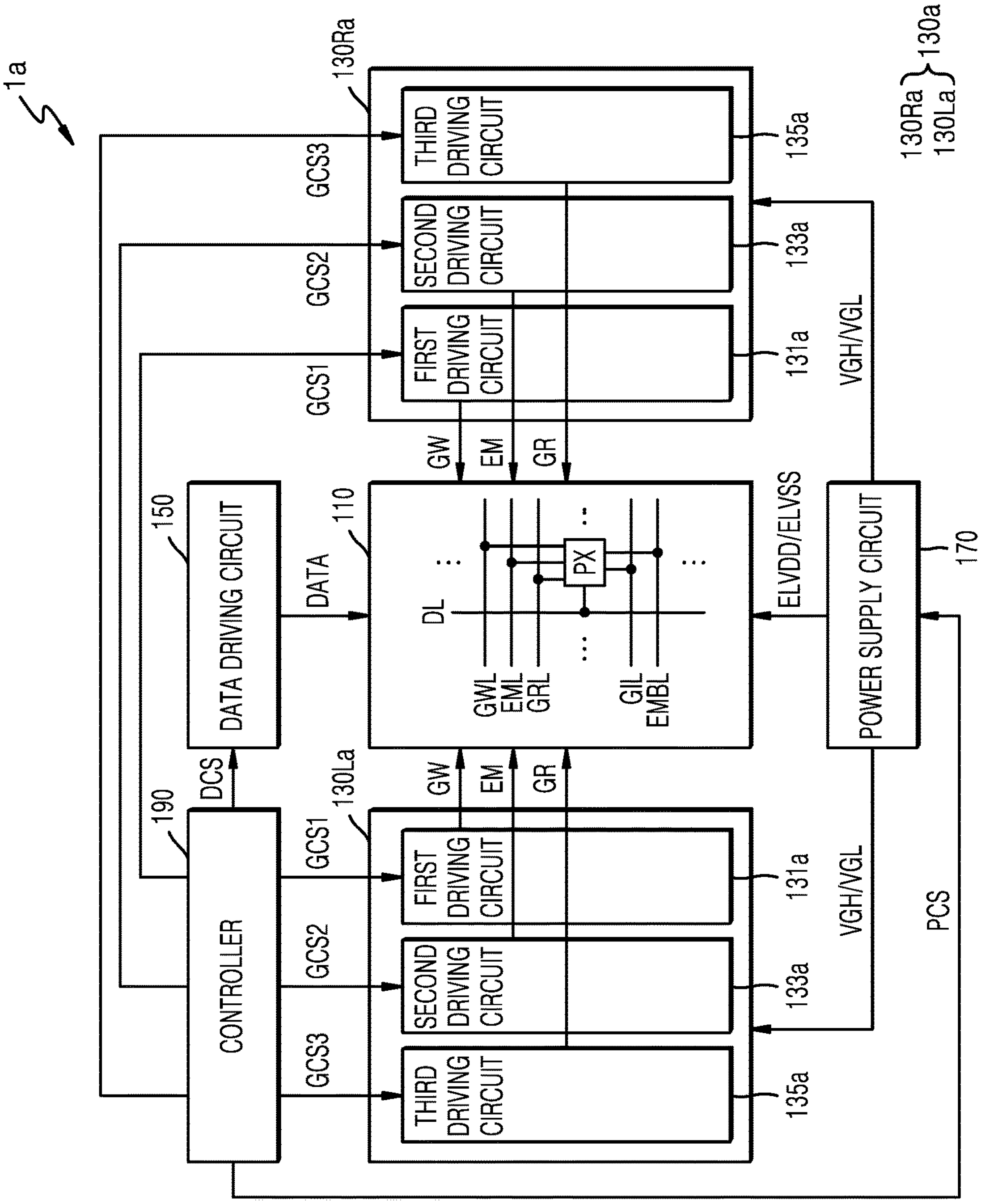
FIG. 8 is a diagram schematically showing a display device according to an embodiment.
Figure 9:
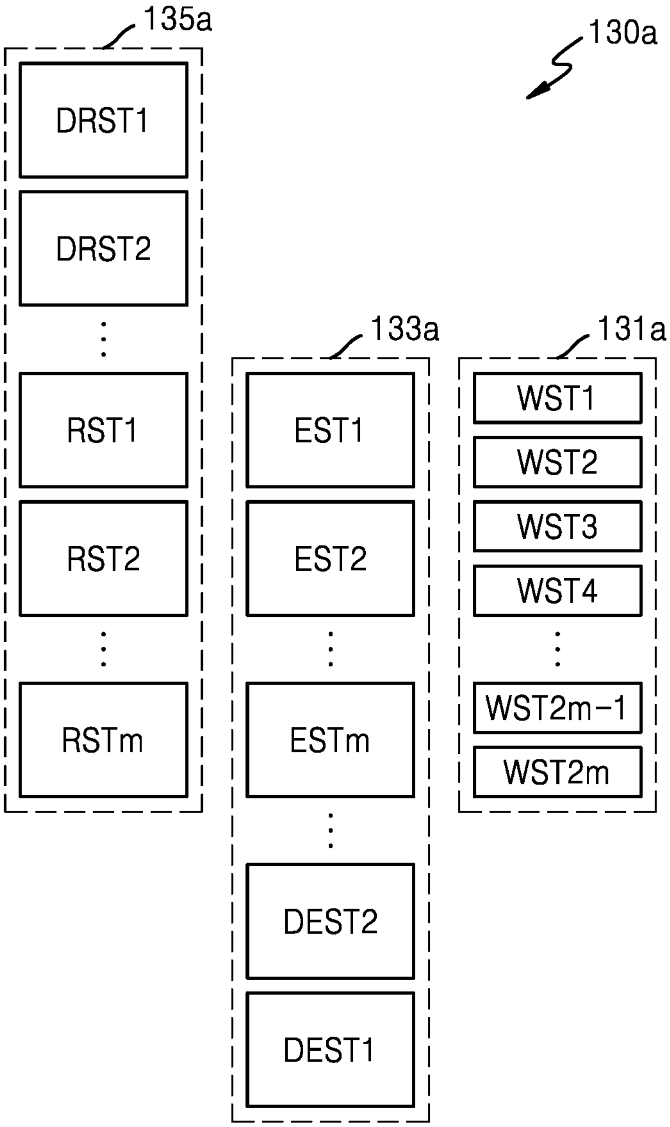
FIG. 9 is a diagram schematically showing a portion of a gate driving circuit of FIG. 8.
Figure 10A:
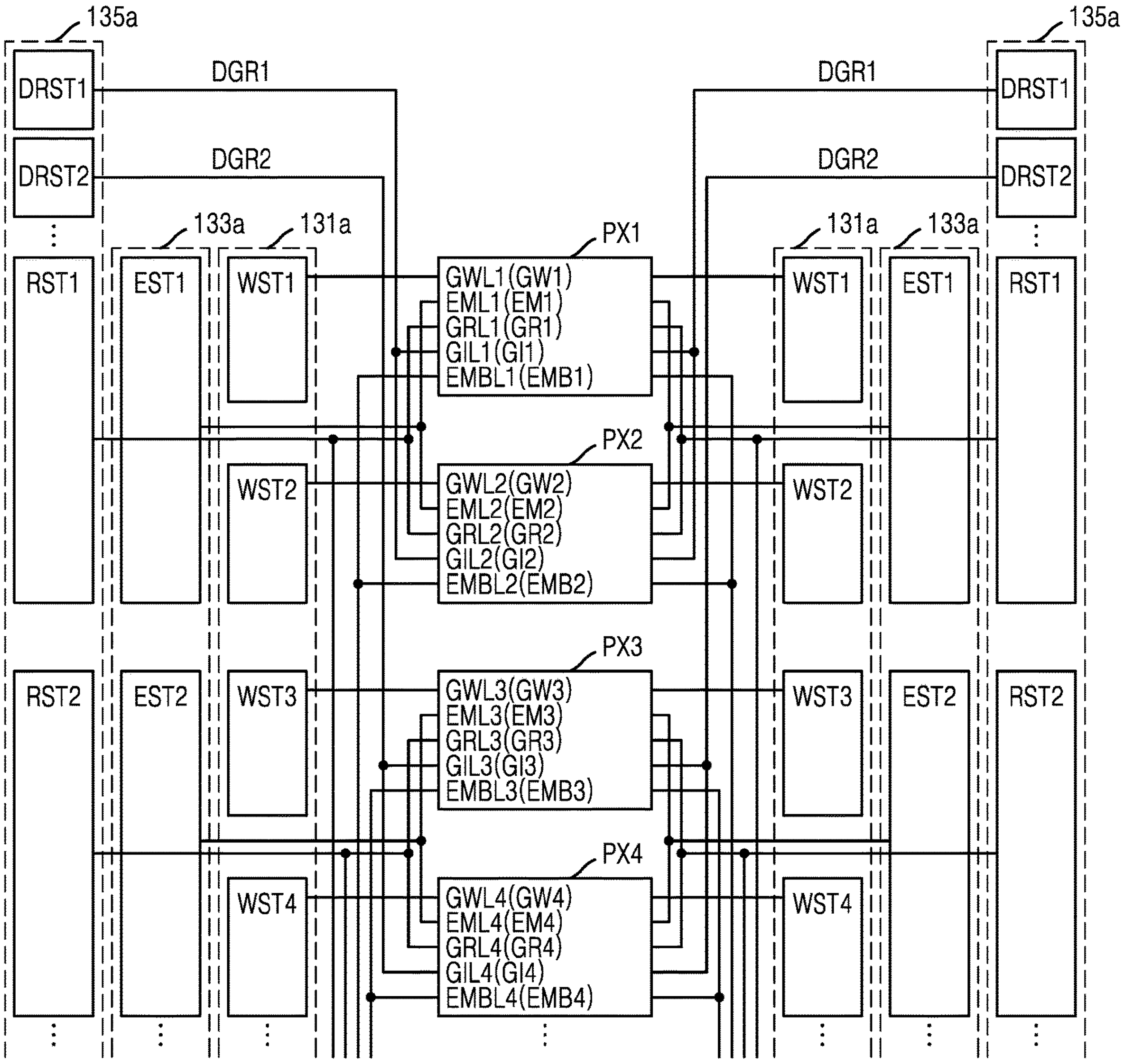
FIGS. 10A to 10C are diagrams schematically showing some stages, for describing an operation of a pixel of FIG. 8.
Figure 10B:
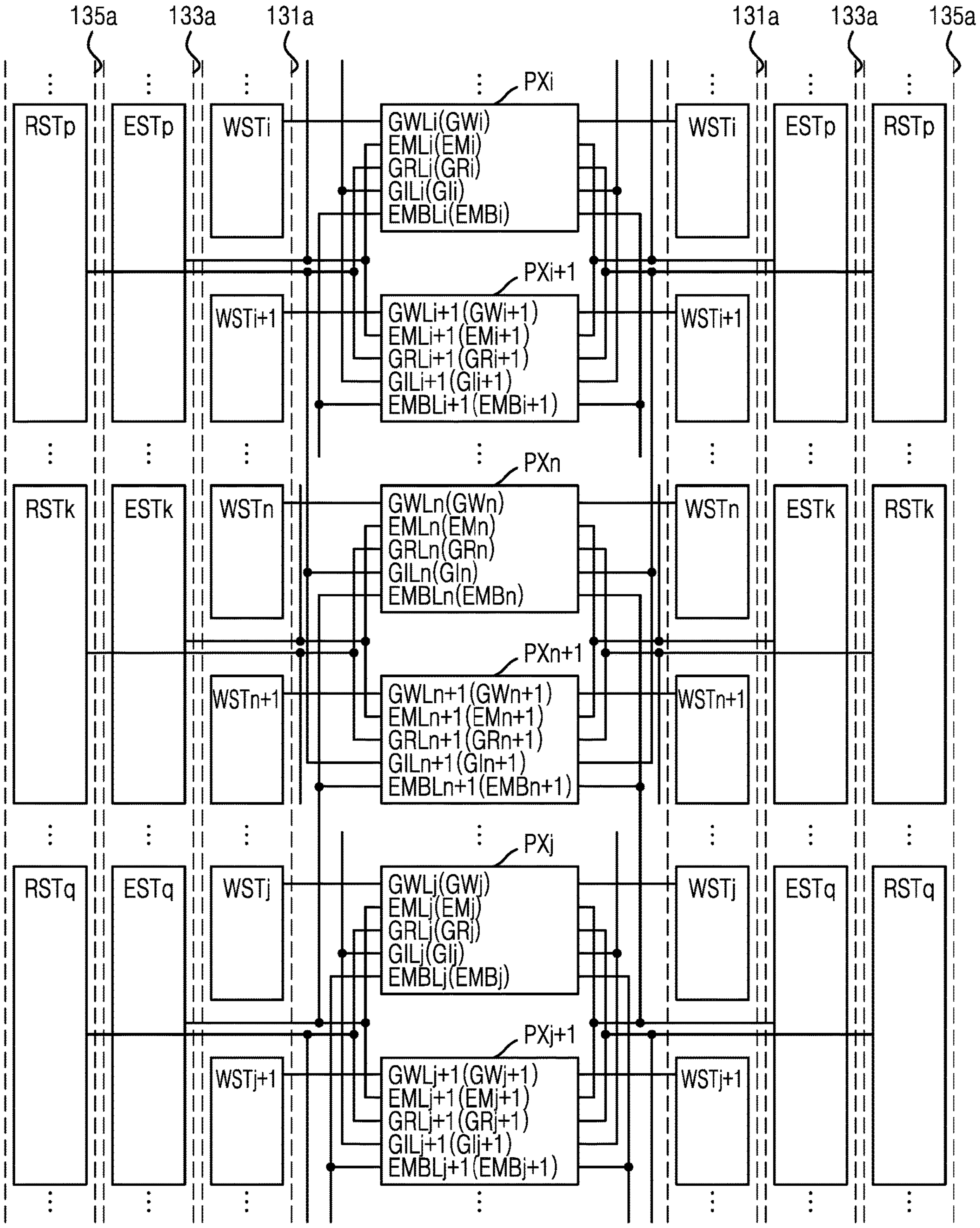
Figure 10C:
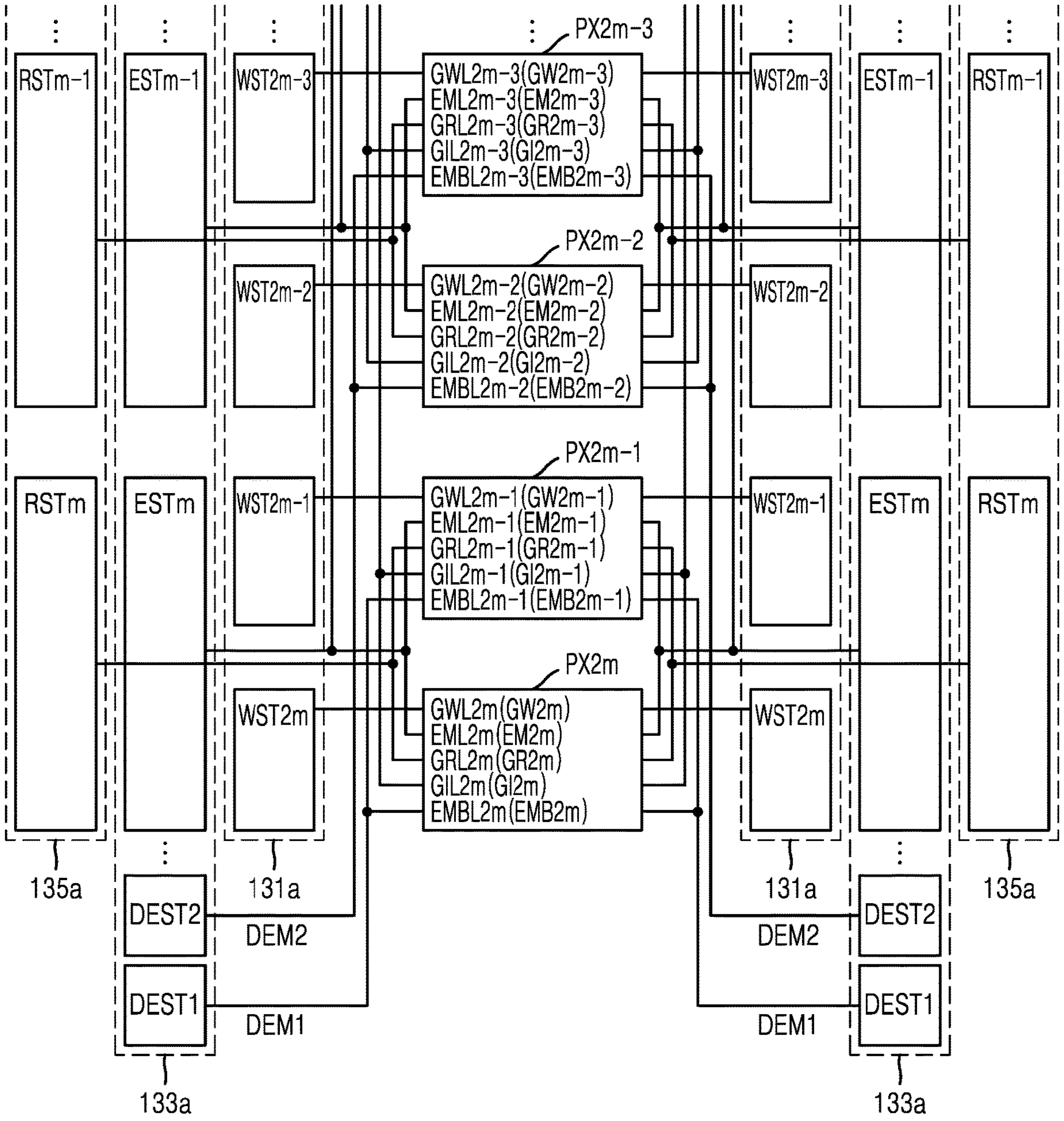
Figure 11:
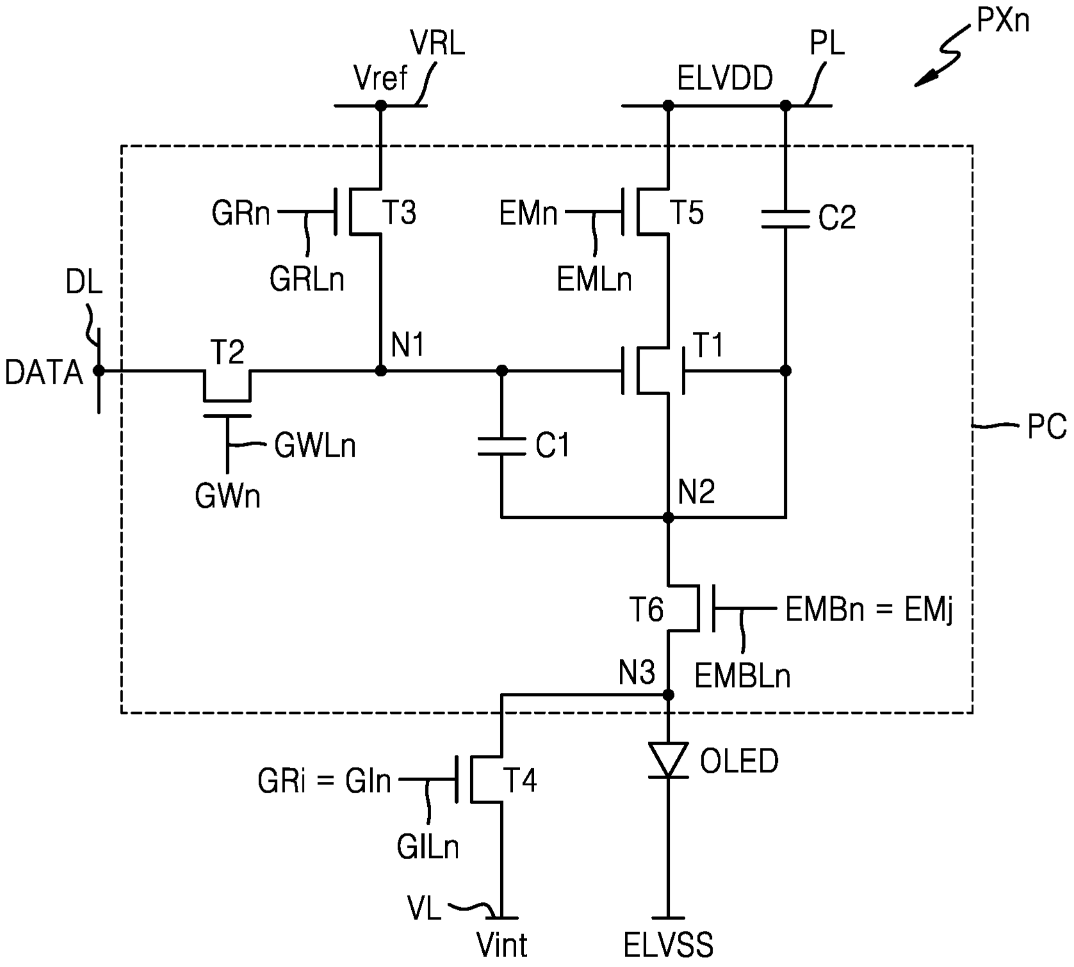
FIG. 11 is a diagram showing a pixel arranged in an n-th row in a pixel unit of FIG. 8.
Figure 12:
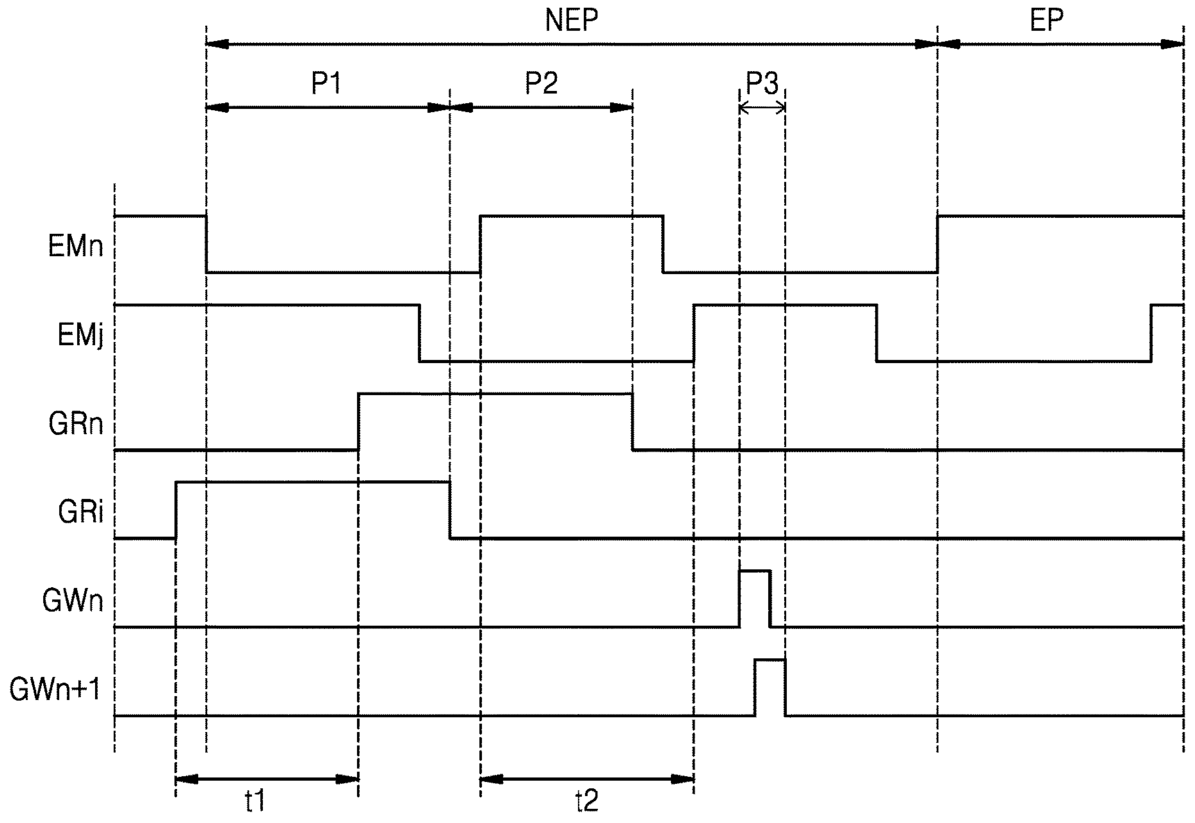
FIG. 12 is a diagram showing gate signals output by the gate driving circuit of FIG. 8.

FIG. 8 is a diagram schematically showing a display device 1*a* according to an embodiment. FIG. 9 is a diagram schematically showing a portion of a gate driving circuit 130*a* of FIG. 8. FIGS. 10A to 10C are diagrams schematically showing some stages, for describing an operation of a pixel of FIG. 8. FIG. 11 is a diagram showing a pixel PXn arranged in an n-th row in the pixel unit 110 of FIG. 8. FIG. 12 is a diagram showing gate signals output by the gate driving circuit 130*a* of FIG. 8. In FIGS. 8 to 12, like reference numerals are used for elements, periods, and signals described with reference to FIGS. 3 to 7, and redundant descriptions thereof will be omitted.

Referring to FIG. 8, the gate driving circuit 130*a* of the display device 1*a* may include a first gate driving circuit 130La and a second gate driving circuit 130Ra. The first gate driving circuit 130La and the second gate driving circuit 130Ra may each include a first driving circuit 131*a*, a second driving circuit 133*a*, and a third driving circuit 135*a*.

Referring to FIG. 9, the first driving circuit 131*a* may include a plurality of stages WST1 to WST2*m*, which are sequentially connected to each other, and each of the plurality of stages WST1 to WST2*m* may correspond to each of rows of the pixel unit 110. The first driving circuit 131*a* may be substantially the same as or similar to the first driving circuit 131 of FIG. 5.

The second driving circuit 133*a* may include a plurality of stages EST1 to ESTm, which are sequentially connected to each other. The plurality of stages EST1 to ESTm may each correspond to two rows (a pair of rows) of the pixel unit 110. Each of the plurality of stages EST1 to ESTm may be configured to generate the fourth gate signal EM and supply the same simultaneously to the two fourth gate lines EML arranged in the two rows, respectively. The second driving circuit 133*a* may further include a plurality of dummy stages DEST1, DEST2, and so on, which are sequentially connected to the last stage ESTm.

Some of the plurality of stages EST1 to ESTm and the plurality of dummy stages DEST1, DEST2, and so on of the second driving circuit 133*a* may each be configured to supply, as the fifth gate signal EMB, the fourth gate signal EM to the fifth gate lines EMBL of two rows other than the corresponding two rows. According to an embodiment, some of the plurality of stages EST1 to ESTm may be configured to output, as the fifth gate signal EMB, the fourth gate signal EM to a pair of the fifth gate lines EMBL arranged in a pair of rows forward the corresponding pair of rows. Each of the plurality of dummy stages DEST1, DEST2, and so on may be configured to output, as the fifth gate signal EMB, the fourth gate signal EM to a pair of fifth gate lines EMBL arranged in a pair of rows from among rows from an (2*m*)th row that is the last row to certain rows.

The third driving circuit 135*a* may include a plurality of stages RST1 to RSTm, which are sequentially connected to each other. The plurality of stages RST1 to RSTm may each correspond to two rows (a pair of rows) of the pixel unit 110. Each of the plurality of stages RST1 to RSTm may be configured to generate the third gate signal GR and supply the same simultaneously to the two third gate lines GRL arranged in the two rows, respectively. The third driving circuit 135*a* may further include a plurality of dummy stages DRST1, DRST2, and so on, which are sequentially connected to the first stage RST1.

Some of the plurality of stages RST1 to RSTm and the plurality of dummy stages DRST1, DRST2, and so on of the third driving circuit 135*a* may each be configured to supply, as the second gate signal GI, the third gate signal GR to the second gate lines GIL of two rows other than the corresponding two rows. According to an embodiment, some of the plurality of stages RST1 to RSTm may be configured to output, as the second gate signal GI, the third gate signal GR to a pair of the second gate lines GIL arranged in a pair of rows backward the corresponding pair of rows. Each of the plurality of dummy stages DRST1, DRST2, and so on may be configured to output, as the second gate signal GI, the third gate signal GR to a pair of second gate lines GIL arranged in a pair of rows from among rows from the first row to certain rows.

Referring to FIGS. 10A to 10C together, the first driving circuit 131*a* may be connected to the plurality of first gate lines GWL, and configured to supply the first gate signal GW sequentially to the first gate lines GWL according to the first control signal GCS1.

The second driving circuit 133*a* may be connected to the plurality of fourth gate lines EML, and configured to supply the fourth gate signal EM sequentially to the fourth gate lines EML according to the second control signal GCS2. Also, the second driving circuit 133*a* may be connected to the plurality of fifth gate lines EMBL, and configured to supply the fifth gate signal EMB sequentially to the fifth gate lines EMBL according to the second control signal GCS2. The pixel PX may be configured to receive, as the fifth gate signal EMB, the fourth gate signal EM shifted from the fourth gate signal EM by a certain period, from the fifth gate line EMBL.

The third driving circuit 135*a* may be connected to the plurality of third gate lines GRL, and configured to supply the third gate signal GR sequentially to the third gate lines GRL according to the third control signal GCS3. Also, the third driving circuit 135*a* may be connected to the plurality of second gate lines GIL, and configured to supply the second gate signal GI sequentially to the second gate lines GIL according to the third control signal GCS3. The pixel PX may be configured to receive, as the second gate signal GI, the third gate signal GR shifted from the third gate signal GR by a certain period, from the second gate line GIL.

Referring to FIG. 10A, the first pixel PX1 arranged in the first row may be configured to receive the first first-gate signal GW1 through the first first-gate line GWL1 from the first stage WST1 of the first driving circuit 131*a*, and the second pixel PX2 arranged in the second row may be configured to receive the second first-gate signal GW2 through the second first-gate line GWL2 from the second stage WST2 of the first driving circuit 131*a*.

The fourth gate signal EM output by the first stage EST1 of the second driving circuit 133*a* and the third gate signal GR output by the first stage RST1 of the third driving circuit 135*a* may be simultaneously supplied to the first pixel PX1 and the second pixel PX2.

The first pixel PX1 may be configured to receive the first fourth-gate signal EM1 through the first fourth-gate line EML1 from the first stage EST1 of the second driving circuit 133*a*, and receive the first third-gate signal GR1 through the first third-gate line GRL1 from the first stage RST1 of the third driving circuit 135*a*. The second pixel PX2 may be configured to receive the second fourth-gate signal EM2 through the second fourth-gate line EML2 from the first stage EST1 of the second driving circuit 133*a*, and receive the second third-gate signal GR2 through the second third-gate line GRL2 from the first stage RST1 of the third driving circuit 135*a*.

Each of the first pixel PX1 and the second pixel PX2 may be configured to receive the fourth gate signal EM output to the fourth gate line EML of a corresponding row by a next stage after a certain number from the first stage EST1 of the second driving circuit 133*a*, as the first fifth-gate signal EMB1 through the first fifth-gate line EMBL1 and as the second fifth-gate signal EMB2 through the second fifth-gate line EMBL2.

Each of the first pixel PX1 and the second pixel PX2 may be configured to receive a signal DGR1 output by a first dummy stage DRST1 of the third driving circuit 135*a*, as the first second-gate signal G11 through the first second-gate line GIL1 and as the second second-gate signal G12 through the second second-gate line GIL2.

The third gate signal GR output by each of the first stage RST1 and second stage RST2 of the third driving circuit 135*a* may be supplied to the second gate line GIL of each row corresponding to the next stage after the certain number.

Referring to FIG. 10B, the n-th pixel PXn arranged in the n-th row may be configured to receive an n-th first gate signal GWn through an n-th first gate line GWLn from an n-th stage WSTn of the first driving circuit 131*a*, and an (n+1)th pixel PXn+1 arranged in an (n+1)th row may be configured to receive an (n+1)th first gate signal GWn+1 through an (n+1)th first gate line GWLn+1 from an (n+1)th stage WSTn+1 of the first driving circuit 131*a*.

The fourth gate signal EM output by a k-th stage ESTk (k=(n+1)/2) of the second driving circuit 133*a* and the third gate signal GR output by a k-th stage RSTk of the third driving circuit 135*a* may be simultaneously supplied to the n-th pixel PXn and the (n+1)th pixel PXn+1.

The n-th pixel PXn may be configured to receive an n-th fourth gate signal EMn through an n-th fourth gate line EMLn from the k-th stage ESTk of the second driving circuit 133*a*, and receive an n-th third gate signal GRn through an n-th third gate line GRLn from the k-th stage RSTk of the third driving circuit 135*a*. The (n+1)th pixel PXn+1 may be configured to receive an (n+1)th fourth gate signal EMn+1 through an (n+1)th fourth gate line EMLn+1 from the k-th stage ESTk of the second driving circuit 133*a*, and receive an (n+1)th third gate signal GRn+1 through an (n+1)th third gate line GRLn+1 from the k-th stage RSTk of the third driving circuit 135*a*.

The fourth gate signal EM output by a q-th stage ESTq (q=(j+1)/2, where q is a natural number greater than k and j is a natural number greater than n) of the second driving circuit 133*a* may be supplied as a j-th fourth gate signal EMj through a j-th fourth gate line EMLj to a j-th pixel PXj arranged in a j-th row and supplied as a (j+1)th fourth gate signal EMj+1 through a (j+1)th fourth gate line EMLj+1 to a (j+1)th pixel PXj+1 arranged in a (j+1)th row. Also, the fourth gate signal EM output by the q-th stage ESTq of the second driving circuit 133*a* may be supplied to the n-th pixel PXn as an n-th fifth gate signal EMBn through an n-th fifth gate line EMBLn, and supplied as an (n+1)th fifth gate signal EMBn+1 through an (n+1)th fifth gate line EMBLn+1. Accordingly, the n-th fifth gate signal EMBn of the n-th pixel PXn and the (n+1)th fifth gate signal EMBn+1 of the (n+1)th pixel PXn+1 may be the same as the j-th fourth gate signal EMj and the (j+1)th fourth gate signal EMj+1.

The third gate signal GR output by a p-th stage RSTp (p=(i+1)/2, wherein p is a natural number lower than k and i is a natural number lower than n) of the third driving circuit 135*a* may be supplied as an i-th third gate signal GRi through an i-th third gate line GRLi to an i-th pixel PXi arranged in an i-th row, and supplied as an (i+1)th third gate signal GRi+1 through an (i+1)th third gate line GRLi+1 to an (i+1)th pixel PXi+1 arranged in an (i+1)th row. Also, the third gate signal GR output by the p-th stage RSTp of the third driving circuit 135*a* may be supplied to the n-th pixel PXn as an n-th second gate signal Gin through an n-th second gate line GILn, and to the (n+1)th pixel PXn+1 as an (n+1)th second gate signal GIn+1 through an (n+1)th second gate line GILn+1. Accordingly, the n-th second gate signal Gin of the n-th pixel PXn and the (n+1)th second gate signal GIn+1 of the (n+1)th pixel PXn+1 may be the same as the i-th third gate signal GRi and the (i+1)th third gate signal GRi+1.

The fourth gate signal EM output by each of a p-th stage ESTp and the k-th stage ESTk of the second driving circuit 133*a* may be supplied to the fifth gate line EMBL of each row corresponding to a previous stage before a certain number.

The third gate signal GR output by each of the k-th stage RSTk and a q-th stage RSTq of the third driving circuit 135*a* may be supplied to the second gate line GIL of each row corresponding to the next stage after the certain number.

Referring to FIG. 10C, a (2*m*-1)th pixel PX2*m*-1 arranged in an (2*m*-1)th row may be configured to receive a (2*m*-1)th first gate signal GW2*m*-1 through a (2*m*-1)th first gate line GWL2*m*-1 from a (2*m*-1)th stage WST2*m*-1 of the first driving circuit 131*a*, and a (2*m*)th pixel PX2*m* arranged in a (2*m*)th row may be configured to receive a (2*m*)th first gate signal GW2*m* through a (2*m*)th first gate line GWL2*m* from a (2*m*)th stage WST2*m* of the first driving circuit 131*a*.

The fourth gate signal EM output by the m-th stage ESTm of the second driving circuit 133*a* and the third gate signal GR output by an m-th stage RSTm of the third driving circuit 135*a* may be simultaneously supplied to the (2*m*-1)th pixel PX2*m*-1 and the (2*m*)th pixel PX2*m*.

The (2*m*-1)th pixel PX2*m*-1 may be configured to receive a (2*m*-1)th fourth gate signal EM2*m*-1 through a (2*m*-1)th fourth gate line EML2*m*-1 from the m-th stage ESTm of the second driving circuit 133*a*, and receive a (2*m*-1)th third gate signal GR2*m*-1 through a (2*m*-1)th third gate line GRL2*m*-1 from the m-th stage RSTm of the third driving circuit 135*a*. The (2*m*)th pixel PX2*m* may be configured to receive a (2*m*)th fourth gate signal EM2*m* through a (2*m*)th fourth gate line EML2*m* from the m-th stage ESTm of the second driving circuit 133*a*, and receive a (2*m*)th third gate signal GR2*m* through a (2*m*)th third gate line GRL2*m* from the m-th stage RSTm of the third driving circuit 135*a*.

Each of the (2*m*-1)th pixel PX2*m*-1 and the (2*m*)th pixel PX2*m* may be configured to receive a signal DEM1 output by the first dummy stage DEST1 of the second driving circuit 133*a* as a (2*m*-1)th fifth gate signal EMB2*m*-1 through a (2*m*-1)th fifth gate line EMBL2*m*-1, and as a (2*m*)th fifth gate signal EMB2*m* through a (2*m*)th fifth gate line EMBL2*m*.

The fourth gate signal EM output by each of the m-th stage ESTm and an (m-1)th stage ESTm-1 of the second driving circuit 133*a* may be supplied to the fifth gate line EMBL of each row corresponding to the previous stage before the certain number.

According to an embodiment, the i-th row is a row spaced apart from the n-th row by 30 rows forward, and the j-th row may be a row spaced apart from the n-th row by 28 rows backward. In this case, the third driving circuit 135*a* may include 15 dummy stages DRST1 to DRST15, and the second driving circuit 133*a* may include 14 dummy stages DEST1 to DEST14. Some stages RST1 to RSTm-15 from among the plurality of stages RST1 to RSTm and the dummy stages DRST1 to DRST15 may each be configured to supply the third gate signal GR as the second gate signal GI to a pair of second gate lines GIL corresponding to a stage RST spaced apart by 15 stages backward. Some stages EST15 to ESTm from among the plurality of stages EST1 to ESTm and the dummy stages DEST1 to DEST14 may each be configured to supply the fourth gate signal EM as the fifth gate signal EMB to a pair of fifth gate lines EMBL corresponding to a stage EST spaced apart by 14 stages forward. When the third gate signals GR and the fourth gate signals EM output by neighboring stages are shifted by 2H (2 horizontal periods), the n-th third gate signal GRn may be output by being shifted by t1 (e.g., 30H: 30 horizontal periods) from the i-th third gate signal GRi, and the j-th fourth gate signal EMj may be output by being shifted by t2 (e.g., 28H: 28 horizontal periods) from the n-th fourth gate signal EMn, as shown in FIG. 12.

Referring to FIG. 11, the pixel PX included in the pixel unit 110 of the display device 1*a* differs from the pixel PX shown in FIG. 3 in that the fourth transistor T4 is configured to receive the third gate signal GR as the second gate signal GI and the sixth transistor T6 is configured to receive the fourth gate signal EM as the fifth gate signal EMB.

Referring to FIG. 12, the fourth period P4 from among the first to fourth periods P1 to P4 of FIG. 7 may be omitted. Hereinafter, the n-th pixel PXn will be described as an example.

During the first period P1, the i-th third gate signal GRi of a gate-on voltage may be supplied (applied) as the n-th second gate signal GIn to the n-th second gate line GILn, the j-th fourth gate signal EMj of a gate-on voltage may be supplied as the n-th fifth gate signal EMBn to the n-th fifth gate line EMBLn, and the n-th third gate signal GRn of a gate-on voltage may be supplied to the n-th third gate line GRLn. The first gate of the first transistor T1 may be initialized to the reference voltage Vref by the turned-on third transistor T3. The second terminal of the first transistor T1 and the pixel electrode of the organic light-emitting diode OLED may be initialized to the initialization voltage Vint by the turned-on sixth transistor T6 and turned-on fourth transistor T4.

During the second period P2, the n-th third gate signal GRn of a gate-on voltage may be supplied to the n-th third gate line GRLn, and the n-th fourth gate signal EMn of a gate-on voltage may be supplied to the n-th fourth gate line EMLn. The threshold voltage Vth of the first transistor T1 may be compensated for by the turned-on third transistor T3 and fifth transistor T5.

During the emitting period EP, the n-th fourth gate signal EMn and the j-th fourth gate signal EMj shifted from the n-th fourth gate signal EMn by t2 may be sequentially supplied in gate-on voltages. The organic light-emitting diode OLED may emit light by the turned-on fifth transistor T5 and sixth transistor T6.

During the emitting period EP, when the fifth transistor T5 and the sixth transistor T6 are simultaneously turned on while a certain voltage is applied to each of the second node N2 and third node N3 of the pixel PX, i.e., to each of the first terminal and second terminal of the sixth transistor T6, a voltage of the third node N3 may be changed by a voltage difference between the first terminal and second terminal of the sixth transistor T6. According to an embodiment of the disclosure, during the emitting period EP, the gate-on voltage of the fifth gate signal EMB may be delayed by the certain time t2 than a gate-on voltage applying timing of the fourth gate signal EM. For example, the voltage difference between the first terminal and second terminal of the sixth transistor T6 may be reduced before the sixth transistor T6 is turned on, by using the j-th fourth gate signal EMj shifted from the n-th fourth gate signal EMn by t2 as the n-th fifth gate signal EMBn of the n-th pixel PXn. Accordingly, voltage fluctuation of the third node N3 may be reduced, thereby reducing occurrence of a flicker phenomenon.

In the present embodiment, the third gate signal GR output by the third driving circuit 135*a* and the fourth gate signal EM output by the second driving circuit 133*a* may be used as the second gate signal GI and the fifth gate signal EMB, and thus the fourth driving circuit 137 and the fifth driving circuit 139 of FIG. 5 may be omitted, thereby reducing a non-display area. According to another embodiment, a fourth driving circuit configured to output the second gate signal GI may be further provided such that the fourth transistor T4 may be configured to receive the second gate signal GI from the fourth driving circuit and use the fourth gate signal EM output by the second driving circuit 133*a* as the fifth gate signal EMB. In this case, only the fifth driving circuit 139 may be omitted.

Figure 13:
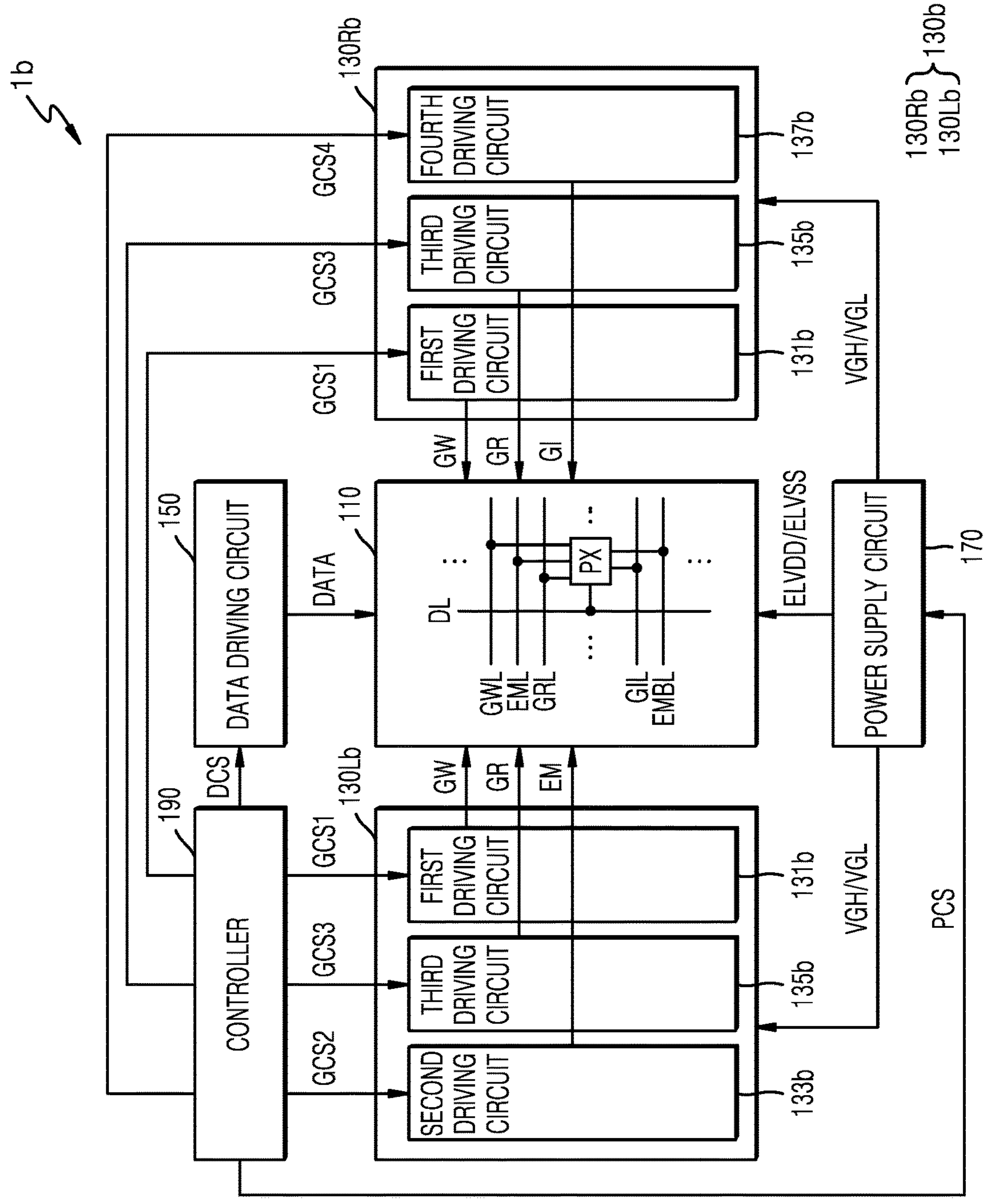
FIG. 13 is a diagram schematically showing a display device according to an embodiment.
Figure 14:
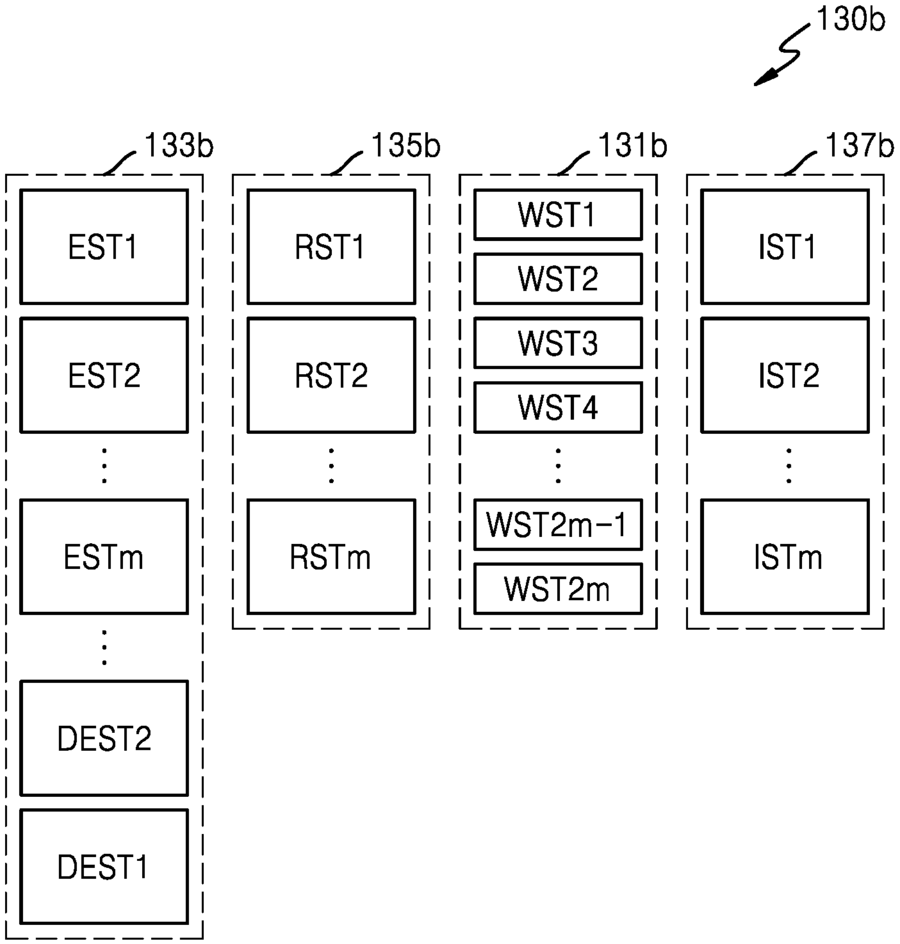
FIG. 14 is a diagram schematically showing a portion of a gate driving circuit of FIG. 13.
Figure 15A:
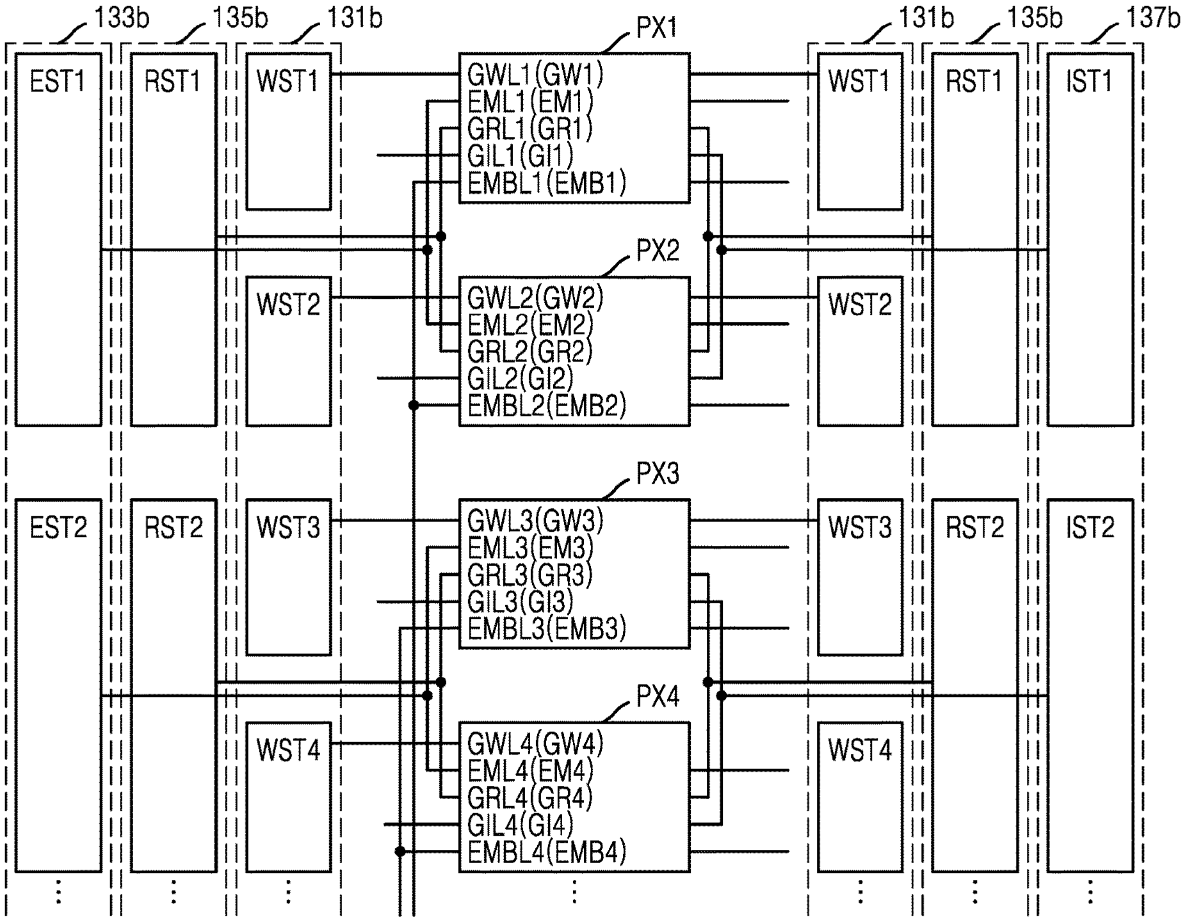
FIGS. 15A to 15C are diagrams schematically showing some stages, for describing an operation of a pixel of FIG. 13.
Figure 15B:
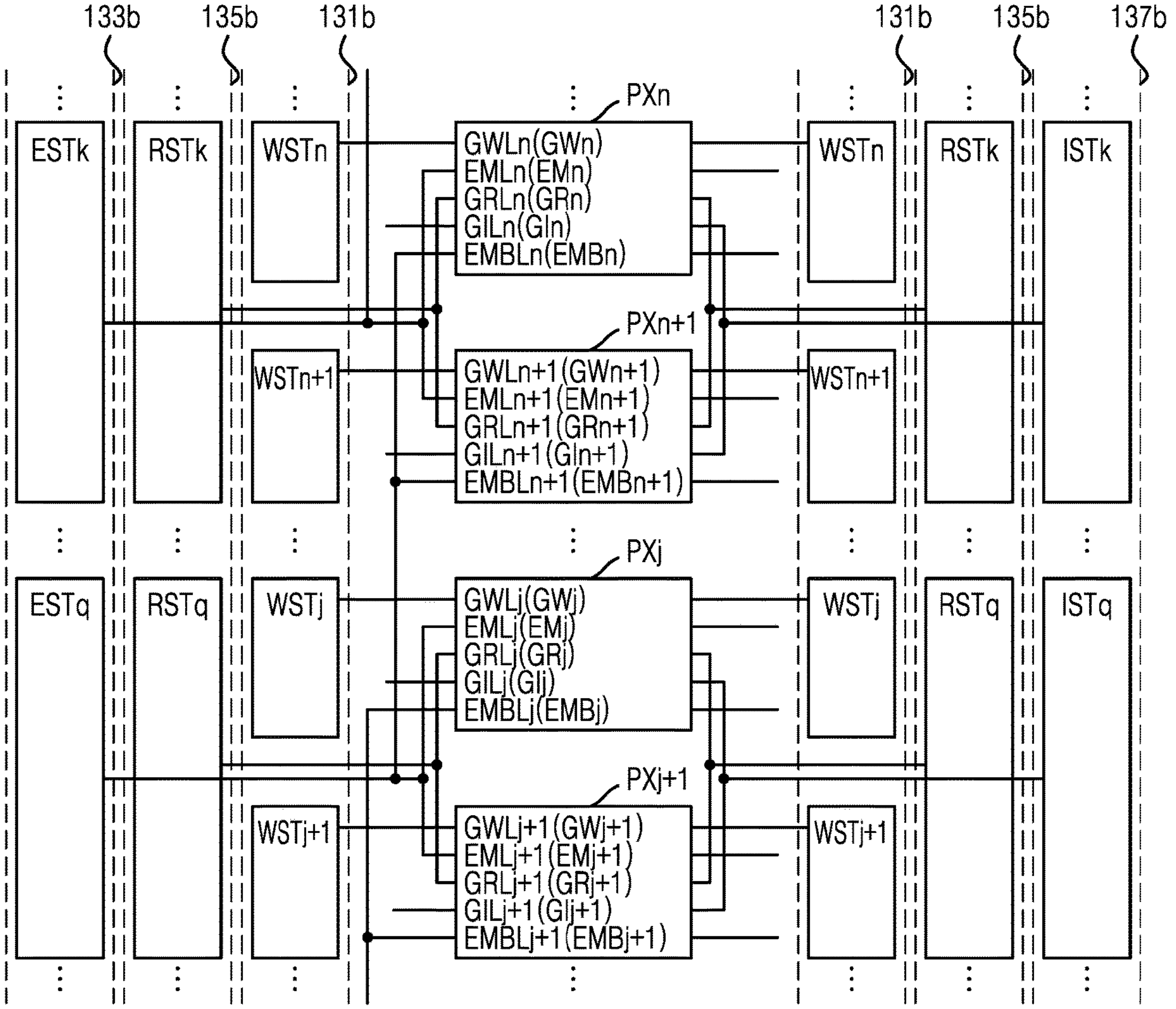
Figure 15C:
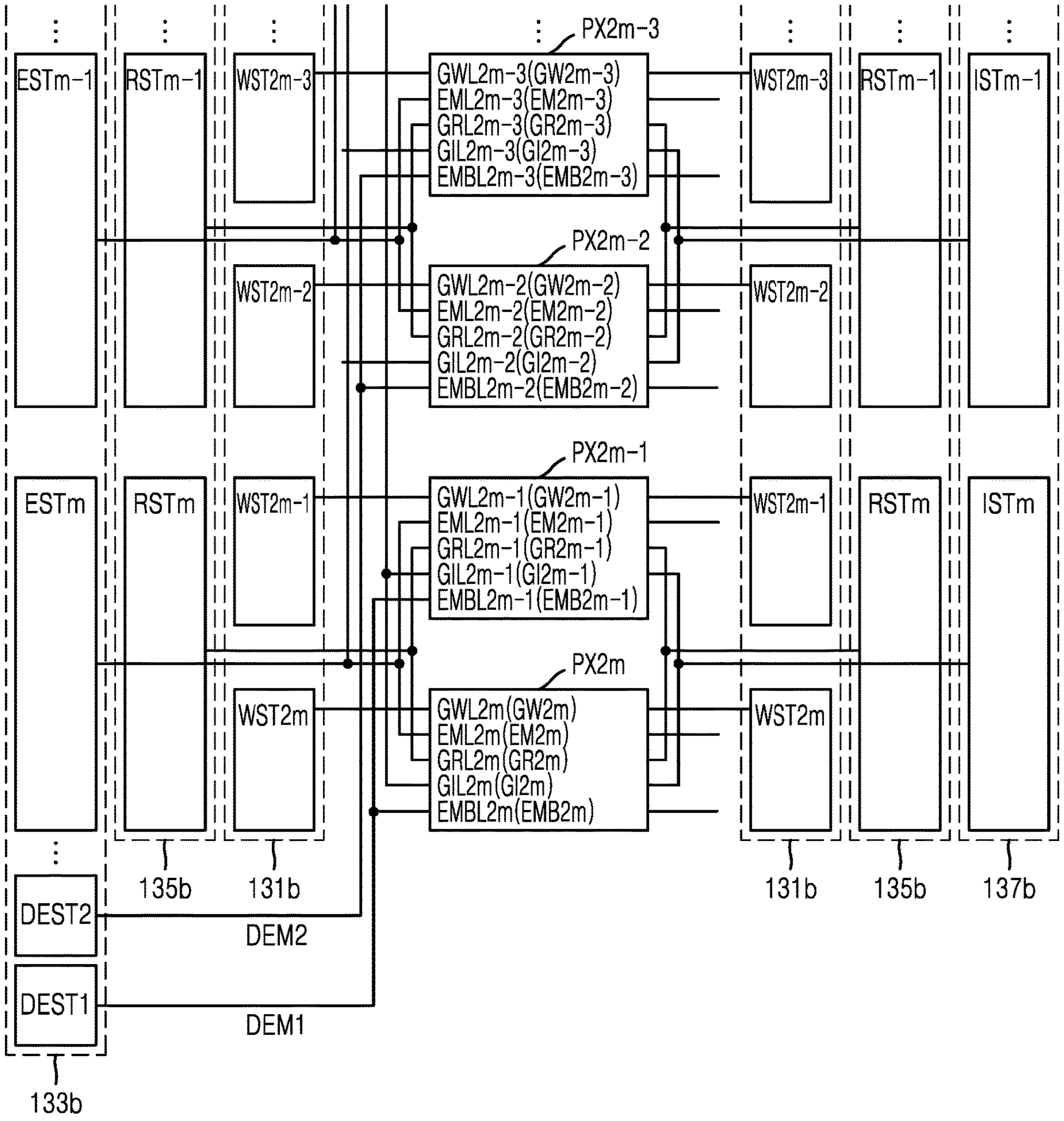
Figure 16:
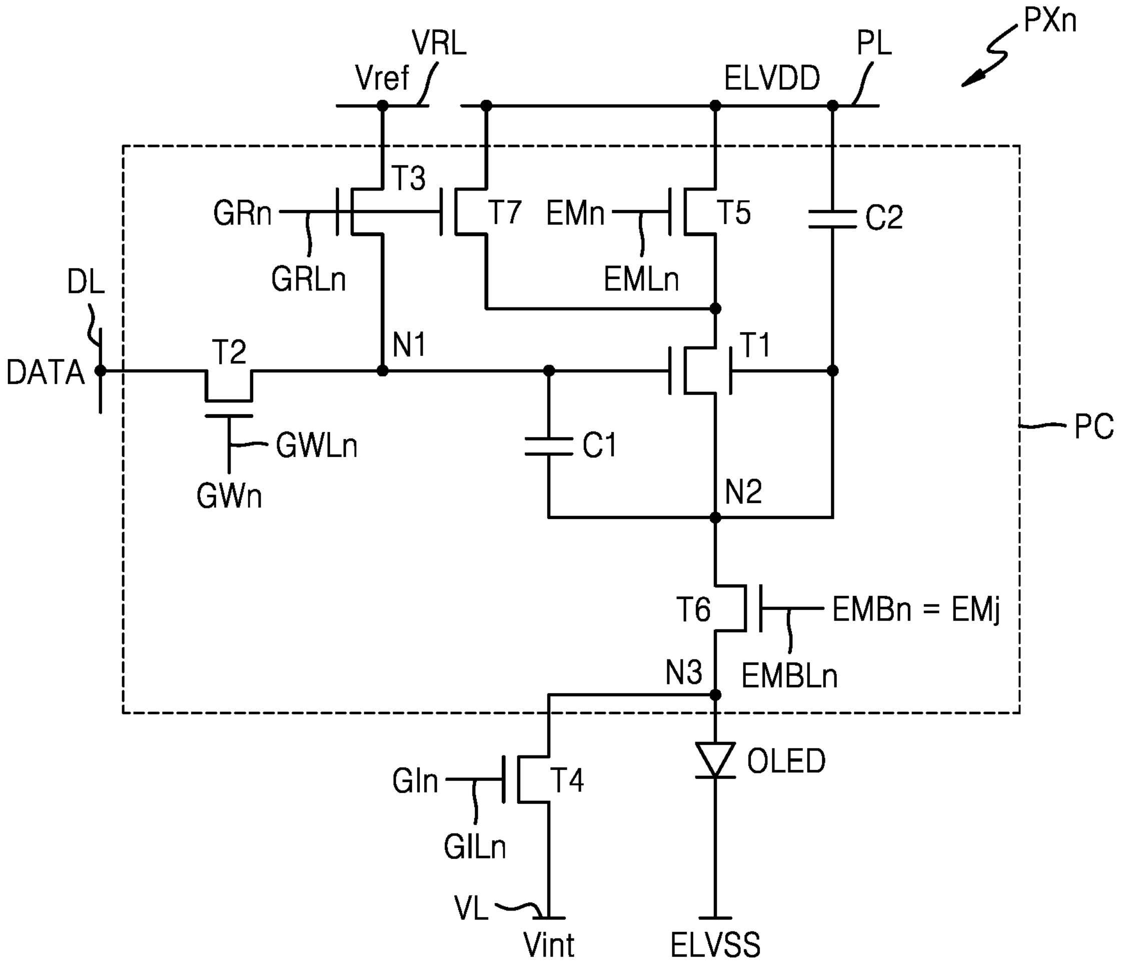
FIG. 16 is a diagram showing a pixel arranged in an n-th row in a pixel unit of FIG. 13.
Figure 17:
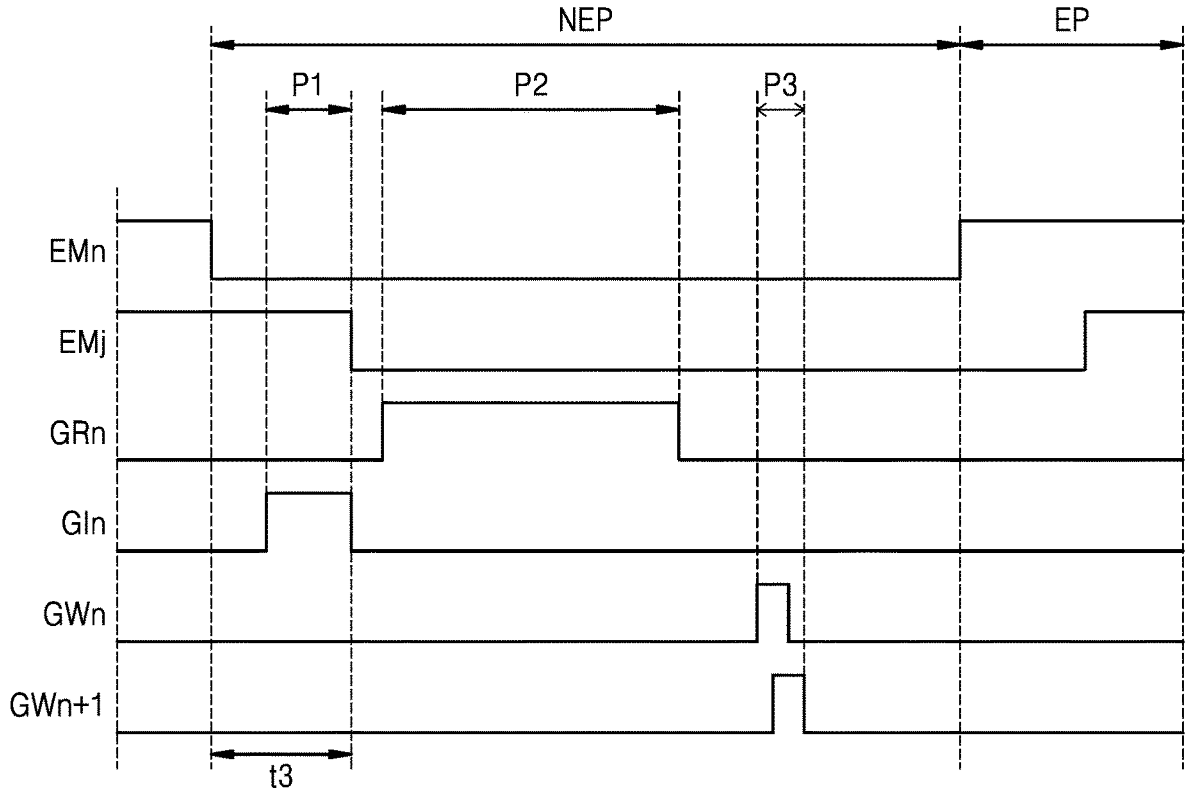
FIG. 17 is a diagram showing gate signals output by the gate driving circuit of FIG. 13.

FIG. 13 is a diagram schematically showing a display device 1*b* according to an embodiment. FIG. 14 is a diagram schematically showing a portion of a gate driving circuit 130*b* of FIG. 13. FIGS. 15A to 15C are diagrams schematically showing some stages, for describing an operation of a pixel of FIG. 13. FIG. 16 is a diagram showing the n-th pixel PXn arranged in the n-th row in the pixel unit 110 of FIG. 13. FIG. 17 is a diagram showing gate signals output by the gate driving circuit 130*b* of FIG. 13. In FIGS. 13 to 17, like reference numerals are used for elements, periods, and signals described with reference to FIGS. 3 to 12, and redundant descriptions thereof will be omitted.

Referring to FIG. 13, the gate driving circuit 130*b* of the display device 1*b* may include a first gate driving circuit 130Lb and a second gate driving circuit 130Rb. The first gate driving circuit 130Lb may include a first driving circuit 131*b*, a second driving circuit 133*b*, and a third driving circuit 135*b*. The second gate driving circuit 130Rb may include the first driving circuit 131*b*, the third driving circuit 135*b*, and a fourth driving circuit 137*b*.

The first driving circuit 131*b* may be connected to the plurality of first gate lines GWL, and configured to supply the first gate signal GW sequentially to the first gate lines GWL according to the first control signal GCS1. As shown in FIG. 14, the first driving circuit 131*b* may include the plurality of stages WST1 to WST2*m*, which are sequentially connected to each other. The first driving circuit 131*b* may be substantially the same as or similar to the first driving circuit 131*a* of FIG. 9.

The second driving circuit 133*b* may be connected to the plurality of fourth gate lines EML, and configured to supply the fourth gate signal EM sequentially to the fourth gate lines EML according to the second control signal GCS2. As shown in FIG. 14, the second driving circuit 133*b* may include the plurality of stages EST1 to ESTm, which are sequentially connected to each other, and the plurality of dummy stages DEST1, DEST2, and so on, which are sequentially connected to the last m-th stage ESTm. The second driving circuit 133*b* may be substantially the same as or similar to the second driving circuit 133*b* of FIG. 9.

The third driving circuit 135*b* may be connected to the plurality of third gate lines GRL, and configured to supply the third gate signal GR sequentially to the third gate lines GRL according to the third control signal GCS3. As shown in FIG. 14, the third driving circuit 135*b* may include the plurality of stages RST1 to RSTm, which are sequentially connected to each other. The third driving circuit 135*b* may be substantially the same as or similar to the third driving circuit 135 of FIG. 5.

The fourth driving circuit 137*b* may be connected to the plurality of second gate lines GIL, and configured to supply the second gate signal GI sequentially to the second gate lines GIL according to the fourth control signal GCS4. As shown in FIG. 14, the fourth driving circuit 137*b* may include the plurality of stages IST1 to ISTm, which are sequentially connected to each other. The fourth driving circuit 137*b* may be substantially the same as or similar to the fourth driving circuit 137 of FIG. 5.

Referring to FIG. 15A, the first pixel PX1 may be configured to receive the first first-gate signal GW1 through the first first-gate line GWL1 from the first stage WST1 of the first driving circuit 131*b*, and the second pixel PX2 may be configured to receive the second first-gate signal GW2 through the second first-gate line GWL2 from the second stage WST2 of the first driving circuit 131*b*.

The fourth gate signal EM output by the first stage EST1 of the second driving circuit 133*b*, the third gate signal GR output by the first stage RST1 of the third driving circuit 135*b*, and the second gate signal GI output by the first stage IST1 of the fourth driving circuit 137*b* may be simultaneously supplied to the first pixel PX1 and the second pixel PX2.

The first pixel PX1 may be configured to receive the first fourth-gate signal EM1 through the first fourth-gate line EML1 from the first stage EST1 of the second driving circuit 133*b*, receive the first third-gate signal GR1 through the first third-gate line GRL1 from the first stage RST1 of the third driving circuit 135*b*, and receive the first second-gate signal G11 through the first second-gate line GIL1 from the first stage IST1 of the fourth driving circuit 137*b*.

The second pixel PX2 may be configured to receive the second fourth-gate signal EM2 through the second fourth-gate line EML2 from the first stage EST1 of the second driving circuit 133*b*, receive the second third-gate signal GR2 through the second third-gate line GRL2 from the first stage RST1 of the third driving circuit 135*b*, and receive the second second-gate signal G12 through the second second-gate line GIL2 from the first stage IST1 of the fourth driving circuit 137*b*.

Each of the first pixel PX1 and the second pixel PX2 may be configured to receive the fourth gate signal EM output to the fourth gate line EML of a corresponding row by a next stage EST after a certain number from the first stage EST1 of the second driving circuit 133*b*, as the first fifth-gate signal EMB1 through the first fifth-gate line EMBL1 and as the second fifth-gate signal EMB2 through the second fifth-gate line EMBL2.

Referring to FIG. 15B, the n-th pixel PXn may be configured to receive the n-th first gate signal GWn through the n-th first gate line GWLn from the n-th stage WSTn of the first driving circuit 131*b*, and the (n+1)th pixel PXn+1 may be configured to receive the (n+1)th first gate signal GWn+1 through the (n+1)th first gate line GWLn+1 from the (n+1)th stage WSTn+1 of the first driving circuit 131*b*.

The fourth gate signal EM output by the k-th stage ESTk of the second driving circuit 133*b*, the third gate signal GR output by the k-th stage RSTk of the third driving circuit 135*b*, and the second gate signal GI output by a k-th stage ISTk of the fourth driving circuit 137*b* may be simultaneously supplied to the n-th pixel PXn and the (n+1)th pixel PXn+1.

The n-th pixel PXn may be configured to receive the n-th fourth gate signal EMn through the n-th fourth gate line EMLn from the k-th stage ESTk of the second driving circuit 133*b*, receive the n-th third gate signal GRn through the n-th third gate line GRLn from the k-th stage RSTk of the third driving circuit 135*b*, and receive the n-th second gate signal Gin through the n-th second gate line GILn from the k-th stage ISTk of the fourth driving circuit 137*b*.

The (n+1)th pixel PXn+1 may be configured to receive the (n+1)th fourth gate signal EMn+1 through the (n+1)th fourth gate line EMLn+1 from the k-th stage ESTk of the second driving circuit 133*b*, receive the (n+1)th third gate signal GRn+1 through the (n+1)th third gate line GRLn+1 from the k-th stage RSTk of the third driving circuit 135*b*, and receive the (n+1)th second gate signal GIn+1 through the (n+1)th second gate line GILn+1 from the k-th stage ISTk of the fourth driving circuit 137*b*.

The fourth gate signal EM output by the q-th stage ESTq of the second driving circuit 133*b* may be simultaneously supplied as the j-th fourth gate signal EMj through the j-th fourth gate line EMLj to the j-th pixel PXj, and as the (j+1)th fourth gate signal EMj+1 through the (j+1)th fourth gate line EMLj+1 to the (j+1)th pixel PXj+1. Also, the fourth gate signal EM output by the q-th stage ESTq of the second driving circuit 133*b* may be supplied to the n-th pixel PXn as the n-th fifth gate signal EMBn through the n-th fifth gate line EMBLn, and supplied to the (n+1)th pixel PXn+1 as the (n+1)th fifth gate signal EMBn+1 through the (n+1)th fifth gate line EMBLn+1. Accordingly, the n-th fifth gate signal EMBn of the n-th pixel PXn and the (n+1)th fifth gate signal EMBn+1 of the (n+1)th pixel PXn+1 may be the same as the j-th fourth gate signal EMj and the (j+1)th fourth gate signal EMj+1.

The fourth gate signal EM output by the k-th stage ESTk of the second driving circuit 133*b* may be supplied to the fifth gate lines EMBL of each row corresponding to previous stage before a certain number.

Referring to FIG. 15C, the (2*m*-1)th pixel PX2*m*-1 may be configured to receive the (2*m*-1)th first gate signal GW2*m*-1 through the (2*m*-1)th first gate line GWL2*m*-1 from the (2*m*-1)th stage WST2*m*-1 of the first driving circuit 131*b*, and the (2*m*)th pixel PX2*m* may be configured to receive the (2*m*)th first gate signal GW2*m* through the (2*m*)th first gate line GWL2*m* from the (2*m*)th stage WST2*m* of the first driving circuit 131*b*.

The fourth gate signal EM output by the m-th stage ESTm of the second driving circuit 133*b*, the third gate signal GR output by the m-th stage RSTm of the third driving circuit 135*b*, and the second gate signal GI output by an m-th stage ISTm of the fourth driving circuit 137*b* may be simultaneously supplied to the (2*m*-1)th pixel PX2*m*-1 and the (2*m*)th pixel PX2*m*.

The (2*m*-1)th pixel PX2*m*-1 may be configured to receive the (2*m*-1)th fourth gate signal EM2*m*-1 through the (2*m*-1)th fourth gate line EML2*m*-1 from the m-th stage ESTm of the second driving circuit 133*b*, receive the (2*m*-1)th third gate signal GR2*m*-1 through the (2*m*-1)th third gate line GRL2*m*-1 from the m-th stage RSTm of the third driving circuit 135*b*, and receive an (2*m*-1)th second gate signal G12*m*-1 through a (2*m*-1)th second gate line GIL2*m*-1 from the m-th stage ISTm of the fourth driving circuit 137*b*.

The (2*m*)th pixel PX2*m* may be configured to receive the (2*m*)th fourth gate signal EM2*m* through the (2*m*)th fourth gate line EML2*m* from the m-th stage ESTm of the second driving circuit 133*b*, receive the (2*m*)th third gate signal GR2*m* through the (2*m*)th third gate line GRL2*m* from the m-th stage RSTm of the third driving circuit 135*b*, and receive a (2*m*)th second gate signal G12*m* through a (2*m*)th second gate line GIL2*m* from the m-th stage ISTm of the fourth driving circuit 137*b*.

Each of the (2*m*-1)th pixel PX2*m*-1 and the (2*m*)th pixel PX2*m* may be configured to receive the signal DEM1 output by the first dummy stage DEST1 of the second driving circuit 133*b* as the (2*m*-1)th fifth gate signal EMB2*m*-1 through the (2*m*-1)th fifth gate line EMBL2*m*-1, and as the (2*m*)th fifth gate signal EMB2*m* through the (2*m*)th fifth gate line EMBL2*m*.

The fourth gate signal EM output by each of the (m-1)th stage ESTm-1 and the m-th stage ESTm of the second driving circuit 133*b* may be supplied to the fifth gate line EMBL of each row corresponding to the previous stage before the certain number.

According to an embodiment, when the j-th row is a row spaced apart from the n-th row by 6 rows backward, the second driving circuit 133*b* may include three dummy stages DEST1 to DEST3. Some stages EST4 to ESTm from among the plurality of stages EST1 to ESTm and the dummy stages DEST1 to DEST3 may each be configured to supply the fourth gate signal EM as the fifth gate signal EMB to a pair of fifth gate lines EMBL corresponding to a stage EST spaced apart by 3 stages forward. When the fourth gate signals EM output by the neighboring stages EST are shifted by 2H (2 horizontal periods), the j-th fourth gate signal EMj may be shifted from the n-th fourth gate signal EMn by t3 (e.g., 6H: 6 horizontal periods) in FIG. 17.

Referring to FIG. 16, the pixel PX included in the pixel unit 110 of the display device 1*b* differs from the pixel PX of FIG. 3 in that the pixel PX of FIG. 16 further includes a seventh transistor T7 and the sixth transistor T6 is configured to receive the fourth gate signal EM as the fifth gate signal EMB.

The seventh transistor T7 may be connected to the fifth transistor T5 in parallel. The seventh transistor T7 may be connected between the driving voltage line PL and the first terminal of the first transistor T1. A gate of the seventh transistor T7 may be configured to receive the third gate signal GR by being connected to the third gate line GRL.

Referring to FIG. 17, the fourth period P4 may be omitted from among the first to fourth periods P1 to P4 shown in FIG. 7, and signals supplied during the first period P1 and second period P2 differ from signals supplied during the first period P1 and second period P2 of FIG. 7. Hereinafter, the n-th pixel PXn will be described as an example.

During the first period P1, the n-th second gate signal GIn may be supplied (applied) to the n-th second gate line GILn, and the j-th fourth gate signal EMj of a gate-on voltage may be supplied as the n-th fifth gate signal EMBn to the n-th fifth gate line EMBLn. The second terminal of the first transistor T1 and the pixel electrode of the organic light-emitting diode OLED may be initialized to the initialization voltage Vint by the turned-on sixth transistor T6 and turned-on fourth transistor T4.

During the second period P2, the n-th third gate signal GRn of a gate-on voltage may be supplied to the n-th third gate line GRLn. The threshold voltage Vth of the first transistor T1 may be compensated for by the turned-on third transistor T3 and seventh transistor T7.

During the third period P3, the n-th first gate signal GWn of a gate-on voltage and the (n+1)th first gate signal GWn+1 of a gate-on voltage are sequentially supplied to the n-th first gate line GWLn and the (n+1)th first gate line GWLn+1, respectively, and thus the data signal DATA may be supplied to each of the n-th pixel PXn and (n+1)th pixel PXn+1.

During the emitting period EP, the n-th fourth gate signal EMn and the j-th fourth gate signal EMj shifted from the n-th fourth gate signal EMn by t3 may be sequentially supplied in gate-on voltages. The organic light-emitting diode OLED may emit light by the turned-on fifth transistor T5 and sixth transistor T6.

In the present embodiment, the fourth gate signal EM output by the second driving circuit 133*b* may be used as the fifth gate signal EMB, and thus the fifth driving circuit 139 of FIG. 5 may be omitted, thereby reducing a non-display area.

Figure 18:
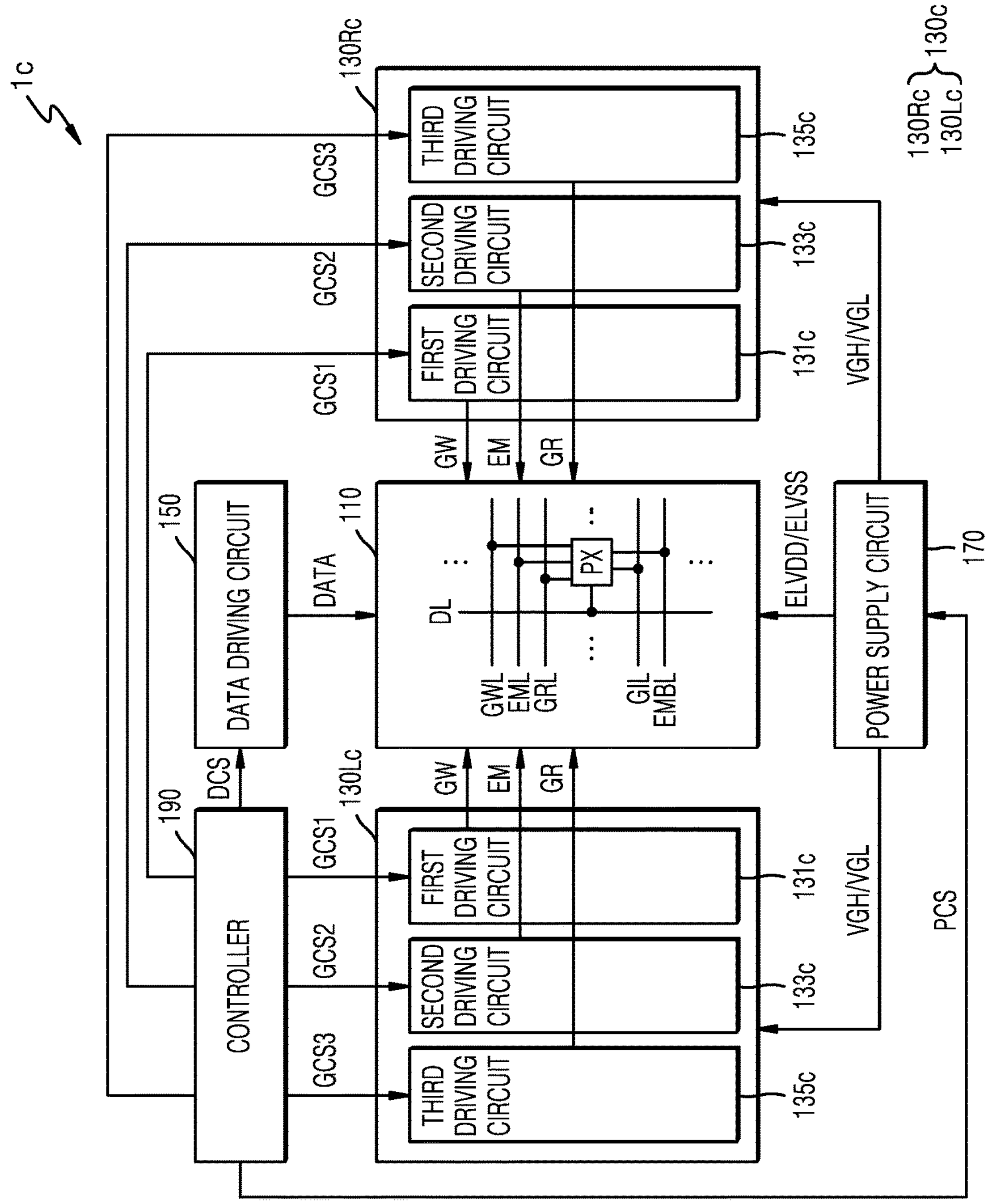
FIG. 18 is a diagram schematically showing a display device according to an embodiment.
Figure 19:
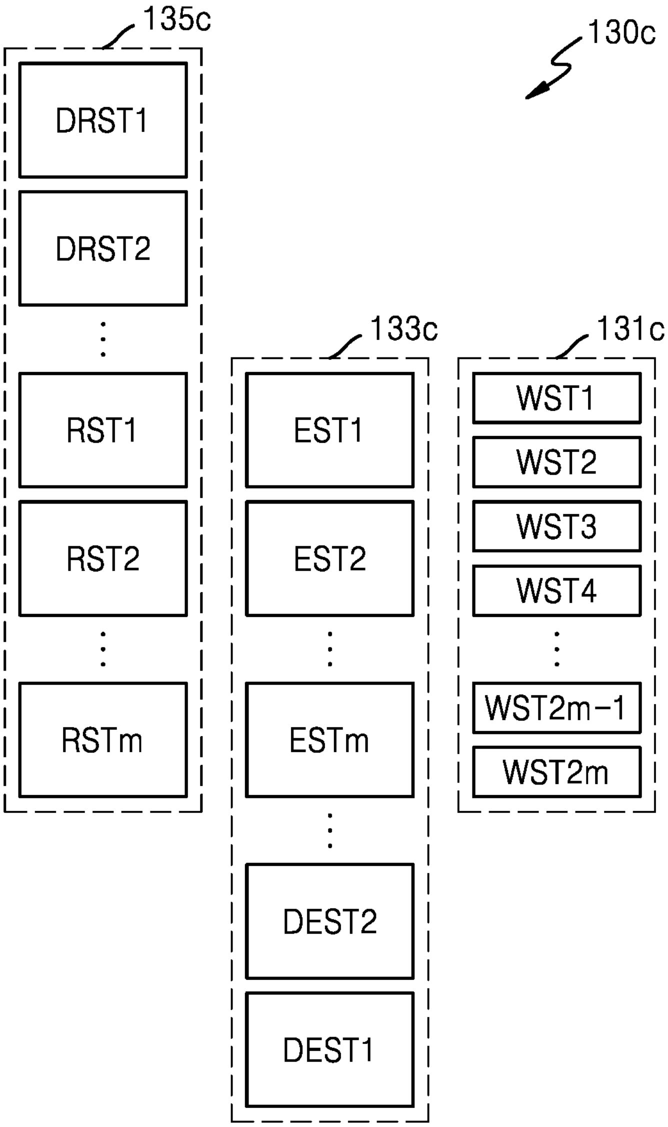
FIG. 19 is a diagram schematically showing a portion of a gate driving circuit of FIG. 18.
Figure 20:
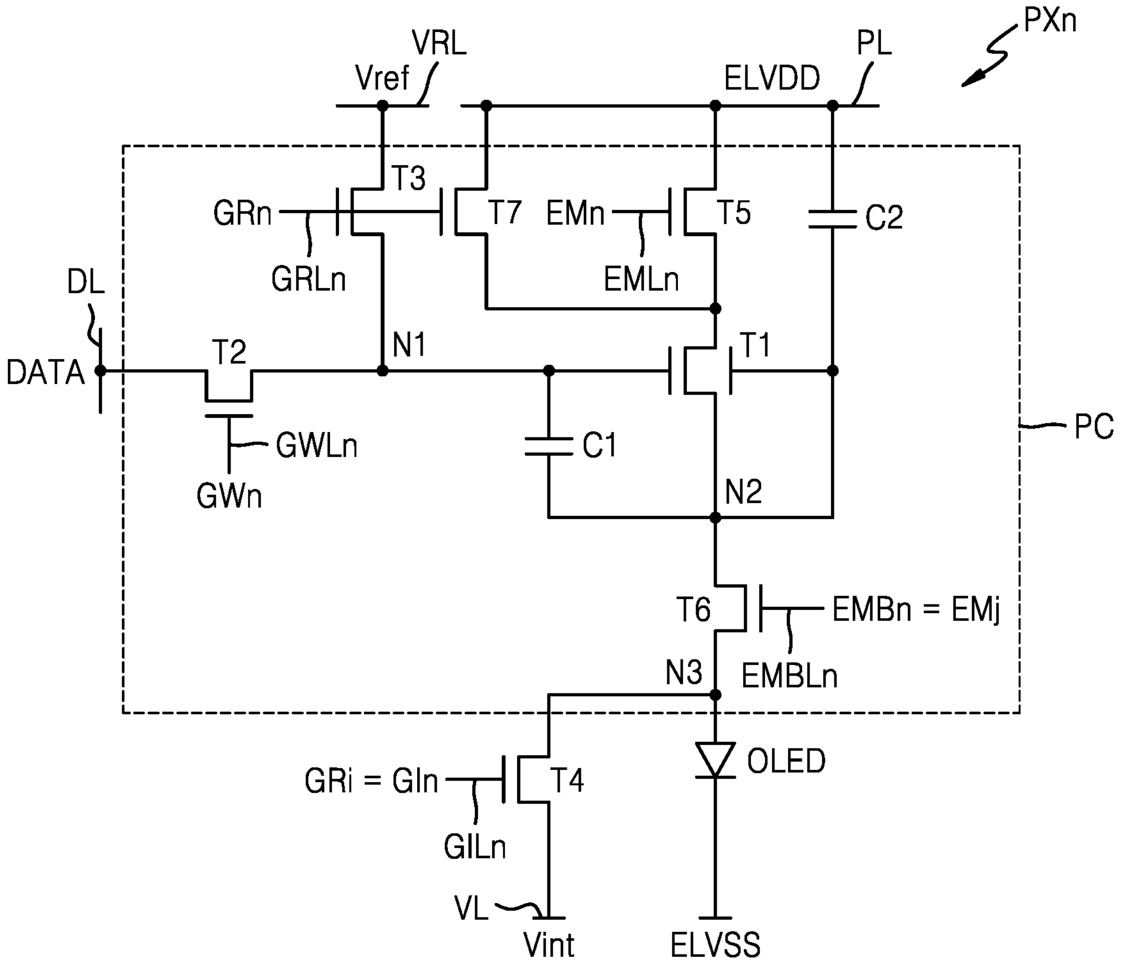
FIG. 20 is a diagram showing a pixel arranged in an n-th row in a pixel unit of FIG. 18.
Figure 21:
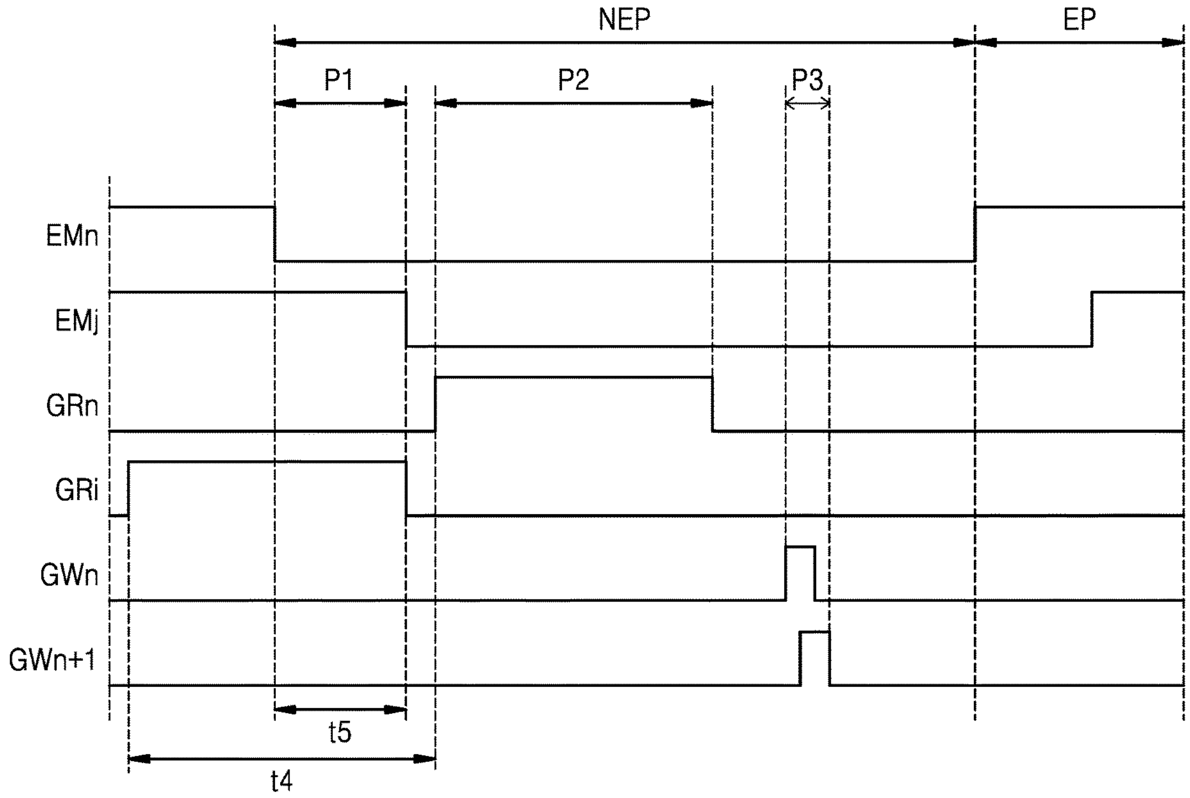
FIG. 21 is a diagram showing gate signals output by the gate driving circuit of FIG. 18.

FIG. 18 is a diagram schematically showing a display device 1*c* according to an embodiment. FIG. 19 is a diagram schematically showing a portion of a gate driving circuit 130*c* of FIG. 18. FIG. 20 is a diagram showing the n-th pixel PXn arranged in the n-th row in the pixel unit 110 of FIG. 18. FIG. 21 is a diagram showing gate signals output by the gate driving circuit 130*c* of FIG. 18. In FIGS. 18 to 21, like reference numerals are used for elements, periods, and signals described with reference to FIGS. 3 to 17, and redundant descriptions thereof will be omitted.

Referring to FIG. 18, the gate driving circuit 130*c* of the display device 1*c* may include a first gate driving circuit 130Lc and a second gate driving circuit 130Rc. The first gate driving circuit 130Lc and the second gate driving circuit 130Rc may each include a first driving circuit 131*c*, a second driving circuit 133*c*, and a third driving circuit 135*c*.

The first driving circuit 131*c*, the second driving circuit 133*c*, and the third driving circuit 135*c* may be substantially the same as or similar to the first driving circuit 131*a*, the second driving circuit 133*a*, and the third driving circuit 135*a* of FIG. 9, respectively. Gate signals output from the first driving circuit 131*c*, the second driving circuit 133*c*, and the third driving circuit 135*c* are similar to gate signals output from the first driving circuit 131*a*, the second driving circuit 133*a*, and the third driving circuit 135*a* of FIGS. 10A to 10C, respectively, and thus descriptions thereof are not provided below.

According to an embodiment, the i-th row is a row spaced apart from the n-th row by 28 rows forward, and the j-th row may be a row spaced apart from the n-th row by 6 rows backward. In this case, the third driving circuit 135*c* may include 14 dummy stages DRST1 to DRST14, and the second driving circuit 133*c* may include 3 dummy stages DEST1 to DEST3. Some stages RST1 to RSTm-14 from among the plurality of stages RST1 to RSTm and the dummy stages DRST1 to DRST14 may each be configured to supply the third gate signal GR as the second gate signal GI to a pair of second gate lines GIL corresponding to a stage RST spaced apart by 14 stages backward. Some stages EST4 to ESTm from among the plurality of stages EST1 to ESTm and the dummy stages DEST1 to DEST3 may each be configured to supply the fourth gate signal EM as the fifth gate signal EMB to a pair of fifth gate lines EMBL corresponding to a stage EST spaced apart by 3 stages forward. When the third gate signals GR output by the neighboring stages RST are shifted by 2H (2 horizontal periods), and the fourth gate signals EM output by the neighboring stages EST are shifted by 2H (2 horizontal periods), the n-th third gate signal GRn may be output by being shifted by t4 (e.g., 28H: 28 horizontal periods) from the i-th third gate signal GRi and the j-th fourth gate signal EMj may be output by being shifted by t5 (e.g., 6H: 6 horizontal periods) from the n-th fourth gate signal EMn, in FIG. 21.

Referring to FIG. 20, the pixel PX included in the pixel unit 110 of the display device 1*c* differs from the pixel PX of FIG. 16 in that the fourth transistor T4 is configured to receive the third gate signal GR as the second gate signal GI.

FIG. 21 differs from FIG. 17 with respect to a gate signal supplied during the first period P1 from among the first to third periods P1 to P3, and gate signals supplied during other periods may be the same or similar. Hereinafter, differences will be described with reference to the n-th pixel PXn as an example.

During the first period P1, the i-th third gate signal GRi of a gate-on voltage may be supplied to the n-th second gate line GILn, and the j-th fourth gate signal EMj of a gate-on voltage may be supplied to the n-th fifth gate line EMBLn. The second terminal of the first transistor T1 and the pixel electrode of the organic light-emitting diode OLED may be initialized to the initialization voltage Vint by the turned-on sixth transistor T6 and turned-on fourth transistor T4.

In the present embodiment, the third gate signal GR output by the third driving circuit 135*c* and the fourth gate signal EM output by the second driving circuit 133*c* may be used as the second gate signal GI and the fifth gate signal EMB, and thus the fourth driving circuit 137 and the fifth driving circuit 139 of FIG. 5 may be omitted, thereby reducing a non-display area.

Figure 22:
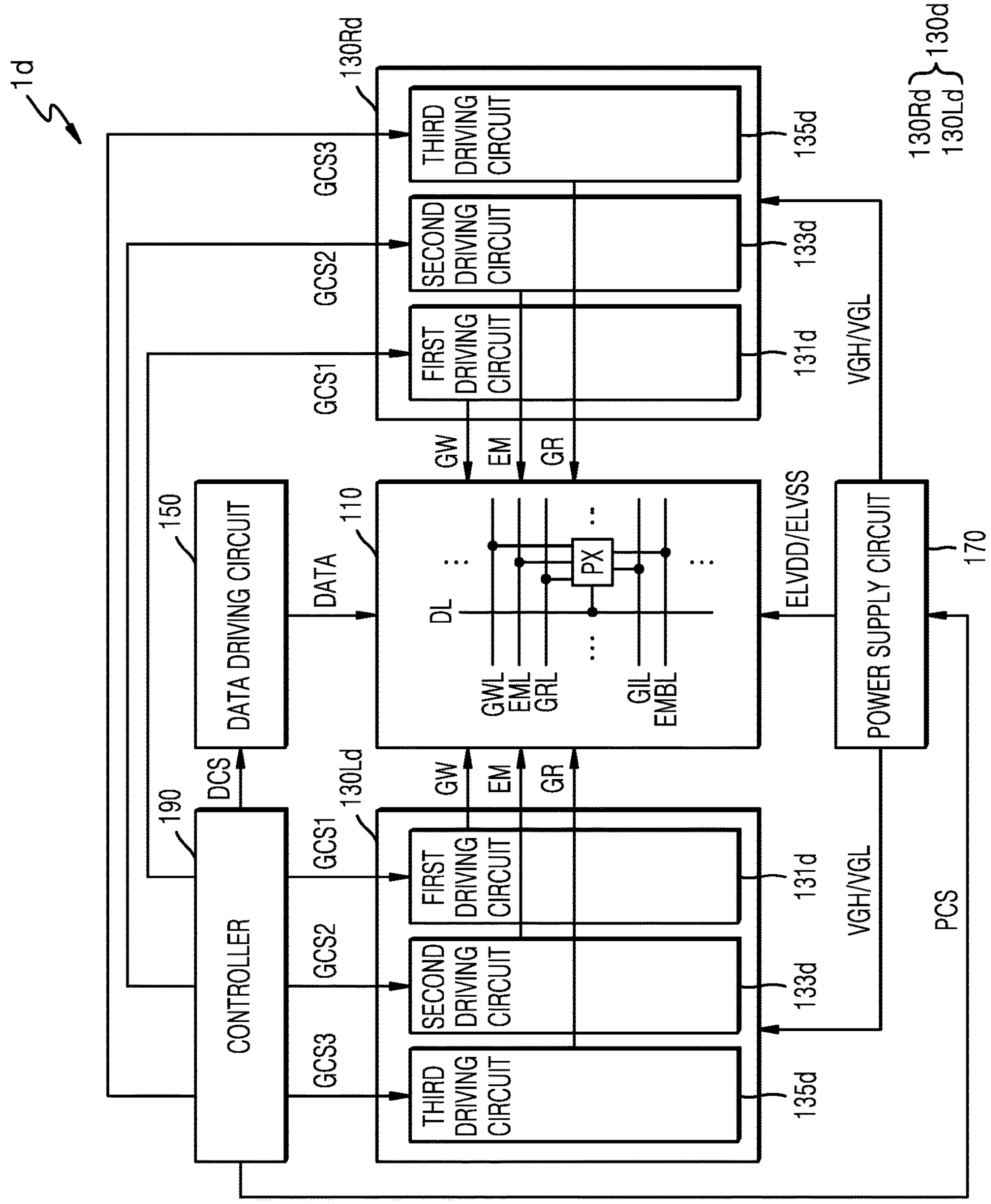
FIG. 22 is a diagram schematically showing a display device according to an embodiment.
Figure 23:
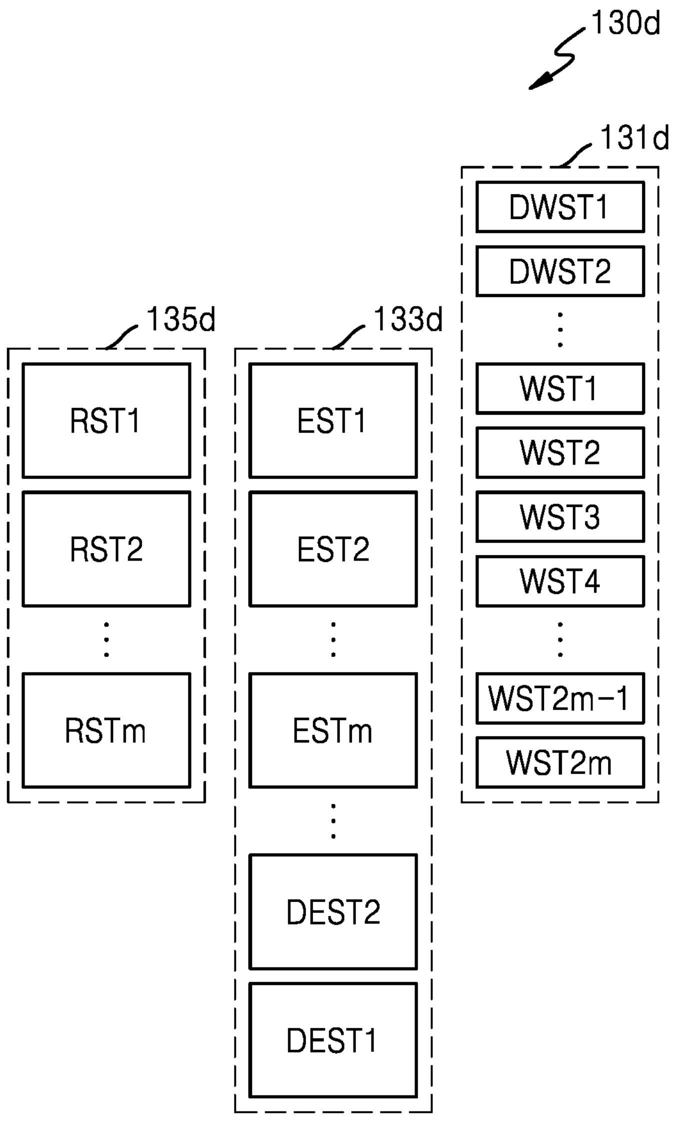
FIG. 23 is a diagram schematically showing a portion of a gate driving circuit of FIG. 22.
Figure 24A:
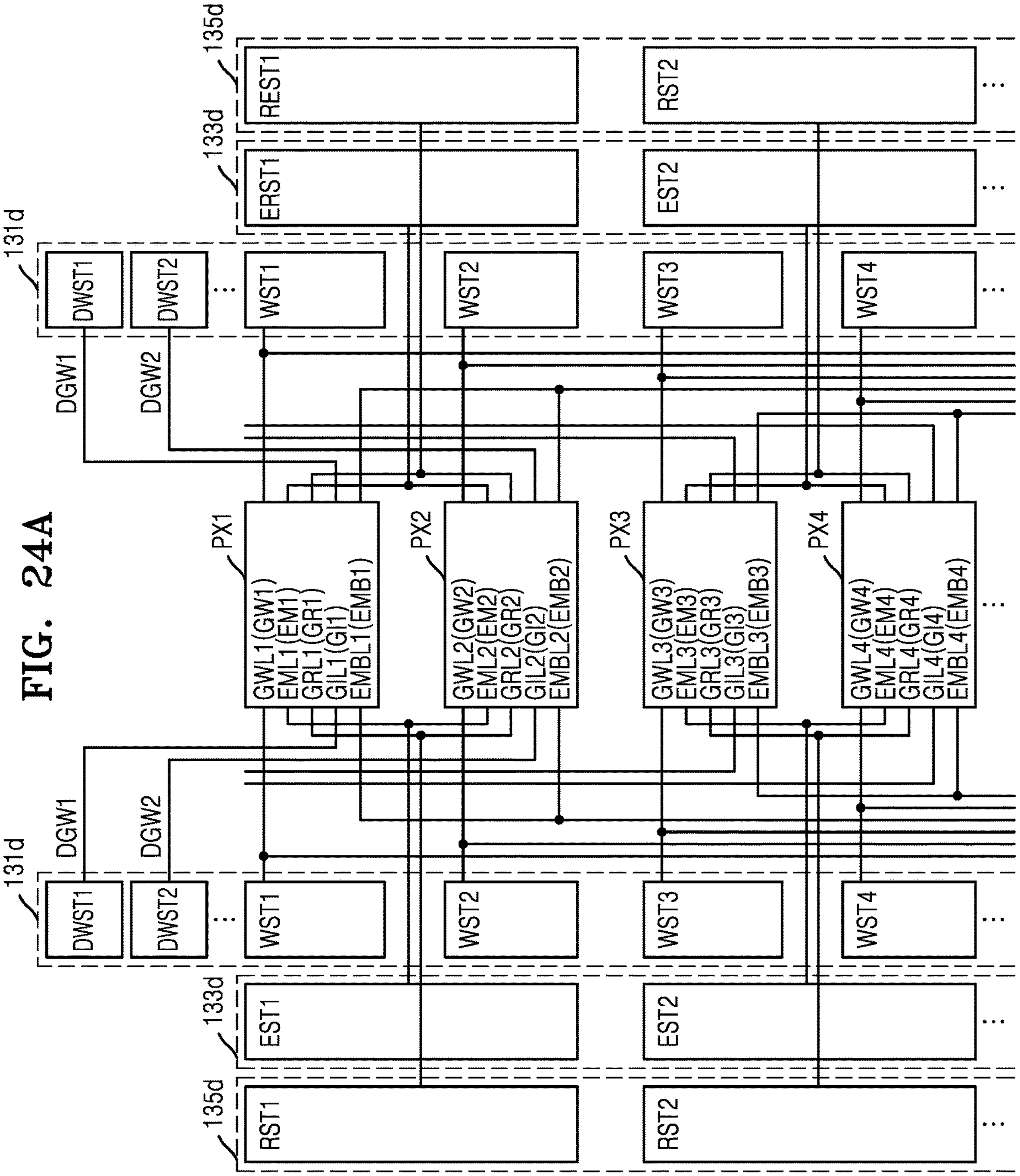
FIGS. 24A to 24C are diagrams schematically showing some stages, for describing an operation of a pixel of FIG. 22.
Figure 24B:
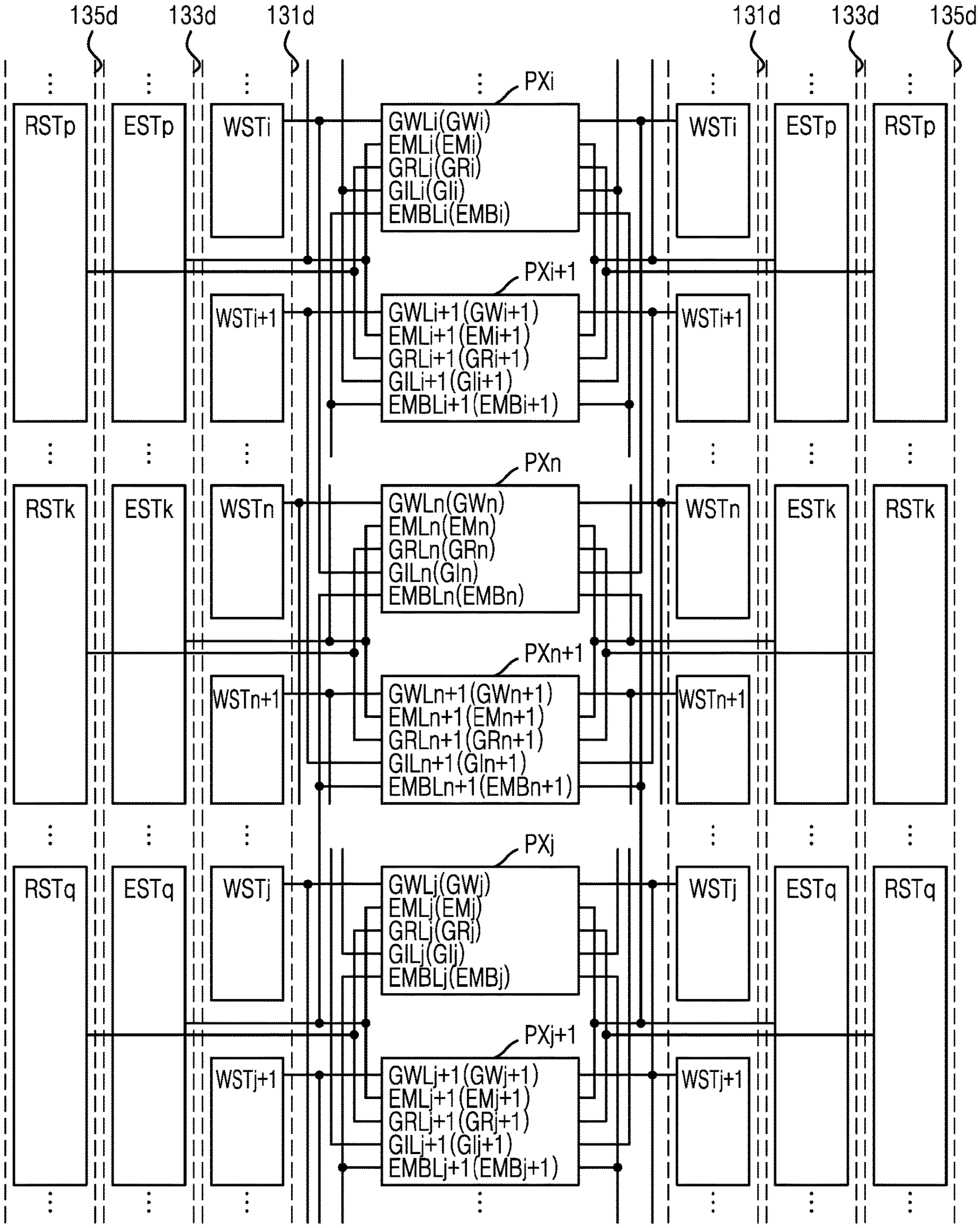
Figure 24C:
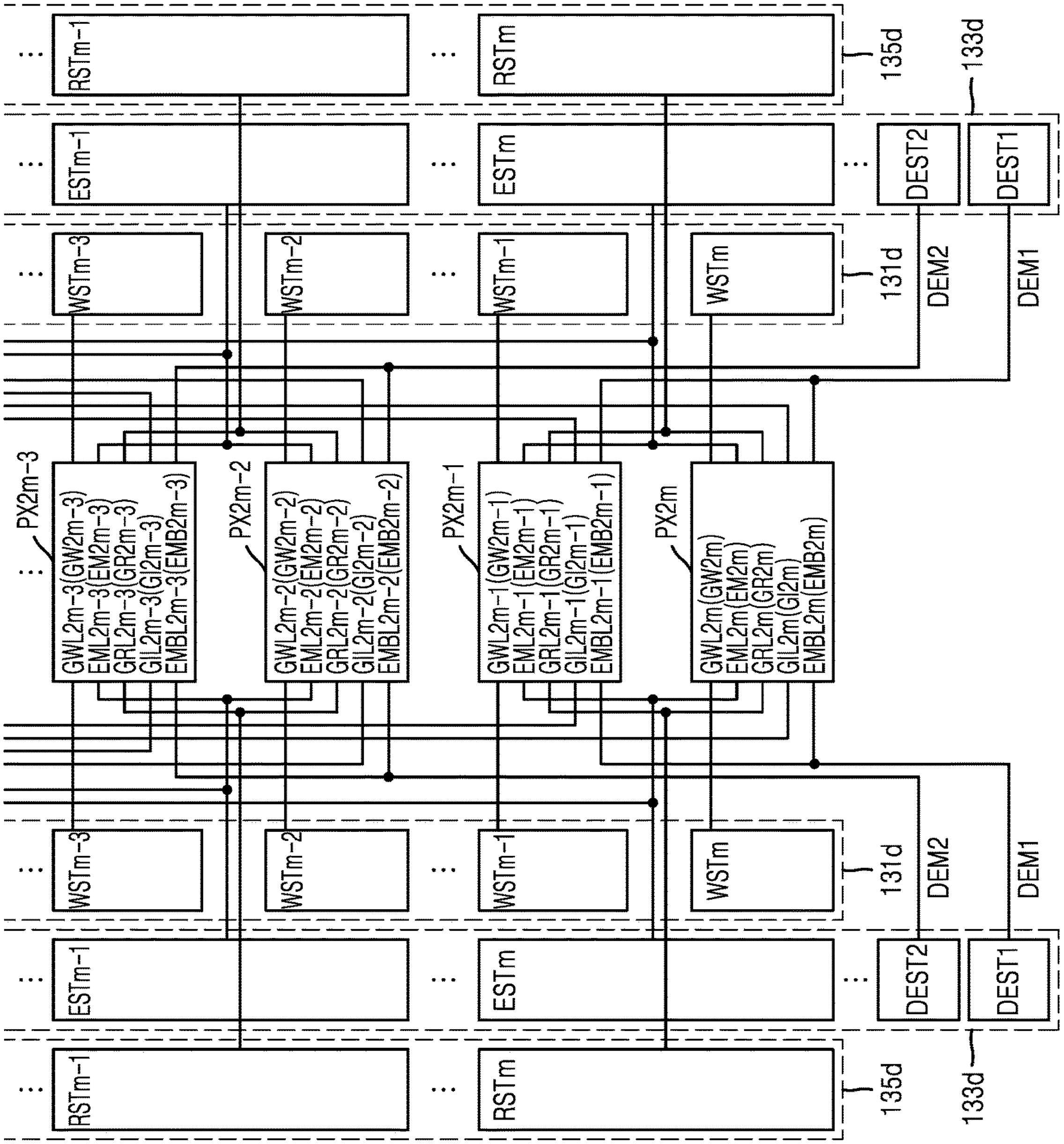
Figure 25:
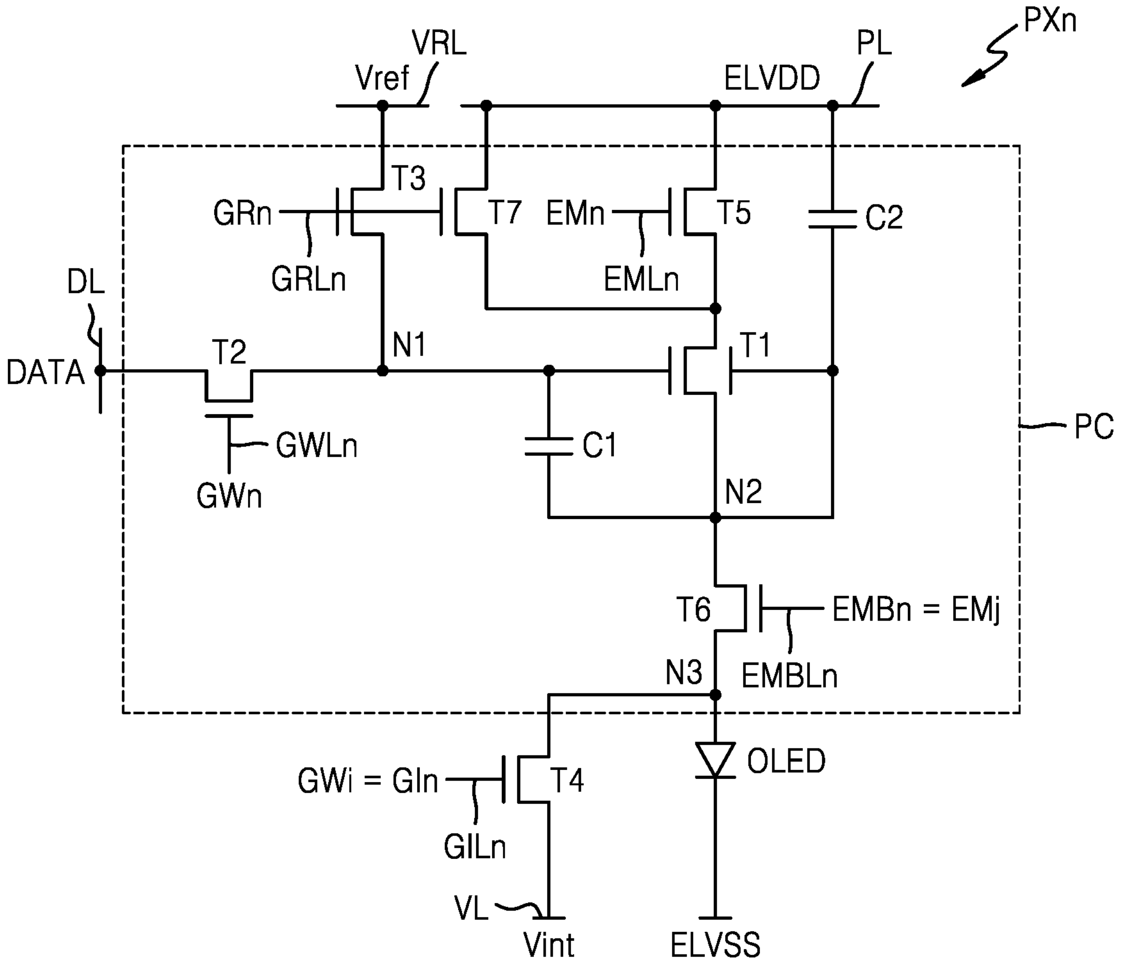
FIG. 25 is a diagram showing a pixel arranged in an n-th row in a pixel unit of FIG. 22.
Figure 26:
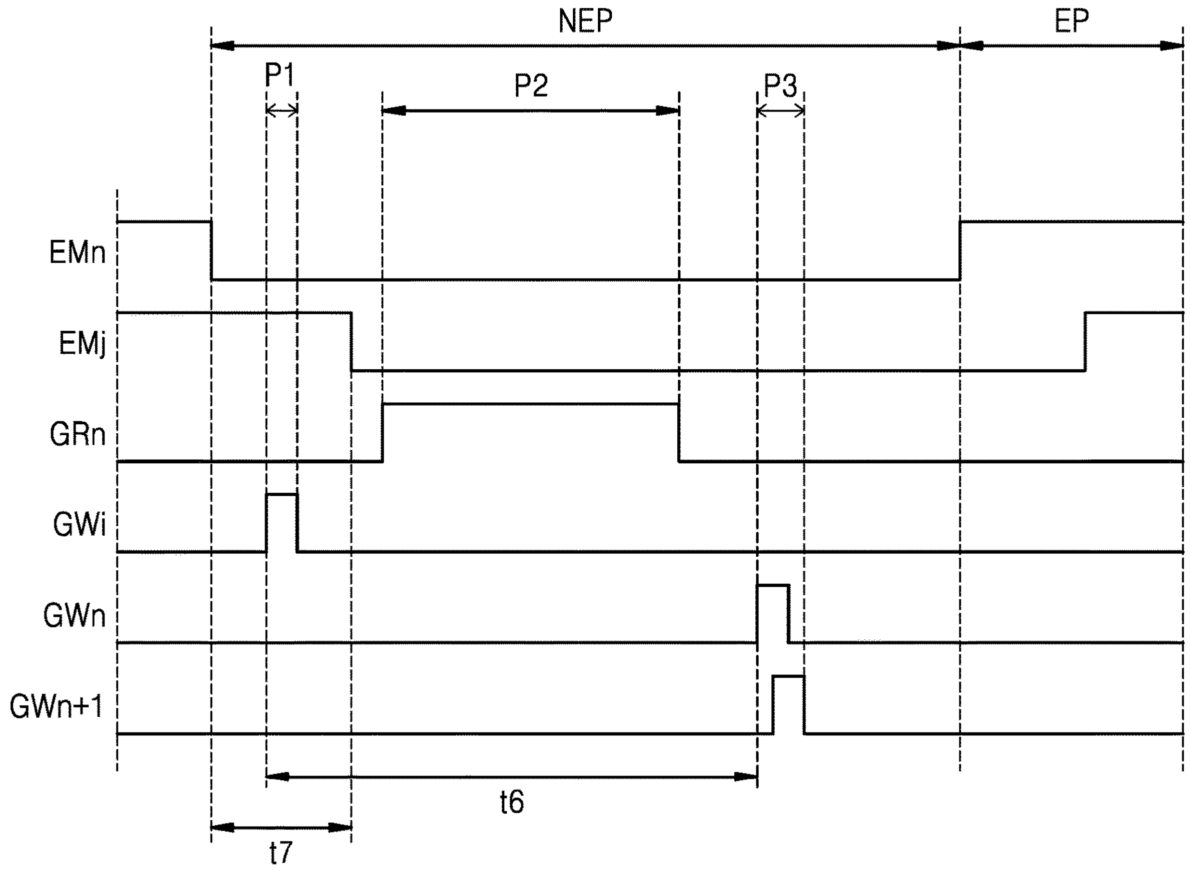
FIG. 26 is a diagram showing gate signals output by the gate driving circuit of FIG. 22.

FIG. 22 is a diagram schematically showing a display device 1*d* according to an embodiment. FIG. 23 is a diagram schematically showing a portion of a gate driving circuit 130*d* of FIG. 22. FIGS. 24A to 24C are diagrams schematically showing some stages, for describing an operation of a pixel of FIG. 22. FIG. 25 is a diagram showing the n-th pixel PXn arranged in the n-th row in the pixel unit 110 of FIG. 22. FIG. 26 is a diagram showing gate signals output by the gate driving circuit 130*d* of FIG. 22. In FIGS. 22 to 26, like reference numerals are used for elements, periods, and signals described with reference to FIGS. 3 to 21, and redundant descriptions thereof will be omitted.

Referring to FIG. 22, the gate driving circuit 130*d* of the display device 1*d* may include a first gate driving circuit 130Ld and a second gate driving circuit 130Rd. The first gate driving circuit 130Ld and the second gate driving circuit 130Rd may each include a first driving circuit 131*d*, a second driving circuit 133*d*, and a third driving circuit 135*d*.

As shown in FIG. 23, the first driving circuit 131*d* may include the plurality of stages WST1 to WST2*m*, which are sequentially connected to each other. The plurality of stages WST1 to WST2*m* may be configured to sequentially output the first gate signal GW, and supply the first gate signal GW to the first gate lines GWL. The first driving circuit 131*d* may further include a plurality of dummy stages DWST1, DWST2, and so on, which are sequentially connected to the first stage WST1.

Some of the plurality of stages WST1 to WST2*m* and the plurality of dummy stages DWST1, DWST2, and so on of the first driving circuit 131*d* may each be configured to output the first gate signal GW as the second gate signal GI to the second gate line GIL of another row. According to an embodiment, the some of the plurality of stages WST1 to WST2*m* and the plurality of dummy stages DWST1, DWST2, and so on may each be configured to output the first gate signal GW as the second gate signal GI to the second gate line GIL arranged in the other row spaced apart from a corresponding row by certain rows backward.

The second driving circuit 133*d* may include the plurality of stages EST1 to ESTm, which are sequentially connected to each other. The second driving circuit 133*d* may further include the plurality of dummy stages DEST1, DEST2, and so on, which are sequentially connected to the last stage ESTm. The second driving circuit 133*d* may be substantially the same as or similar to the second driving circuit 133*c* of FIG. 19.

The third driving circuit 135*d* may include a plurality of stages RST1 to RSTm, which are sequentially connected to each other. The third driving circuit 135*d* may be substantially the same as or similar to the third driving circuit 135*d* of FIG. 9.

Referring to FIG. 24A, the first pixel PX1 may be configured to receive the first first-gate signal GW1 through the first first-gate line GWL1 from the first stage WST1 of the first driving circuit 131*d*, and the second pixel PX2 may be configured to receive the second first-gate signal GW2 through the second first-gate line GWL2 from the second stage WST2 of the first driving circuit 131*d*. The first pixel PX1 may be configured to receive a signal DGW1 output by the first dummy stage DWST1 of the first driving circuit 131*d*, as the first second-gate signal G11 through the first second-gate line GIL1. The second pixel PX2 may be configured to receive a signal DGW2 output by the second dummy stage DWST2 of the first driving circuit 131*d*, as the second second-gate signal G12 through the second second-gate line GIL2.

The first first-gate signal GW1 output by the first stage WST1 may be supplied to the second gate line GIL arranged in a corresponding row of a next stage WST after a certain number. Similarly, the second first-gate signal GW2 output by the second stage WST2 may be supplied to the second gate line GIL arranged in a corresponding row of a next stage WST after a certain number.

The fourth gate signal EM output by the first stage EST1 of the second driving circuit 133*d* may be supplied as the first fourth-gate signal EM1 through the first fourth-gate line EML1 of the first pixel PX1, and as the second fourth-gate signal EM2 through the second fourth-gate line EML2 of the second pixel PX2.

The third gate signal GR output by the first stage RST1 of the third driving circuit 135*d* may be supplied as the first third-gate signal GR1 through the first third-gate line GRL1 of the first pixel PX1, and as the second third-gate signal GR2 through the second third-gate line GRL2 of the second pixel PX2.

Each of the first pixel PX1 and the second pixel PX2 may be configured to receive the fourth gate signal EM output to the fourth gate line EML of a corresponding row by a next stage EST after a certain number from the first stage EST1 of the second driving circuit 133*d*, as the first fifth-gate signal EMB1 through the first fifth-gate line EMBL1 and as the second fifth-gate signal EMB2 through the second fifth-gate line EMBL2.

Referring to FIG. 24B, the n-th pixel PXn may be configured to receive the n-th first gate signal GWn through the n-th first gate line GWLn from the n-th stage WSTn of the first driving circuit 131*d*, and receive the first gate signal GW output by an i-th stage WSTi as the n-th second gate signal Gin through the n-th second gate line GILn. The n-th pixel PXn may be configured to receive the n-th fourth gate signal EMn through the n-th fourth gate line EMLn from the k-th stage ESTk of the second driving circuit 133*d*, and receive the n-th third gate signal GRn through the n-th third gate line GRLn from the k-th stage RSTk of the third driving circuit 135*d*. The n-th pixel PXn may be configured to receive the fourth gate signal EM output by the q-th stage ESTq as the n-th fifth gate signal EMBn through the n-th fifth gate line EMBLn.

Similarly, the (n+1)th pixel PXn+1 may be configured to receive the (n+1)th first gate signal GWn+1 through the (n+1)th first gate line GWLn+1 from the (n+1)th stage WSTn+1 of the first driving circuit 131*d*, and receive the first gate signal GW output by an (i+1)th stage WSTi+1 as the (n+1)th second gate signal GIn+1 through the (n+1)th second gate line GILn+1. The (n+1)th pixel PXn+1 may be configured to receive the (n+1)th fourth gate signal EMn+1 through the (n+1)th fourth gate line EMLn+1 from the k-th stage ESTk of the second driving circuit 133*d*, and receive the (n+1)th third gate signal GRn+1 through the (n+1)th third gate line GRLn+1 from the k-th stage RSTk of the third driving circuit 135*d*. The (n+1)th pixel PXn+1 may be configured to receive the fourth gate signal EM output by the q-th stage ESTq as the (n+1)th fifth gate signal EMBn+1 through the (n+1)th fifth gate line EMBLn+1.

The first gate signal GW output by each of the n-th stage WSTn, the (n+1)th stage WSTn+1, a j-th stage WSTj, and a (j+1)th stage WSTj+1 of the first driving circuit 131*d* may be supplied to the second gate line GIL of each row corresponding to a next stage after a certain number.

The fourth gate signal EM output by each of the p-th stage ESTp and the k-th stage ESTk of the second driving circuit 133*d* may be supplied to the fifth gate line EMBL of each row corresponding to a previous stage before a certain number.

Referring to FIG. 24C, the (2*m*-1)th pixel PX2*m*-1 may be configured to receive the (2*m*-1)th first gate signal GW2*m*-1 through the (2*m*-1)th first gate line GWL2*m*-1 from the (2*m*-1)th stage WST2*m*-1 of the first driving circuit 131*d*, and the first gate signal GW output by a stage WST before a certain number from the (2*m*-1)th stage WST2*m*-1, as the (2*m*-1)th second gate signal G12*m*-1 through the (2*m*-1)th second gate line GIL2*m*-1. The (2*m*-1)th pixel PX2*m*-1 may be configured to receive the (2*m*-1)th fourth gate signal EM2*m*-1 through the (2*m*-1)th fourth gate line EML2*m*-1 from the m-th stage ESTm of the second driving circuit 133*d*, and receive the (2*m*-1)th third gate signal GR2*m*-1 through the (2*m*-1)th third gate line GRL2*m*-1 from the m-th stage RSTm of the third driving circuit 135*d*. The (2*m*-1)th pixel PX2*m*-1 may be configured to receive the signal DEM1 output by the first dummy stage DEST1 of the second driving circuit 133*d*, as the (2*m*-1)th fifth gate signal EMB2*m*-1 through the (2*m*-1)th fifth gate line EMBL2*m*-1.

Similarly, the (2*m*)th pixel PX2*m* may be configured to receive the (2*m*)th first gate signal GW2*m* through the (2*m*)th first gate line GWL2*m* from the (2*m*)th stage WST2*m* of the first driving circuit 131*d*, and receive the first gate signal GW output by a stage WST before a certain number from the (2*m*-1)th stage WST2*m*-1, as the (2*m*)th second gate signal G12*m* through the (2*m*)th second gate line GIL2*m*. The (2*m*)th pixel PX2*m* may be configured to receive the (2*m*)th fourth gate signal EM2*m* through the (2*m*)th fourth gate line EML2*m* from the m-th stage ESTm of the second driving circuit 133*d*, and receive the (2*m*)th third gate signal GR2*m* through the (2*m*)th third gate line GRL2*m* from the m-th stage RSTm of the third driving circuit 135*d*. The (2*m*)th pixel PX2*m* may be configured to receive the signal DEM1 output by the first dummy stage DEST1 of the second driving circuit 133*d*, as the (2*m*)th fifth gate signal EMB2*m* through the (2*m*)th fifth gate line EMBL2*m*.

The fourth gate signal EM output by each of the m-th stage ESTm and an (m-1)th stage ESTm-1 of the second driving circuit 133*d* may be supplied to the fifth gate line EMBL of each row corresponding to a previous stage before a certain number.

According to an embodiment, the i-th row is a row spaced apart from the n-th row by 30 rows forward, and the j-th row may be a row spaced apart from the n-th row by 6 rows backward. In this case, the first driving circuit 131*d* may include 30 dummy stages DWST1 to DWST30, and the second driving circuit 133*d* may include 3 dummy stages DEST1 to DEST3. Some stages WST1 to WST2*m*-30 from among the plurality of stages WST1 to WST2*m* and the dummy stages DWST1 to DWST30 may each be configured to output the first gate signal GW as the second gate signal GI to the second gate line GIL corresponding to a stage WST spaced apart by 30 stages backward. Some stages EST4 to ESTm from among the plurality of stages EST1 to ESTm and the dummy stages DEST1 to DEST3 may each be configured to output the fourth gate signal EM as the fifth gate signal EMB to a pair of fifth gate lines EMBL corresponding to a stage EST spaced apart by 3 stages forward. When the first gate signals GW output by the neighboring stages WST are shifted by 1H (1 horizontal period), and the fourth gate signals EM output by the neighboring stages EST are shifted by 2H (2 horizontal periods), the n-th first gate signal GWn may be output by being shifted by t6 (e.g., 30H: 30 horizontal periods) from an i-th first gate signal GWi and the j-th fourth gate signal EMj may be output by being shifted by t7 (e.g., 6H: 6 horizontal periods) from the n-th fourth gate signal EMn, in FIG. 26.

The pixel PX included in the pixel unit 110 of the display device 1*d* of FIG. 25 differs from the pixel PX of FIG. 20 with respect to a gate signal supplied to the gate of the fourth transistor T4, and configurations and operations thereof are the same.

FIG. 26 differs from FIG. 21 with respect to a gate signal supplied during the first period P1 from among the first to third periods P1 to P3, and gate signals supplied during other periods may be the same or similar. Hereinafter, differences will be described with reference to the n-th pixel PXn as an example.

During the first period P1, the n-th pixel PXn may be configured to receive the i-th first gate signal GWi of a gate-on voltage through the n-th second gate line GILn, and receive the j-th fourth gate signal EMj of a gate-on voltage through the n-th fifth gate line EMBLn. The second terminal of the first transistor T1 and the pixel electrode of the organic light-emitting diode OLED may be initialized to the initialization voltage Vint by the turned-on sixth transistor T6 and turned-on fourth transistor T4.

In the present embodiment, the first gate signal GW output by the first driving circuit 131*d* and the fourth gate signal EM output by the second driving circuit 133*d* may be used as the second gate signal GI and the fifth gate signal EMB, and thus the fourth driving circuit 137 and the fifth driving circuit 139 of FIG. 5 may be omitted, thereby reducing a non-display area.

Figure 27:
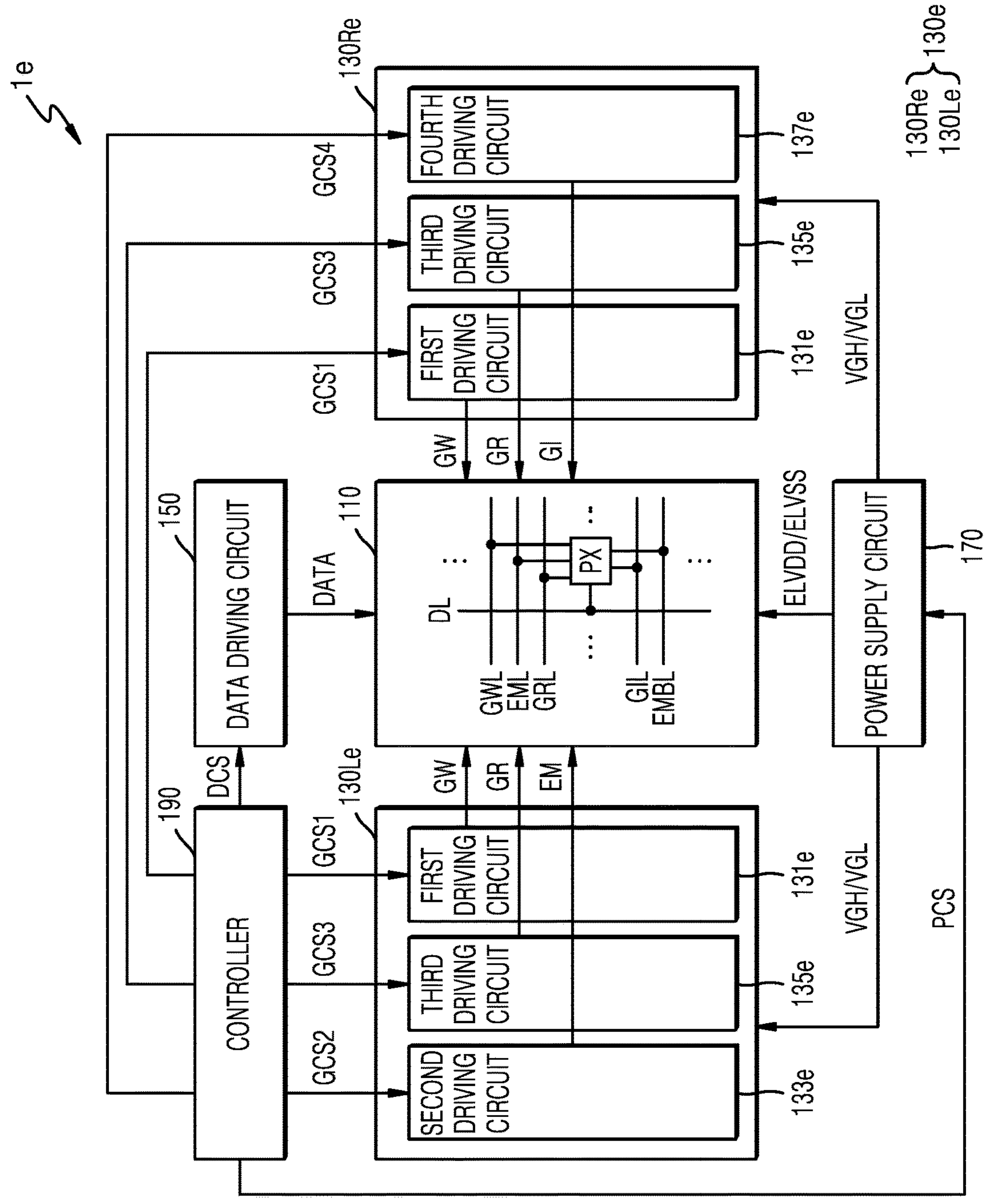
FIG. 27 is a diagram schematically showing a display device according to an embodiment.
Figure 28:
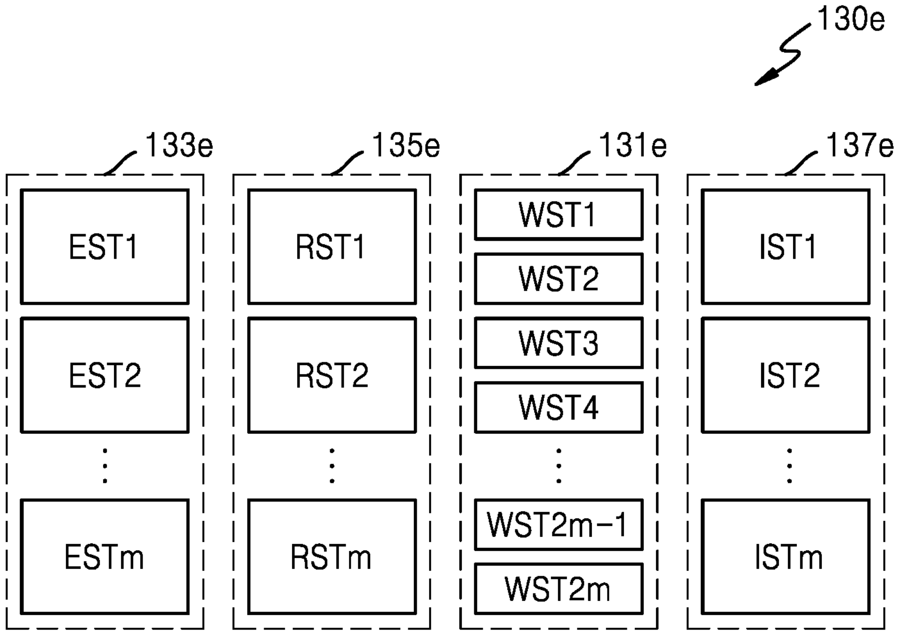
FIG. 28 is a diagram schematically showing a portion of a gate driving circuit of FIG. 27.
Figure 29:
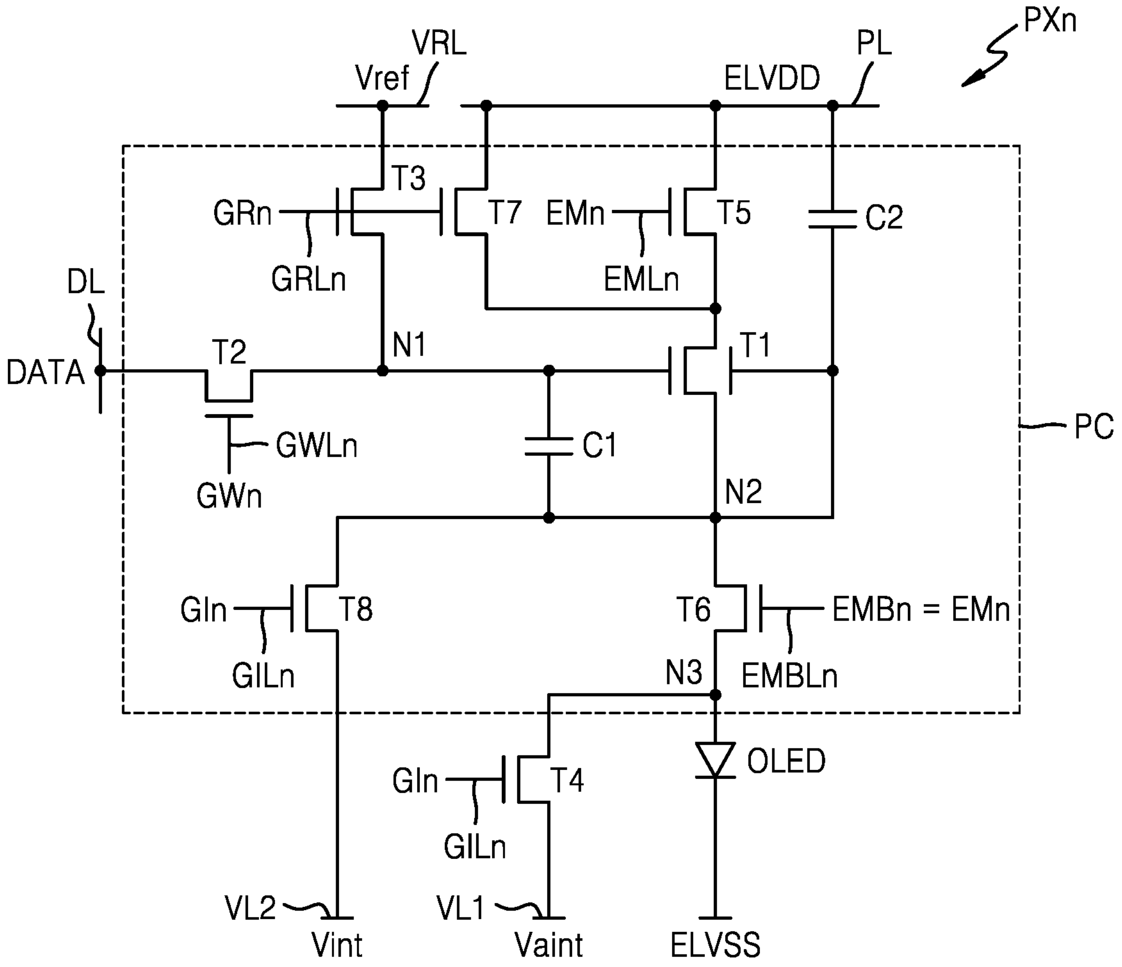
FIG. 29 is a diagram showing a pixel arranged in an n-th row in a pixel unit of FIG. 27.
Figure 30:
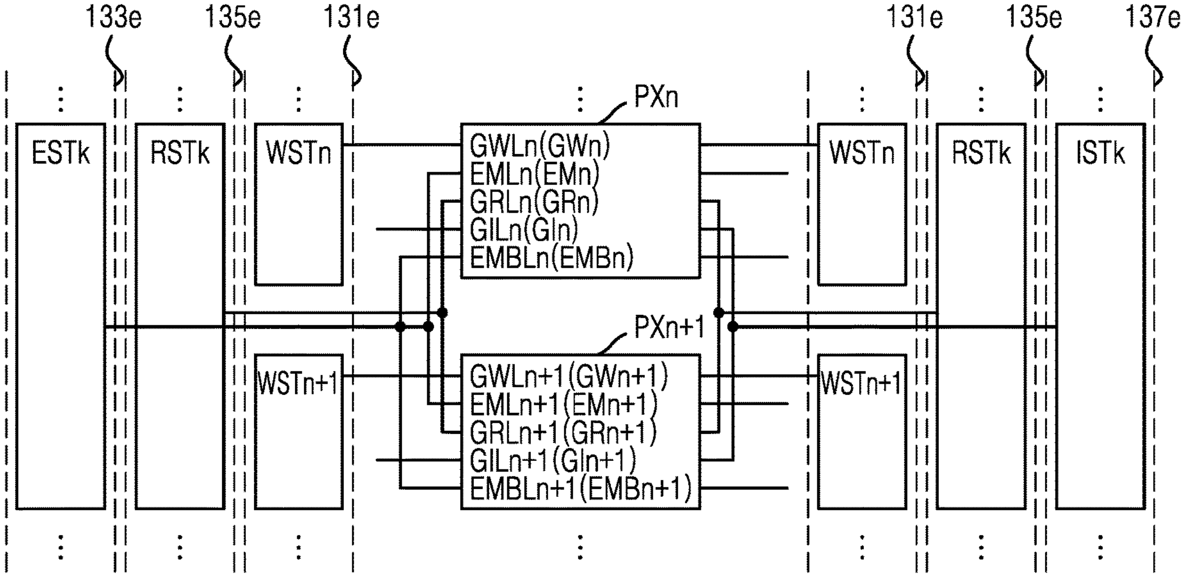
FIG. 30 is a diagram schematically showing some stages, for describing an operation of a pixel of FIG. 27.
Figure 31:
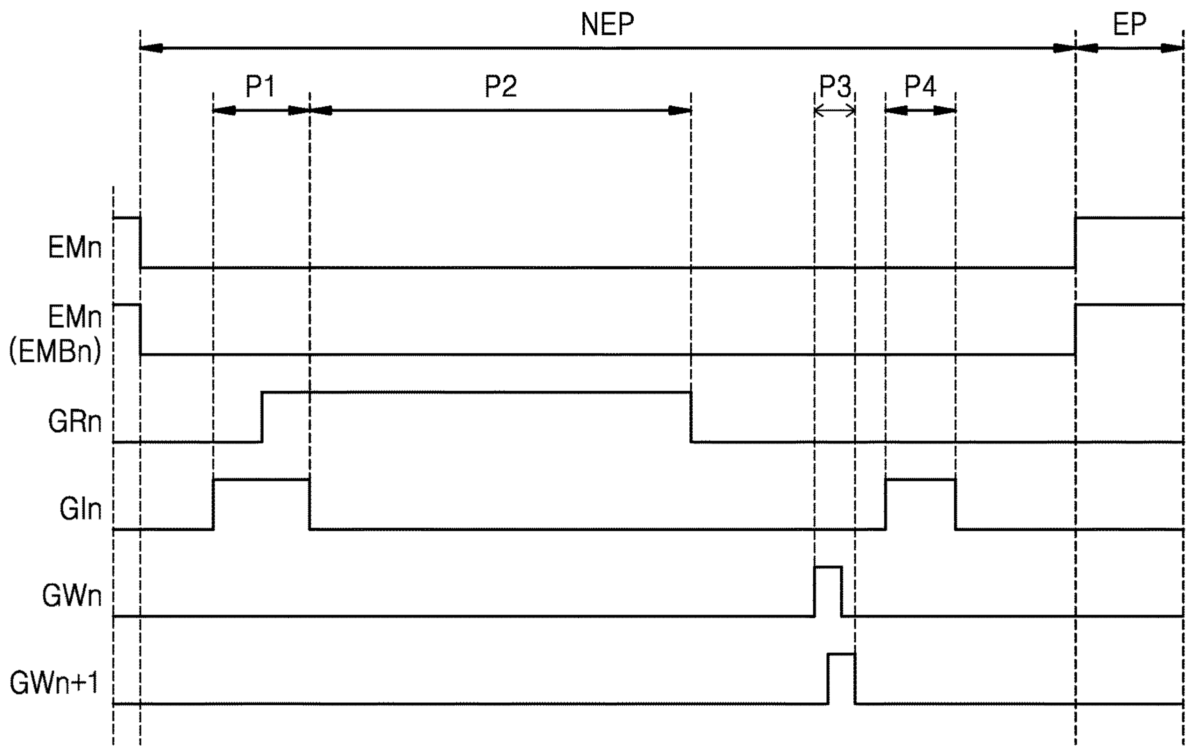
FIG. 31 is a diagram showing gate signals output by the gate driving circuit of FIG. 27.

FIG. 27 is a diagram schematically showing a display device 1*e* according to an embodiment. FIG. 28 is a diagram schematically showing a portion of a gate driving circuit 130*e* of FIG. 27. FIG. 29 is a diagram showing the n-th pixel PXn arranged in the n-th row in the pixel unit 110 of FIG. 27. FIG. 30 is a diagram schematically showing some stages, for describing an operation of a pixel of FIG. 27. FIG. 31 is a diagram showing gate signals output by the gate driving circuit 130*e* of FIG. 27. In FIGS. 27 to 31, like reference numerals are used for elements, periods, and signals described with reference to FIGS. 3 to 26, and redundant descriptions thereof will be omitted.

Referring to FIG. 27, the gate driving circuit 130*e* of the display device 1*e* may include a first gate driving circuit 130Le and a second gate driving circuit 130Re. The first gate driving circuit 130Le may include a first driving circuit 131*e*, a second driving circuit 133*e*, and a third driving circuit 135*e*. The second gate driving circuit 130Re may include the first driving circuit 131*e*, the third driving circuit 135*e*, and a fourth driving circuit 137*e*.

As shown in FIG. 28, the first driving circuit 131*e*, the second driving circuit 133*e*, the third driving circuit 135*e*, and the fourth driving circuit 137*e* may be substantially the same as or similar to the first driving circuit 131, the second driving circuit 133, the third driving circuit 135, and the fourth driving circuit 137 of FIG. 6, respectively.

Referring to FIG. 29, the pixel PX included in the pixel unit 110 of the display device 1*e* differs from the pixel PX of FIG. 3 in that the pixel PX of FIG. 29 further includes the seventh transistor T7 and an eighth transistor T8, the sixth transistor T6 is configured to receive the fourth gate signal EM as the fifth gate signal EMB, and an initialization voltage transmitted by the fourth transistor T4 is a second initialization voltage Vaint.

The seventh transistor T7 may be connected to the fifth transistor T5 in parallel. The seventh transistor T7 may be connected between the driving voltage line PL and the first terminal of the first transistor T1. The gate of the seventh transistor T7 may be configured to receive the third gate signal GR by being connected to the third gate line GRL.

The eighth transistor T8 may be connected between the second node N2 and a second initialization voltage line VL2 configured to supply the initialization voltage Vint, and the gate may be configured to receive the second gate signal GI by being connected to the second gate line GIL (In other words, the second initialization voltage line VL2 may be referred to as a “fourth voltage line”.).

The fourth transistor T4 may be connected between the third node N3 and a first initialization voltage line VL1 configured to supply the second initialization voltage Vaint, and the gate may be configured to receive the second gate signal GI by being connected to the second gate line GIL. The second initialization voltage Vaint may be a voltage different from the initialization voltage Vint. According to an embodiment, the second initialization voltage Vaint may have a voltage level greater than the initialization voltage Vint.

FIG. 31 differs from FIG. 7 in that signals supplied during the second period P2 from among the first to fourth periods P1 to P4 are different from the signals supplied during the second period P2 of FIG. 7. Hereinafter, the n-th pixel PXn will be described as an example.

Referring to FIGS. 29 to 31 together, the n-th pixel PXn may be configured to receive the n-th first gate signal GWn through the n-th first gate line GWLn from the n-th stage WSTn of the first driving circuit 131*e*, receive the n-th fourth gate signal EMn through the n-th fourth gate line EMLn from the k-th stage ESTk of the second driving circuit 133*e*, receive the n-th third gate signal GRn through the n-th third gate line GRLn from the k-th stage RSTk of the third driving circuit 135*e*, and receive the n-th second gate signal GIn through the n-th second gate line GILn from the k-th stage ISTk of the fourth driving circuit 137*e*. The n-th pixel PXn may be configured to receive the fourth gate signal EM output by the k-th stage ESTk as the n-th fifth gate signal EMBn through the n-th fifth gate line EMBLn. In other words, the n-th fourth gate signal EMn and the n-th fifth gate signal EMBn may be the same.

Similarly, the (n+1)th pixel PXn+1 may be configured to receive the (n+1)th first gate signal GWn+1 through the (n+1)th first gate line GWLn+1 from the (n+1)th stage WSTn+1 of the first driving circuit 131*e*, receive the (n+1)th fourth gate signal EMn+1 through the (n+1)th fourth gate line EMLn+1 from the k-th stage ESTk of the second driving circuit 133*e*, receive the (n+1)th third gate signal GRn+1 through the (n+1)th third gate line GRLn+1 from the k-th stage RSTk of the third driving circuit 135*e*, and receive the (n+1)th second gate signal GIn+1 through the (n+1)th second gate line GILn+1 from the k-th stage ISTk of the fourth driving circuit 137*e*. The (n+1)th pixel PXn+1 may be configured to receive the fourth gate signal EM output by the k-th stage ESTk as the (n+1)th fifth gate signal EMBn+1. In other words, the (n+1)th fourth gate signal EMn+1 and the (n+1)th fifth gate signal EMBn+1 may be the same.

During the first period P1, the n-th second gate signal Gin of a gate-on voltage may be supplied to the n-th second gate line GILn, and the n-th third gate signal GRn of a gate-on voltage may be supplied to the n-th third gate line GRLn. The pixel electrode of the organic light-emitting diode OLED may be initialized to the second initialization voltage Vaint, the second terminal of the first transistor T1 may be initialized to the initialization voltage Vint, and the first gate of the first transistor T1 may be initialized to the reference voltage Vref, by the turned-on fourth transistor T4, turned-on eighth transistor T8, and turned-on third transistor T3.

During the second period P2, the n-th third gate signal GRn of a gate-on voltage may be supplied to the n-th third gate line GRLn. The threshold voltage Vth of the first transistor T1 may be compensated for by the turned-on third transistor T3 and seventh transistor T7.

During the third period P3, the n-th first gate signal GWn of a gate-on voltage and the (n+1)th first gate signal GWn+1 of a gate-on voltage are sequentially supplied to the n-th first gate line GWLn and the (n+1)th first gate line GWLn+1, respectively, and thus the data signal DATA may be supplied to each of the n-th pixel PXn and (n+1)th pixel PXn+1.

During the emitting period EP, the n-th fourth gate signal EMn may be supplied in a gate-on voltage, and the organic light-emitting diode OLED may be configured to emit light by the turned-on fifth transistor T5 and sixth transistor T6.

Figure 32:
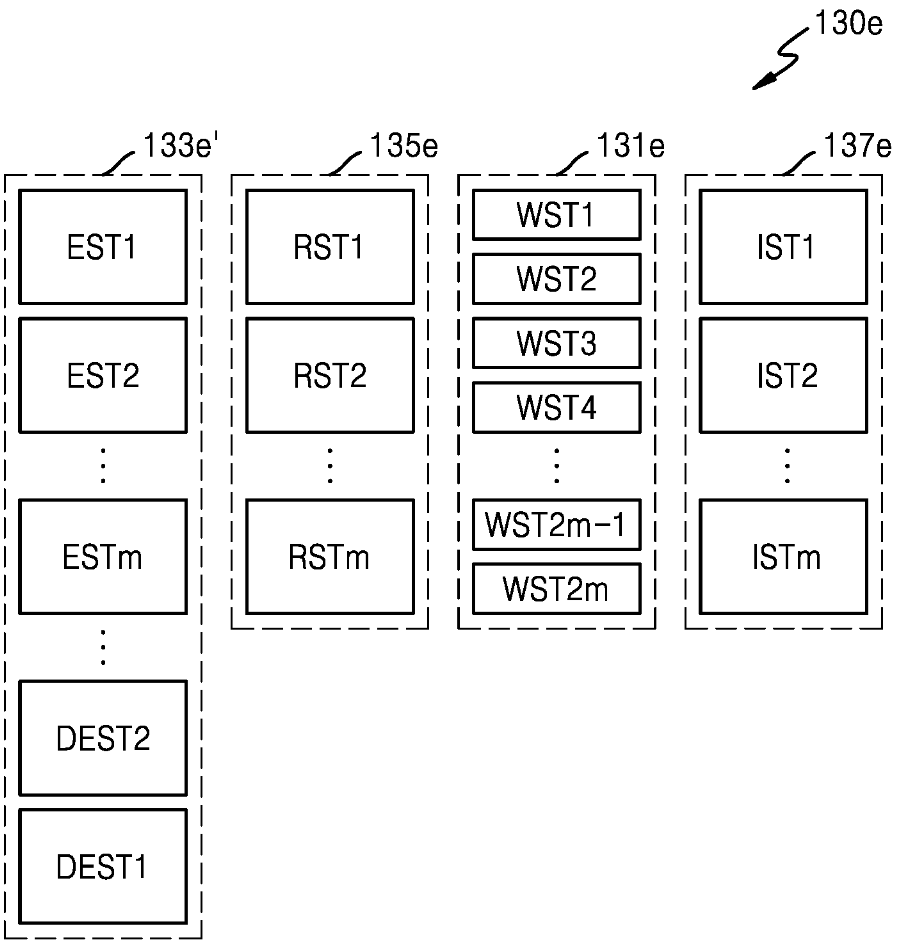
FIG. 32 is a diagram schematically showing a portion of the gate driving circuit of FIG. 27.
Figure 33:
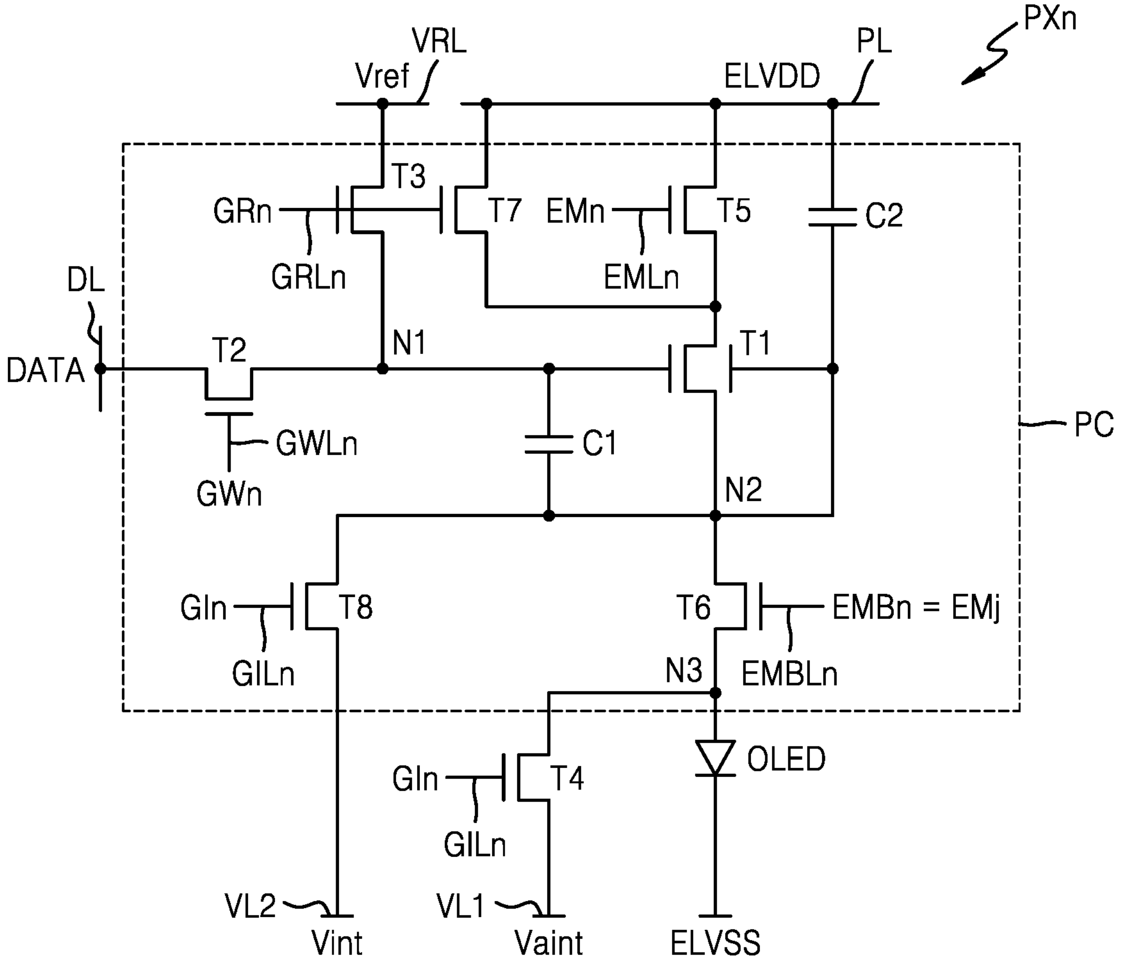
FIG. 33 is a diagram showing the pixel arranged in the n-th row in the pixel unit of FIG. 27.
Figure 34:
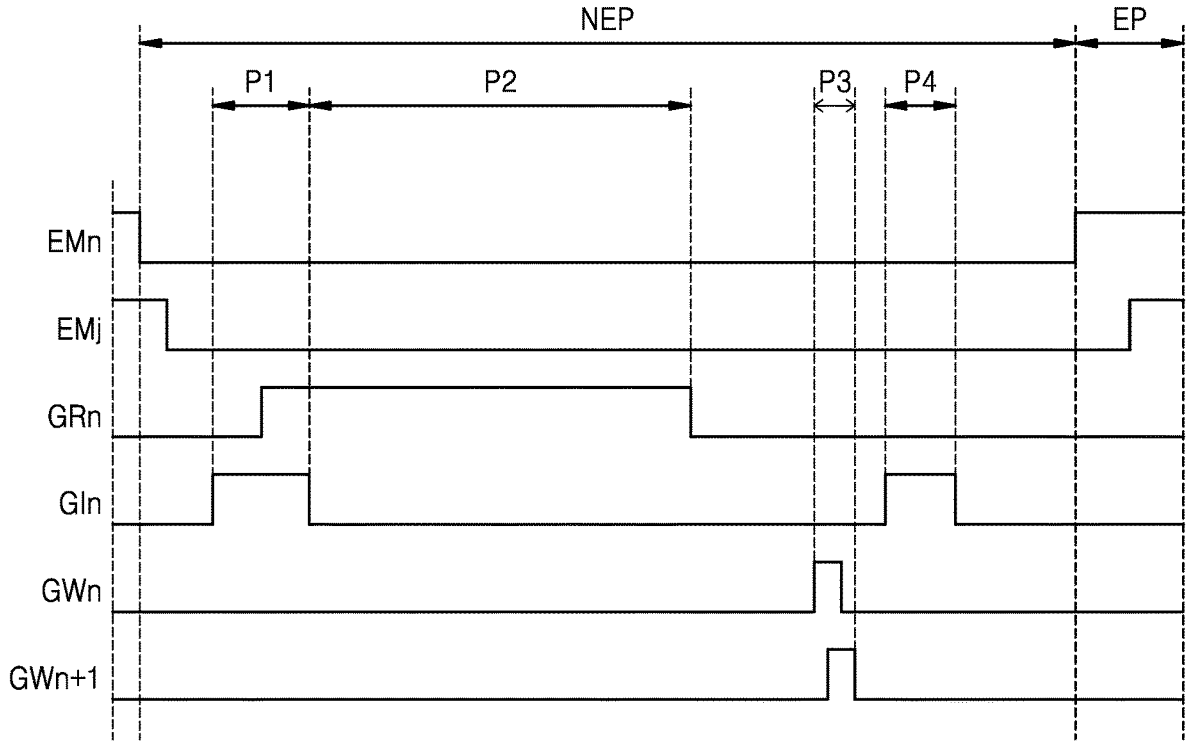
FIG. 34 is a diagram showing the gate signals output by the gate driving circuit of FIG. 27.

FIG. 32 is a diagram schematically showing a portion of the gate driving circuit 130*e* of FIG. 27. FIG. 33 is a diagram showing the n-th pixel PXn arranged in the n-th row in the pixel unit 110 of FIG. 27. FIG. 34 is a diagram showing the gate signals output by the gate driving circuit 130*e* of FIG. 27.

Embodiments shown in FIGS. 28 to 31 use the n-th fourth gate signal EMn as the n-th fifth gate signal EMBn, but an embodiment of the disclosure is not limited thereto. According to another embodiment, as shown in FIG. 32, the second driving circuit 133*e*' may include the plurality of stages EST1 to ESTm, which are sequentially connected to each other, and the plurality of dummy stages DEST1, DEST2, and so on, which are sequentially connected to the last m-th stage ESTm. Accordingly, as shown in FIGS. 33 and 34, the j-th fourth gate signal EMj output from a stage spaced apart from the n-th row by certain rows backward may be used as the n-th fifth gate signal EMBn.

In the above-described embodiments, a stage of a first driving circuit or third driving circuit in an arbitrary row is configured to supply the first gate signal GW or third gate signal GR to a succeeding row, and a stage of a second driving circuit is configured to supply the fourth gate signal EM to a preceding row, but this is only an example. According to another embodiment, at least one of a first driving circuit, a second driving circuit, a third driving circuit, and a fourth driving circuit may be configured to supply a gate signal to a preceding row or a succeeding row, according to a change in a pixel and operation.

In the above-described embodiments, the emitting period EP starts at a timing when the fourth gate signal EM is applied in a gate-on voltage, but it may be understood that the emitting period EP may start from a time point when the fourth gate signal EM and the fifth gate signal EMB are both in a gate-on voltage.

Figure 35:
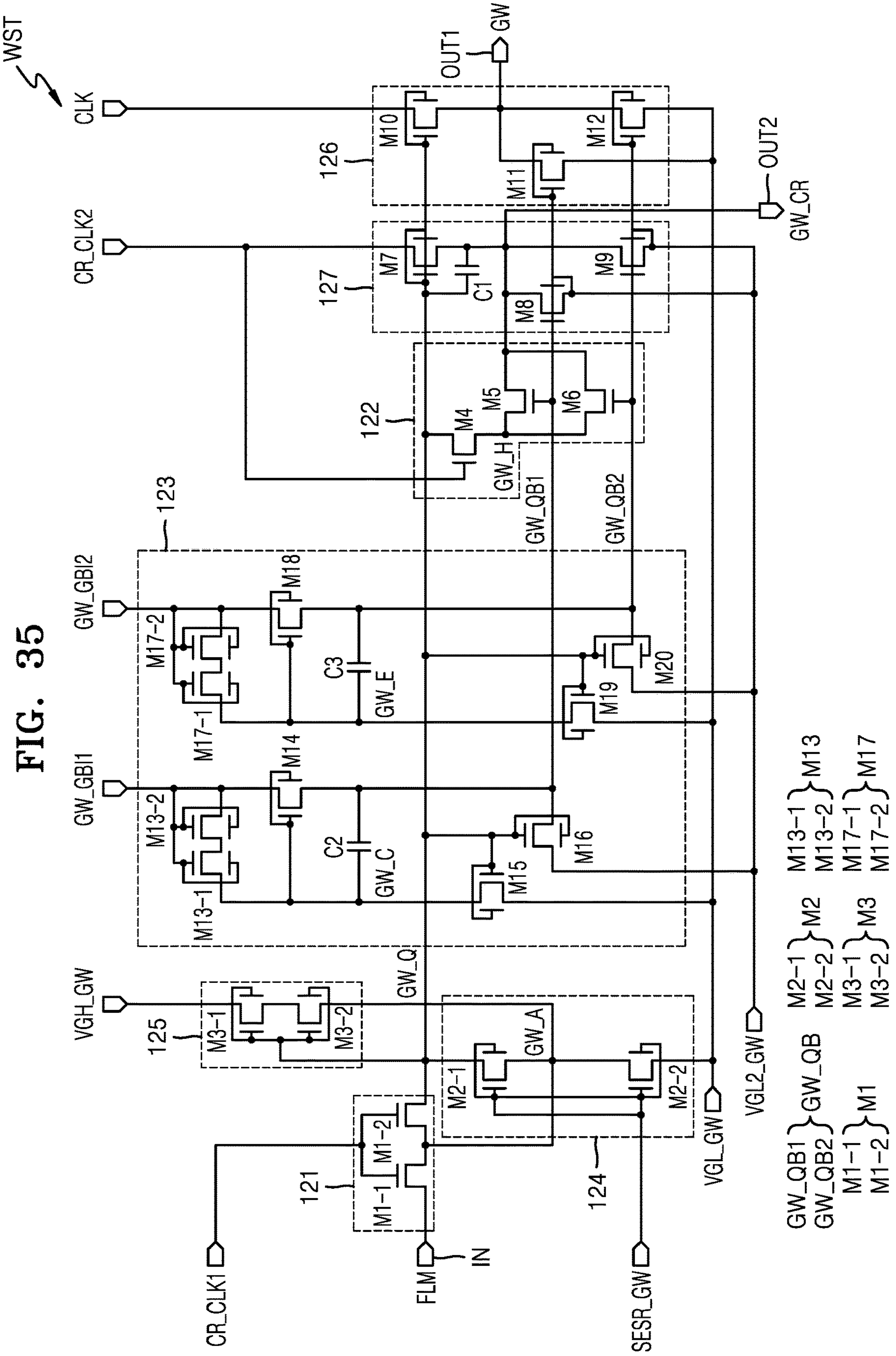
FIG. 35 illustrates an example of an arbitrary stage of a first driving circuit, according to an embodiment.

FIG. 35 illustrates an example of an arbitrary stage WST of a first driving circuit, according to an embodiment.

Referring to FIG. 35, a plurality of transistors included in the stage WST of the first driving circuit may be N-type thin-film transistors. The n-type thin-film transistors may be oxide thin-film transistors. The stage WST may include an input circuit 121, a first control circuit 122, a second control circuit 123, a reset circuit 124, a stabilization circuit 125, a first output circuit 126, and a second output circuit 127.

The input circuit 121 may be configured to transmit a start signal (e.g., an initial signal FLM or carry signal) applied to an input terminal IN to a first control node GW_Q according to a first carry clock signal CR_CLK1. The input circuit 121 may include a first transistor M1.

The first transistor M1 may include a (1-1)th transistor M1-1 and a (1-2)th transistor M1-2, which are connected to each other in series between the input terminal IN and the first control node GW_Q. Gates of the (1-1)th transistor M1-1 and (1-2)th transistor M1-2 may be connected to a first carry clock terminal to which the first carry clock signal CR_CLK1 is input. When the first carry clock signal CR_CLK1 of a first level (high level) is applied, the first transistor M1 is turned on and the first control node GW_Q may be set (charged) to a voltage of the start signal.

The reset circuit 124 may include a second transistor M2. The second transistor M2 may include a (2-1)th transistor M2-1 and a (2-2)th transistor M2-2, which are connected to each other in series between the first control node GW_Q and a second voltage terminal to which a second voltage VGL_GW of a second level (low level) is input. Gates of the (2-1)th transistor M2-1 and (2-2)th transistor M2-2 may be connected to a reset terminal to which a reset voltage SESR_GW is input. The second transistor M2 may be turned on by the reset voltage SESR_GW of the first level while a gate driving circuit is not driven, and configured to reset a voltage of a first control node GW_Q to the first level. The reset voltage SESR_GW may be supplied in the second level while the gate driving circuit is driven.

The stabilization circuit 125 may include a third transistor M3. The third transistor M3 may include a (3-1)th transistor M3-1 and a (3-2)th transistor M3-2, which are connected to each other in series between a node GW_A and a first voltage terminal to which a first voltage VGH_GW of the first level is input. Gates of the (3-1)th transistor M3-1 and (3-2)th transistor M3-2 may be connected to the first control node GW_Q. The third transistor M3 may be turned on when a voltage of the first control node GW_Q is in the first level, and configured to maintain voltages of intermediate nodes of the (2-1)th transistor M2-1 and (2-2)th transistor M2-2, and intermediate nodes of the (1-1)th transistor M1-1 and (1-2)th transistor M1-2, which are connected to the node GW_A, to the first level, thereby preventing a voltage drop caused by a current leakage of the first control node GW_Q when the first control node GW_Q is in a floating state.

The first output circuit 126 may be configured to output the first gate signal GW to the first gate signal GW of a corresponding row and/or the second gate line GIL of another row. The first output circuit 126 may include a tenth transistor M10, an eleventh transistor M11, and a twelfth transistor M12, which are connected between the second voltage terminal and a scan clock terminal to which a scan clock signal CLK is input.

The tenth transistor M10 (pull-up transistor) may be connected between the scan clock terminal and a first output terminal OUT1, and a gate thereof may be connected to the first control node GW_Q. The tenth transistor M10 may be turned on when a voltage of the first control node GW_Q is in the first level, and configured to output the scan clock signal CLK of the first level as the first gate signal GW through the first output terminal OUT1.

The eleventh transistor M11 (pull-down transistor) may be connected between the first output terminal OUT1 and the second voltage terminal, and a gate thereof may be connected to a (2-1)th control node GW_QB1. The eleventh transistor M11 may be turned on when a voltage of the (2-1)th control node GW_QB1 is in the first level, and configured to output the second voltage VGL_GW of the second level as the first gate signal GW through the first output terminal OUT1.

The twelfth transistor M12 (pull-down transistor) may be connected between the first output terminal OUT1 and the second voltage terminal, and a gate thereof may be connected to a (2-2)th control node GW_QB2. The twelfth transistor M12 may be turned on when a voltage of the (2-2)th control node GW_QB2 is in the first level, and configured to output the second voltage VGL_GW of the second level as the first gate signal GW through the first output terminal OUT1.

The second output circuit 127 may be configured to output a carry signal GW_CR to the input terminal IN of a next stage. The second output circuit 127 may include a seventh transistor M7, an eighth transistor M8, and a ninth transistor M9, which are connected between a second carry clock terminal to which a second carry clock signal CR_CLK2 is input and a third voltage terminal to which a third voltage VGL2_GW of the second level is input. The second output circuit 127 may further include the first capacitor C1. A voltage level of the third voltage VGL2_GW may be lower than a voltage level of the second voltage VGL_GW.

The seventh transistor M7 (pull-up transistor) may be connected between the second carry clock terminal and a second output terminal OUT2, and a gate thereof may be connected to the first control node GW_Q. The first capacitor C1 may be connected between the first control node GW_Q and the second output terminal OUT2. The seventh transistor M7 may be turned on when a voltage of the first control node GW_Q is in the first level, and configured to output the second carry clock signal CR_CLK2 of the first level as the carry signal GW_CR through the second output terminal OUT2.

The eighth transistor M8 (pull-down transistor) may be connected between the second output terminal OUT2 and the third voltage terminal, and a gate thereof may be connected to the (2-1)th control node GW_QB1. The eighth transistor M8 may be turned on when a voltage of the (2-1)th control node GW_QB1 is in the first level, and configured to output the third voltage VGL2_GW of the second level as the carry signal GW_CR through the second output terminal OUT2.

The ninth transistor M9 (pull-down transistor) may be connected between the second output terminal OUT2 and the third voltage terminal, and a gate thereof may be connected to the (2-2)th control node GW_QB2. The ninth transistor M9 may be turned on when a voltage of the (2-2)th control node GW_QB2 is in the first level, and configured to output the third voltage VGL2_GW of the second level as the carry signal GW_CR through the second output terminal OUT2.

The first control circuit 122 may control a voltage of the first control node GW_Q according to the second carry clock signal CR_CLK2 and a voltage of a second control node GW_QB. The second control node GW_QB may include the (2-1)th control node GW_QB1 and the (2-2)th control node GW_QB2. The first control circuit 122 may include a fourth transistor M4, a fifth transistor M5, and a sixth transistor M6.

The fourth transistor M4 may be connected between the first control node GW_Q and a node GW_H, and a gate thereof may be connected to the second carry clock terminal. The fifth transistor M5 may be connected between the node GW_H and the second output terminal OUT2, and a gate thereof may be connected to the (2-1)th control node GW_QB1. The sixth transistor M6 may be connected between the node GW_H and the second output terminal OUT2, and a gate thereof may be connected to the (2-2)th control node GW_QB2.

When the second carry clock signal CR_CLK2 is in the first level and the (2-1)th control node GW_QB1 is in the first level, the fourth transistor M4 and the fifth transistor M5 may be turned on, and the eighth transistor M8 of the second output circuit 127 may be turned on. Accordingly, while the (2-1)th control node GW_QB1 is in the first level, the voltage of the first control node GW_Q may stably maintain the second level of the third voltage VGL2_GW.

When the second carry clock signal CR_CLK2 is in the first level and the (2-2)th control node GW_QB2 is in the first level, the fourth transistor M4 and the sixth transistor M6 may be turned on, and the ninth transistor M9 of the second output circuit 127 may be turned on. Accordingly, while the (2-2)th control node GW_QB2 is in the first level, the voltage of the first control node GW_Q may stably maintain the second level of the third voltage VGL2_GW.

The second control circuit 123 may reverse the voltage level of the first control node GW_Q according to the second voltage VGL_GW, the third voltage VGL2_GW, a fourth voltage GW_GB11, and a fifth voltage GW GB12 and supply the same to the second control node GW_QB, thereby controlling the voltage of the second control node GW_QB.

The second control circuit 123 may include a thirteenth transistor M13, a fourteenth transistor M14, a fifteenth transistor M15, a sixteenth transistor M16, a seventeenth transistor M17, an eighteenth transistor M18, a nineteenth transistor M19, a twentieth transistor M20, the second capacitor C2, and a third capacitor C3.

The thirteenth transistor M13 may include a (13-1)th transistor M13-1 and a (13-2)th transistor M13-2, which are connected to each other in series between a node GW_C and a fourth voltage terminal to which the fourth voltage GW_GB11 is input. Gates of the (13-1)th transistor M13-1 and (13-2)th transistor M13-2 may be connected to the fourth voltage terminal. The fourteenth transistor M14 may be connected between the (2-1)th control node GW_QB1 and the fourth voltage terminal, and a gate thereof may be connected to the node GW_C. The fifteenth transistor M15 may be connected between the node GW_C and the second voltage terminal, and a gate thereof may be connected to the first control node GW_Q. The sixteenth transistor M16 may be connected between the (2-1)th control node GW_QB1 and the third voltage terminal, and a gate thereof may be connected to the first control node GW_Q.

The seventeenth transistor M17 may include a (17-1)th transistor M17-1 and a (17-2)th transistor M17-2, which are connected to each other in series between a node GW_E and a fifth voltage terminal to which the fifth voltage GW_GB12 is input. Gates of the (17-1)th transistor M17-1 and (17-2)th transistor M17-2 may be connected to the fifth voltage terminal. The eighteenth transistor M18 may be connected between the (2-2)th control node GW_QB2 and the fifth voltage terminal, and a gate thereof may be connected to the node GW_E. The nineteenth transistor M19 may be connected between the node GW_E and the second voltage terminal, and a gate thereof may be connected to the first control node GW_Q. The twentieth transistor M20 may be connected between the (2-2)th control node GW_QB2 and the third voltage terminal, and a gate thereof may be connected to the first control node GW_Q.

The second capacitor C2 may be connected between the (2-1)th control node GW_QB1 and the node GW_C. The third capacitor C3 may be connected between the (2-2)th control node GW_QB2 and the node GW_E. When the voltages of the (2-1)th control node GW_QB1 and (2-2)th control node GW_QB2 are switched from the first level to the second level by the second capacitor C2 and third capacitor C3, the fourteenth transistor M14 and the eighteenth transistor M18 may be quickly turned off.

The fourth voltage GW GB11 and the fifth voltage GW_GB12 may be supplied in voltages of the first level or the second level by alternating in frame units. When the fourth voltage GW GB11 is in the first level and the fifth voltage GW_GB12 is in the second level, the voltage of the (2-1)th control node GW_QB1 may be in the first level and the voltage of the (2-2)th control node GW_QB2 may be in the second level. When the fifth voltage GW_GB12 is in the first level and the fourth voltage GW_GB11 is in the second level, the voltage of the (2-2)th control node GW_QB2 may be in the first level and the voltage of the (2-1)th control node GW_QB1 may be in the second level.

The eleventh transistor M11 and the twelfth transistor M12, and the eighth transistor M8 and the ninth transistor M9 may be turned on while alternating in frame units according to the fourth voltage GW_GB11 and the fifth voltage GW_GB12. Accordingly, changes in threshold voltages of the eleventh transistor M11 and the twelfth transistor M12, and the eighth transistor M8 and the ninth transistor M9 may be reduced or prevented.

Figure 36:
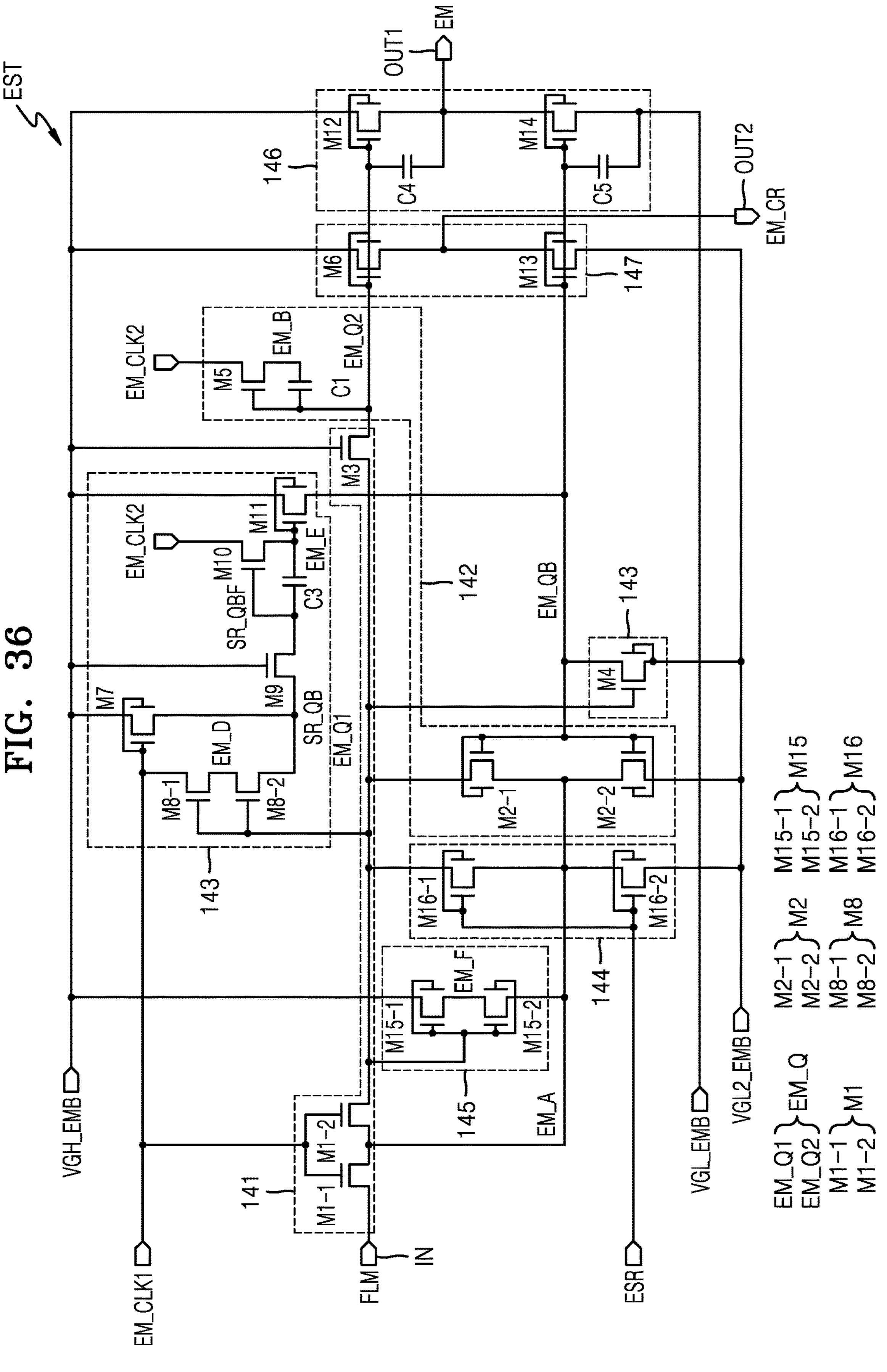
FIG. 36 illustrates an example of an arbitrary stage of a second driving circuit, according to an embodiment.

FIG. 36 illustrates an example of an arbitrary stage EST of a second driving circuit, according to an embodiment.

Referring to FIG. 36, a plurality of transistors included in the stage EST of the second driving circuit may be N-type thin-film transistors. The n-type thin-film transistors may be oxide thin-film transistors. The stage EST may include an input circuit 141, a first control circuit 142, a second control circuit 143, a reset circuit 144, a stabilization circuit 145, a first output circuit 146, and a second output circuit 147.

The input circuit 141 may be configured to transmit the start signal (e.g., the initial signal FLM or carry signal) applied to the input terminal IN to a first control node EM_Q according to a first clock signal EM_CLK1. The input circuit 141 may include the first transistor M1 and the third transistor M3. The first control node EM_Q may include a (1-1)th control node EM_Q1 and a (1-2)th control node EM_Q2.

The first transistor M1 may include the (1-1)th transistor M1-1 and the (1-2)th transistor M1-2, which are connected to each other in series between the input terminal IN and the (1-1)th control node EM_Q1. The gates of the (1-1)th transistor M1-1 and (1-2)th transistor M1-2 may be connected to a first clock terminal to which the first clock signal EM_CLK1 is input. When the first clock signal EM_CLK1 of the first level (high level) is applied, the first transistor M1 is turned on and the (1-1)th control node EM_Q1 may be set (charged) to the voltage of the start signal.

The third transistor M3 may be connected between the (1-1)th control node EM_Q1 and the (1-2)th control node EM_Q2, and the gate thereof may be connected to the first voltage terminal to which a first voltage VGH_EMB of the first level is input. The third transistor M3 may conduct the (1-1)th control node EM_Q1 and the (1-2)th control node EM_Q2 to control the voltage level of the (1-2)th control node EM_Q2 to be the voltage level of the (1-1)th control node EM_Q1. The third transistor M3 may be always turned on by the first voltage VGH_EMB to prevent a line voltage drop between the (1-1)th control node EM_Q1 and the (1-2)th control node EM_Q2.

The reset circuit 144 may include the sixteenth transistor M16. The sixteenth transistor M16 may include a (16-1)th transistor M16-1 and a (16-2)th transistor M16-2, which are connected to each other in series between the (1-1)th control node EM_Q1 and the second voltage terminal to which a second voltage VGL_EMB of the second level (low level) is input. Gates of the (16-1)th transistor M16-1 and (16-2)th transistor M16-2 may be connected to the reset terminal to which a reset voltage ESR is input. The sixteenth transistor M16 may be turned on by the reset voltage ESR of the first level while the gate driving circuit is not driven, and configured to reset a voltage of the (1-1)th control node EM_Q1 to the first level. The reset voltage ESR may be supplied in the second level while the gate driving circuit is driven.

The stabilization circuit 145 may include the fifteenth transistor M15. The fifteenth transistor M15 may include a (15-1)th transistor M15-1 and a (15-2)th transistor M15-2, which are connected to each other in series between the first voltage terminal and a node EM_A. Gates of the (15-1)th transistor M15-1 and (15-2)th transistor M15-2 may be connected to the (1-1)th control node EM_Q1. The fifteenth transistor M15 may be turned on when the voltage of the (1-1)th control node EM_Q1 is in the first level to maintain voltages of intermediate nodes of the (2-1)th transistor M2-1 and (2-2)th transistor M2-2, intermediate nodes of the (1-1)th transistor M1-1 and (1-2)th transistor M1-2, and intermediate nodes of the (16-1)th transistor M16-1 and (16-2)th transistor M16-2, which are connected to the node EM_A, to the first level, thereby preventing a voltage drop caused by a current leakage of the (1-1)th control node EM_Q1 when the (1-1)th control node EM_Q1 is in a floating state.

The first output circuit 146 may be configured to output the fourth gate signal EM to the fourth gate line EML of a corresponding row and/or the fifth gate line EMBL of the same row or another row. The first output circuit 146 may include the twelfth transistor M12 and the fourteenth transistor M14, which are connected between the first voltage terminal and the second voltage terminal. The first output circuit 146 may further include a fourth capacitor C4 and a fifth capacitor C5.

The twelfth transistor M12 (pull-up transistor) may be connected between the first voltage terminal and the first output terminal OUT1, and the gate thereof may be connected to the (1-2)th control node EM_Q2. The twelfth transistor M12 may be turned on when the voltage of the (1-2)th control node EM_Q2 is in the first level, and configured to output the first voltage VGH_EMB as the fourth gate signal EM through the first output terminal OUT1.

The fourteenth transistor M14 (pull-down transistor) may be connected between the first output terminal OUT1 and the second voltage terminal, and the gate thereof may be connected to a second control node EM_QB. The fourteenth transistor M14 may be turned on when a voltage of the second control node EM_QB is in the first level, and configured to output the second voltage VGL_EMB as the fourth gate signal EM through the first output terminal OUT1.

The second output circuit 147 may be configured to output a carry signal EM_CR to the input terminal IN of the next stage. The second output circuit 147 may include the sixth transistor M6 and the thirteenth transistor M13, which are connected between the first voltage terminal and the third voltage terminal to which a third voltage VGL2_EMB of the second level is input. A voltage level of the third voltage VGL2_EMB may be lower than a voltage level of the second voltage VGL_EMB.

The sixth transistor M6 (pull-up transistor) may be connected between the first voltage terminal and the first output terminal OUT1, and the gate thereof may be connected to the (1-2)th control node EM_Q2. The sixth transistor M6 may be turned on when the voltage of the (1-2)th control node EM_Q2 is in the first level, and configured to output the first voltage VGH_EMB as the carry signal EM_CR through the second output terminal OUT2.

The thirteenth transistor M13 (pull-down transistor) may be connected between the first output terminal OUT1 and the third voltage terminal, and the gate thereof may be connected to the second control node EM_QB. The thirteenth transistor M13 may be turned on when the voltage of the second control node EM_QB is in the first level, and configured to output the third voltage VGL2_EMB as the carry signal EM_CR through the second output terminal OUT2.

The first control circuit 142 may control a voltage of the first control node EM_Q according to a second clock signal EM_CLK2 and a voltage of the second control node EM_QB. The first control circuit 142 may include the second transistor M2, the fifth transistor M5, and the first capacitor C1.

The second transistor M2 may include the (2-1)th transistor M2-1 and the (2-2)th transistor M2-2, which are connected between the (1-1)th control node EM_Q1 and the third voltage terminal. The gates of the (2-1)th transistor M2-1 and (2-2)th transistor M2-2 may be connected to the second control node EM_QB. The (2-1)th transistor M2-1 and (2-2)th transistor M2-2 may be turned on when the second control node EM_QB is in the first level to maintain the voltage of the (1-1)th control node EM_Q1 to the second level.

The fifth transistor M5 may be connected between the (1-2)th control node EM_Q2 and a second clock terminal to which the second clock signal EM_CLK2 is input, and the gate thereof may be connected to the (1-2)th control node EM_Q2. The first capacitor C1 may be connected between the (1-2)th control node EM_Q2 and a node EM_B. The fifth transistor M5 may be turned on when the (1-2)th control node EM_Q2 is in the first level and configured to transmit the second clock signal EM_CLK2 to one end of the first capacitor C1. When the second clock signal EM_CLK2 is in the first level, the voltage of the (1-2)th control node EM_Q2 may be boosted to be greater than the first voltage VGH_EMB by the first capacitor C1 and the turned-on fifth transistor M5.

The second control circuit 143 may be configured to reverse the voltage level of the (1-1)th control node EM_Q1 according to the first voltage VGH_EMB, the second voltage VGL_EMB, the third voltage VGL2_EMB, the first clock signal EM_CLK1, and the second clock signal EM_CLK2 and supply the same to the second control node EM_QB, thereby controlling the voltage of the second control node EM_QB. The second control circuit 143 may include the fourth transistor M4, the seventh transistor M7, the eighth transistor M8, the ninth transistor M9, the tenth transistor M10, the eleventh transistor M11, and the third capacitor C3.

The fourth transistor M4 may be connected between the second control node EM_QB and the third voltage terminal, and the gate thereof may be connected to the (1-1)th control node EM_Q1. The fourth transistor M4 is turned on when the voltage of the (1-1)th control node EM_Q1 is in the first level to maintain the voltage of the second control node EM_QB to the second level.

The seventh transistor M7 may be connected between the first voltage terminal and a node SR_QB, and the gate thereof may be connected to the first clock terminal. The eighth transistor M8 may include an (8-1)th transistor M8-1 and an (8-2)th transistor M8-2, which are connected to each other in series between the first clock terminal and the node SR_QB, and gates of the (8-1)th transistor M8-1 and (8-2)th transistor M8-2 may be connected to the (1-1)th control node EM_Q1. The ninth transistor M9 may be connected between the node SR_QB and a node SR_QBF, and the gate thereof may be connected to the first voltage terminal. The tenth transistor M10 may be connected between the second clock terminal and a node EM_E, and the gate thereof may be connected to the node SR_QBF. The eleventh transistor M11 may be connected between the first voltage terminal and the second control node EM_QB, and the gate thereof may be connected to the node EM_E.

The third capacitor C3 may be connected between the node SR_QBF and the node EM_E. When the second clock signal EM_CLK2 is in the first level, a voltage of the node SR_QBF may be boosted to be greater than the first voltage VGH_EMB by the third capacitor C3 and the turned-on tenth transistor M10.

When the voltage of the (1-1)th control node EM_Q1 is in the first level, the first clock signal EM_CLK1 is in the first level, and the second clock signal EM_CLK2 is in the second level, the eighth transistor M8 and seventh transistor M7 may be turned on, voltages of the node SR_QB and node SR_QBF, which are conducted by the turned-on ninth transistor M9, may become the first level by the first voltage VGH_EMB, and a voltage of the node EM_E may become the second level by the second clock signal EM_CLK2 through the turned-on tenth transistor M10. Accordingly, the eleventh transistor M11 may be turned off and the second control node EM_QB may maintain the second level.

When the voltage of the (1-1)th control node EM_Q1 is in the second level, the first clock signal EM_CLK1 is in the second level, and the second clock signal EM_CLK2 is in the first level, the eighth transistor M8 and seventh transistor M7 may be turned off, the voltages of the node SR_QB and node SR_QBF, which are conducted by the turned-on ninth transistor M9, may maintain the first level, and the voltage of the node EM_E may become the first level by the second clock signal EM_CLK2 through the turned-on tenth transistor M10. Accordingly, the eleventh transistor M11 may be turned on and the second control node EM_QB may maintain the first level.

Figure 37:
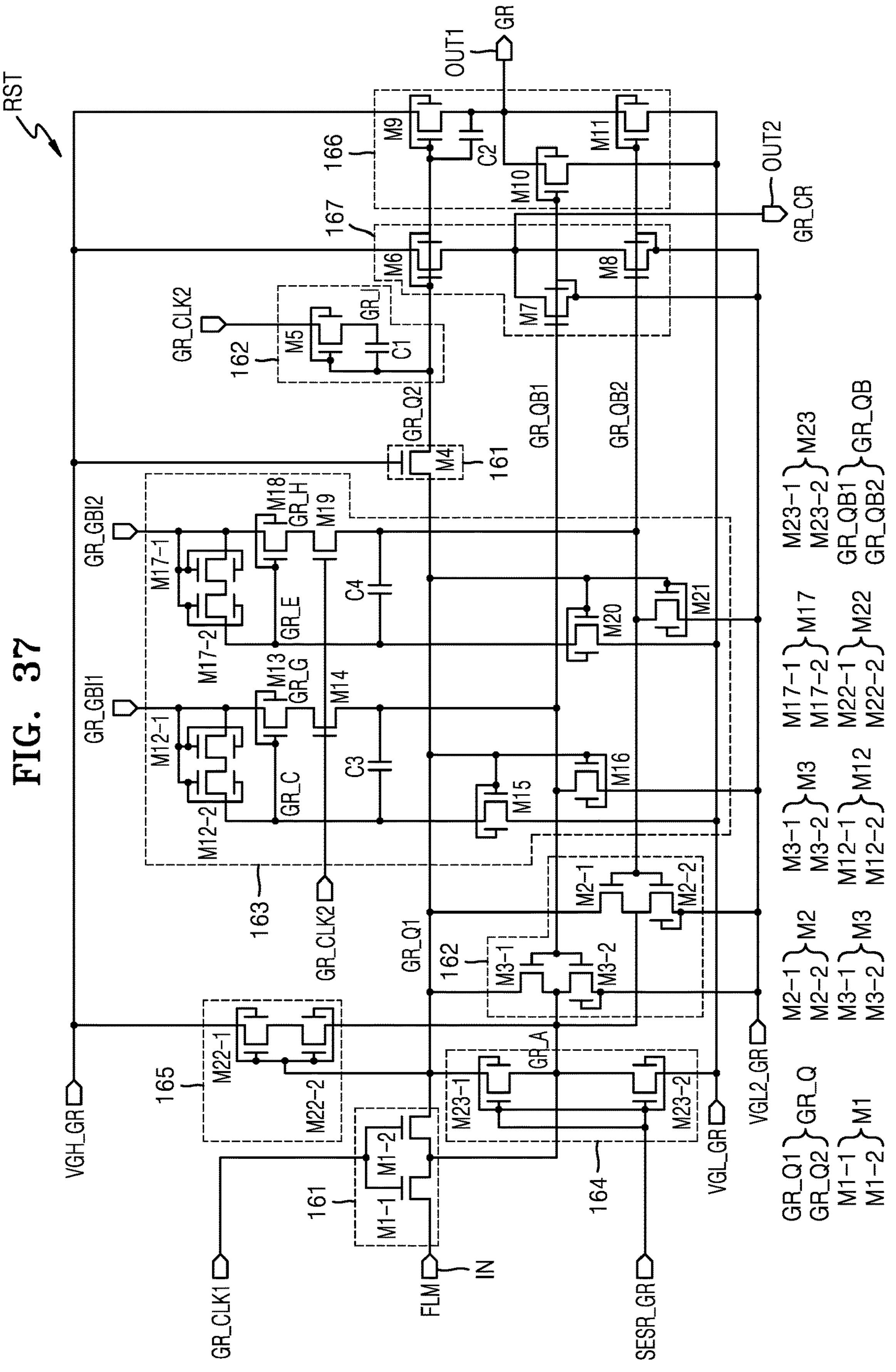
FIG. 37 illustrates an example of an arbitrary stage of a third driving circuit, according to an embodiment.

FIG. 37 illustrates an example of an arbitrary stage RST of a third driving circuit, according to an embodiment.

Referring to FIG. 37, a plurality of transistors included in the stage RST of the third driving circuit may be N-type thin-film transistors. The n-type thin-film transistors may be oxide thin-film transistors. The stage RST may include an input circuit 161, a first control circuit 162, a second control circuit 163, a reset circuit 164, a stabilization circuit 165, a first output circuit 166, and a second output circuit 167.

The input circuit 161 may be configured to transmit the start signal (e.g., the initial signal FLM or carry signal) applied to the input terminal IN to a first control node GR_Q according to a first clock signal GR_CLK1. The first control node GR_Q may include a (1-1)th control node GR_Q1 and a (1-2)th control node GR_Q2. The input circuit 161 may include the first transistor M1 and the fourth transistor M4.

The first transistor M1 may include the (1-1)th transistor M1-1 and the (1-2)th transistor M1-2, which are connected to each other in series between the input terminal IN and the (1-1)th control node GR_Q1. The gates of the (1-1)th transistor M1-1 and (1-2)th transistor M1-2 may be connected to the first clock terminal to which the first clock signal GR_CLK1 is input. When the first clock signal GR_CLK1 of the first level (high level) is applied, the first transistor M1 is turned on and the (1-1)th control node GR_Q1 may be set (charged) to the voltage of the start signal.

The fourth transistor M4 may be connected between the (1-1)th control node GR_Q1 and the (1-2)th control node GR_Q2, and the gate thereof may be connected to the first voltage terminal. The fourth transistor M4 may conduct the (1-1)th control node GR_Q1 and the (1-2)th control node GR_Q2 to control the voltage level of the (1-2)th control node GR_Q2 to be the voltage level of the (1-1)th control node GR_Q1. The fourth transistor M4 may be always turned on by a first voltage VGH_GR to prevent a line voltage drop between the (1-1)th control node GR_Q1 and the (1-2)th control node GR_Q2.

The reset circuit 164 may include a 23*rd* transistor M23. The 23*rd* transistor M23 may include a (23-1)th transistor M23-1 and a (23-2)th transistor M23-2, which are connected to each other in series between the (1-1)th control node GR_Q1 and the second voltage terminal to which a second voltage VGL_GR of the second level (low level) is input. Gates of the (23-1)th transistor M23-1 and (23-2)th transistor M23-2 may be connected to the reset terminal to which a reset voltage SESR_GR is input. The 23*rd* transistor M23 may be turned on by the reset voltage SESR_GR of the first level while the gate driving circuit is not driven, and configured to reset a voltage of the (1-1)th control node GR_Q1 to the first level. The reset voltage SESR_GR may be supplied in the second level while the gate driving circuit is driven.

The stabilization circuit 165 may include a 22*nd* transistor M22. The 22*nd* transistor M22 may include a (22-1)th transistor M22-1 and a (22-2)th transistor M22-2, which are connected to each other in series between a node GR_A and the first voltage terminal to which the first voltage VGH_GR of the first level is input. Gates of the (22-1)th transistor M22-1 and (22-2)th transistor M22-2 may be connected to the (1-1)th control node GR_Q1. The 22*nd* transistor M22 may be turned on when the voltage of the (1-1)th control node GR_Q1 is in the first level to maintain voltages of intermediate nodes of the (2-1)th transistor M2-1 and (2-2)th transistor M2-2, intermediate nodes of the (3-1)th transistor M3-1 and (3-2)th transistor M3-2, and intermediate nodes of the (1-1)th transistor M1-1 and (1-2)th transistor M1-2, which are connected to the node GR_A, to the first level, thereby preventing a voltage drop caused by a current leakage of the first control node GR_Q when the first control node GR_Q is in a floating state.

The first output circuit 166 may be configured to output the third gate signal GR to the third gate line GRL of a corresponding row and/or the second gate line GIL of another row. The first output circuit 166 may include the ninth transistor M9, the tenth transistor M10, and the eleventh transistor M11, which are connected between the first voltage terminal and the second voltage terminal. The first output circuit 166 may further include the second capacitor C2. A second control node GR_QB may include a (2-1)th control node GR_QB1 and the (2-2)th control node GR_QB2.

The ninth transistor M9 (pull-up transistor) may be connected between the first voltage terminal and the first output terminal OUT1, and the gate thereof may be connected to the (1-2)th control node GR_Q2. The second capacitor C2 may be connected between the (1-2)th control node GR_Q2 and the first output terminal OUT1.

The ninth transistor M9 may be turned on when the voltage of the (1-2)th control node GR_Q2 is in the first level, and configured to output the first voltage VGH_GR as the third gate signal GR through the first output terminal OUT1.

The tenth transistor M10 (pull-down transistor) may be connected between the first output terminal OUT1 and the second voltage terminal, and the gate thereof may be connected to the (2-1)th control node GR_QB1. The tenth transistor M10 may be turned on when the voltage of the (2-1)th control node GR_QB1 is in the first level, and configured to output the second voltage VGL_GR as the third gate signal GR through the first output terminal OUT1.

The eleventh transistor M11 (pull-down transistor) may be connected between the first output terminal OUT1 and the second voltage terminal, and the gate thereof may be connected to the (2-2)th control node GR_QB2. The eleventh transistor M11 may be turned on when the voltage of the (2-2)th control node GR_QB2 is in the first level, and configured to output the second voltage VGL_GR as the third gate signal GR through the first output terminal OUT1.

The second output circuit 167 may be configured to output a carry signal GR_CR to the input terminal IN of the next stage. The second output circuit 167 may include the sixth transistor M6, the seventh transistor M7, and the eighth transistor M8, which are connected between the first voltage terminal and the third voltage terminal.

The sixth transistor M6 (pull-up transistor) may be connected between the first voltage terminal and the second output terminal OUT2, and the gate thereof may be connected to the (1-2)th control node GR_Q2. The sixth transistor M6 may be turned on when the voltage of the (1-2)th control node GR_Q2 is in the first level, and configured to output the first voltage VGH_GR as the carry signal GR_CR through the second output terminal OUT2.

The seventh transistor M7 (pull-down transistor) may be connected between the second output terminal OUT2 and the second voltage terminal, and the gate thereof may be connected to the (2-1)th control node GR_QB1. The seventh transistor M7 may be turned on when a voltage of the (2-1)th control node GR_QB1 is in the first level, and configured to output a third voltage VGL3_GR as the carry signal GR_CR through the second output terminal OUT2.

The eighth transistor M8 (pull-down transistor) may be connected between the second output terminal OUT2 and the third voltage terminal, and the gate thereof may be connected to the (2-2)th control node GR_QB2. The eighth transistor M8 may be turned on when a voltage of the (2-2)th control node GR_QB2 is in the first level, and configured to output a third voltage VGL2_GR as the carry signal GR_CR through the second output terminal OUT2.

The first control circuit 162 may control a voltage of the first control node GR_Q according to a second clock signal GR_CLK2 and a voltage of the second control node GR_QB. The first control circuit 162 may include the second transistor M2, the third transistor M3, the fifth transistor M5, and the first capacitor C1.

The second transistor M2 may include the (2-1)th transistor M2-1 and the (2-2)th transistor M2-2, which are connected between the (1-1)th control node GR_Q1 and the third voltage terminal. The gates of the (2-1)th transistor M2-1 and (2-2)th transistor M2-2 may be connected to the (2-2)th control node GR_QB2. The (2-1)th transistor M2-1 and (2-2)th transistor M2-2 may be turned on when the (2-2)th control node GR_QB2 is in the first level to maintain the voltage of the (1-1)th control node GR_Q1 to the second level.

The third transistor M3 may include the (3-1)th transistor M3-1 and the (3-2)th transistor M3-2, which are connected between the (1-1)th control node GR_Q1 and the third voltage terminal. The gates of the (3-1)th transistor M3-1 and (3-2)th transistor M3-2 may be connected to the (2-1)th control node GR_QB1. The (3-1)th transistor M3-1 and (3-2)th transistor M3-2 may be turned on when the (2-1)th control node GR_QB1 is in the first level to maintain the voltage of the (1-1)th control node GR_Q1 to the second level.

The fifth transistor M5 may be connected between the (1-2)th control node GR_Q2 and the second clock terminal to which the second clock signal GR_CLK2 is input, and the gate thereof may be connected to the (1-2)th control node GR_Q2. The first capacitor C1 may be connected between the (1-2)th control node GR_Q2 and a node GR_I. The fifth transistor M5 may be turned on when the (1-2)th control node GR_Q2 is in the first level and configured to transmit the second clock signal GR_CLK2 to one end of the first capacitor C1. When the second clock signal GR_CLK2 is in the first level, the voltage of the (1-2)th control node GR_Q2 may be boosted to be greater than the first voltage VGH_GR by the first capacitor C1 and the turned-on fifth transistor M5.

The second control circuit 163 may reverse the voltage level of the first control node GR_Q according to the second voltage VGL_GR, the third voltage VGL2_GR, a fourth voltage GR_GB11, and a fifth voltage GR_GB12, and supply the same to the second control node GR_QB, thereby controlling the voltage of the second control node GR_QB.

The second control circuit 163 may include the twelfth transistor M12, the thirteenth transistor M13, the fourteenth transistor M14, the fifteenth transistor M15, the sixteenth transistor M16, the seventeenth transistor M17, the eighteenth transistor M18, the nineteenth transistor M19, the twentieth transistor M20, the 21*st* transistor M21, the third capacitor C3, and the fourth capacitor C4.

The twelfth transistor M12 may include a (12-1)th transistor M12-1 and a (12-2)th transistor M12-2, which are connected to each other in series between a node GR_C and the fourth voltage terminal to which the fourth voltage GR_GB11 is input. Gates of the (12-1)th transistor M12-1 and (12-2)th transistor M12-2 may be connected to the fourth voltage terminal. The thirteenth transistor M13 may be connected between the fourth voltage terminal and a node GR_G, and the gate thereof may be connected to the node GR_C. The fourteenth transistor M14 may be connected between the node GR_G and the (2-1)th control node GR_QB1, and the gate thereof may be connected to the second clock terminal. The fifteenth transistor M15 may be connected between the node GR_C and the second voltage terminal, and the gate thereof may be connected to the (1-1)th control node GR_Q1. The sixteenth transistor M16 may be connected between the (2-1)th control node GR_QB1 and the third voltage terminal, and the gate thereof may be connected to the (1-1)th control node GR_Q1.

The seventeenth transistor M17 may include the (17-1)th transistor M17-1 and the (17-2)th transistor M17-2, which are connected to each other in series between a node GR_E and the fifth voltage terminal to which the fifth voltage GR_GB12 is input. The gates of the (17-1)th transistor M17-1 and (17-2)th transistor M17-2 may be connected to the fifth voltage terminal. The eighteenth transistor M18 may be connected between the fifth voltage terminal and a node GR_H, and the gate thereof may be connected to the node GR_E. The nineteenth transistor M19 may be connected between the node GR_H and the (2-2)th control node GR_QB2, and the gate thereof may be connected to the second clock terminal. The twentieth transistor M20 may be connected between the node GR_E and the second voltage terminal, and the gate thereof may be connected to the (1-1)th control node GR_Q1. The 21*st* transistor M21 may be connected between the (2-2)th control node GR_QB2 and the third voltage terminal, and the gate thereof may be connected to the (1-1)th control node GR_Q1.

The third capacitor C3 may be connected between the (2-1)th control node GR_QB1 and the node GR_C. The fourth capacitor C4 may be connected between the (2-2)th control node GR_QB2 and the node GR_E. When the voltages of the (2-1)th control node GR_QB1 and (2-2)th control node GR_QB2 are switched from the first level to the second level by the third capacitor C3 and fourth capacitor C4, the thirteenth transistor M13 and the eighteenth transistor M18 may be quickly turned off.

The fourth voltage GR_GB11 and the fifth voltage GR_GB12 may be supplied in voltages of the first level or the second level by alternating in frame units. When the fourth voltage GR_GB11 is in the first level and the fifth voltage GR_GB12 is in the second level, the voltage of the (2-1)th control node GR_QB1 may be in the first level and the voltage of the (2-2)th control node GR_QB2 may be in the second level. When the fifth voltage GR_GB12 is in the first level and the fourth voltage GR_GB11 is in the second level, the voltage of the (2-2)th control node GR_QB2 may be in the first level and the voltage of the (2-1)th control node GR_QB1 may be in the second level.

The tenth transistor M10 and the eleventh transistor M11, and the seventh transistor M7 and the eighth transistor M8 may be turned on while alternating in frame units according to the fourth voltage GR_GB11 and the fifth voltage GR_GB12. Accordingly, changes in threshold voltages of the tenth transistor M10 and the eleventh transistor M11, and the seventh transistor M7 and the eighth transistor M8 may be reduced or prevented.

In FIGS. 35 to 37, gates of some transistors of each stage may be a dual-gate transistor including a pair of a first gate and a second gate. According to an embodiment, the first gate may be a top gate provided on a semiconductor and the second gate may be a bottom gate provided below the semiconductor. The dual-gate transistor may be turned on or off according to a voltage level of a signal input to the first gate. Among the dual-gate transistors, some transistors may receive a voltage of the same polarity for the first gate and the second gate, and some transistors may receive voltages of different polarities for the first gate and the second gate. In an embodiment, for example, the first gate and second gate of some transistors may be connected to the same node (or terminal), and the first gate and second gate of some transistors may be connected to different nodes (or terminals).

Figure 38:
FIG. 38 is a cross-sectional view of a structure of a display element, according to an embodiment.

FIG. 38 is a cross-sectional view of a structure of a display element, according to an embodiment. FIGS. 39A to 41 are cross-sectional views of a structure of a display element, according to embodiments.

Referring to FIG. 38, the organic light-emitting diode OLED, as the display element according to an embodiment, may include a pixel electrode 211, an opposing electrode 215, and an intermediate layer 213 between the pixel electrode 211 (first electrode or anode) and the opposing electrode 215 (second electrode or cathode).

In an embodiment, the pixel electrode 211 may include a transparent conducting oxide, such as indium tin oxide ("ITO"), indium zinc oxide ("IZO"), zinc oxide (ZnO), indium oxide ($In_2O_3$), indium gallium oxide ("IGO"), or aluminum zinc oxide ("AZO"). The pixel electrode 211 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound thereof. In an embodiment, for example, the pixel electrode 211 may have a three-layer structure of ITO/Ag/ITO.

The opposing electrode 215 may be disposed on the intermediate layer 213. The opposing electrode 215 may include a metal having a low work function, an alloy, an electric conductive compound, or an arbitrary combination thereof. In an embodiment, for example, the opposing electrode 215 may include lithium (Li), Ag, Mg, Al, Al—Li, calcium (Ca), Mg—In, Mg—Ag, ytterbium (Yb), Ag—Yb, ITO, IZO, or an arbitrary combination thereof. The opposing electrode 215 may be a transparent electrode, a semi-transparent electrode, or a reflective electrode.

The intermediate layer 213 may include a high-molecular weight organic material or low-molecular weight organic material, which emit light of a certain color. The intermediate layer 213 may further include, in addition to various organic materials, a metal-containing compound, such as an organic metal compound, and an inorganic material, such as a quantum dot.

According to an embodiment, the intermediate layer 213 may include one emission layer, and a first functional layer and a second functional layer below and on the emission layer, respectively. The first functional layer may include, for example, a hole transport layer ("HTL") or may include an HTL and a hole injection layer ("HIL"). The second functional layer may include an electron transport layer ("ETL") and/or an electron injection layer ("EIL"). The first functional layer or the second functional layer may be omitted. The first functional layer and second functional layer may be integrally formed to correspond to the plurality of organic light-emitting diodes OLED included in the display area DA.

According to an embodiment, the intermediate layer 213 may include two or more emitting units sequentially stacked between the pixel electrode 211 and the opposing electrode 215, and a charge generation layer provided between the two emitting units. When the intermediate layer 213 includes the emitting unit and the charge generation layer, the organic light-emitting diode OLED may be a tandem light-emitting element. The organic light-emitting diode OLED may have a stack structure of a plurality of emitting units, and thus have improved color purity and light-emitting efficiency.

One emitting unit may include the emission layer, and the first functional layer and the second functional layer below and on the emission layer, respectively. The charge generation layer may include a negative charge generation layer and a positive charge generation layer. The light-emitting efficiency of the organic light-emitting diode OLED that is the tandem light-emitting element including the plurality of emission layers may be further increased by the negative charge generation layer and the positive charge generation layer.

The negative charge generation layer may be an n-type charge generation layer. The negative charge generation layer may supply electrons. The negative charge generation layer may include a host and a dopant. The host may include an organic material. The dopant may include a metal material. The positive charge generation layer may be a p-type charge generation layer. The positive charge generation layer may supply holes. The positive charge generation layer may include a host and a dopant. The host may include an organic material. The dopant may include a metal material.

Figure 39A:
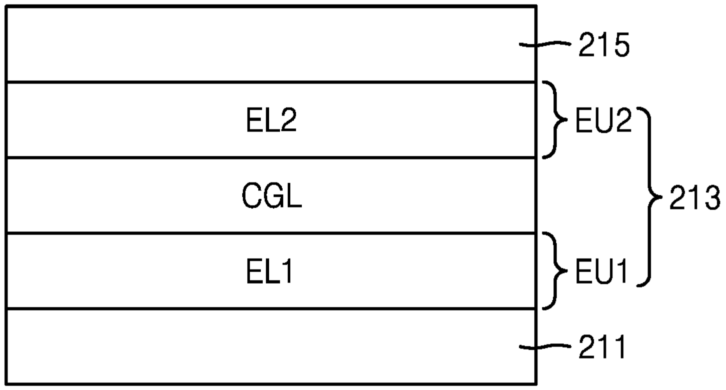
FIGS. 39A to 41 are cross-sectional views of a structure of a display element, according to embodiments.

According to an embodiment, as shown in FIG. 39A, the organic light-emitting diode OLED may include a first emitting unit EU1 including a first emission layer EL1 and a second emitting unit EU2 including a second emission layer EL2, which are sequentially stacked. A charge generation layer CGL may be provided between the first emitting unit EU1 and the second emitting unit EU2. In an embodiment, for example, the organic light-emitting diode OLED may include the pixel electrode 211, the first emission layer EL1, the charge generation layer CGL, the second emission layer EL2, and the opposing electrode 215, which are sequentially stacked in the stated order. The first functional layer and the second functional layer may be provided below and on the first emission layer EL1, respectively. The first functional layer and the second functional layer may be provided below and on the second emission layer EL2, respectively. The first emission layer EL1 may be a blue emission layer and the second emission layer EL2 may be a yellow emission layer.

Figure 39B:
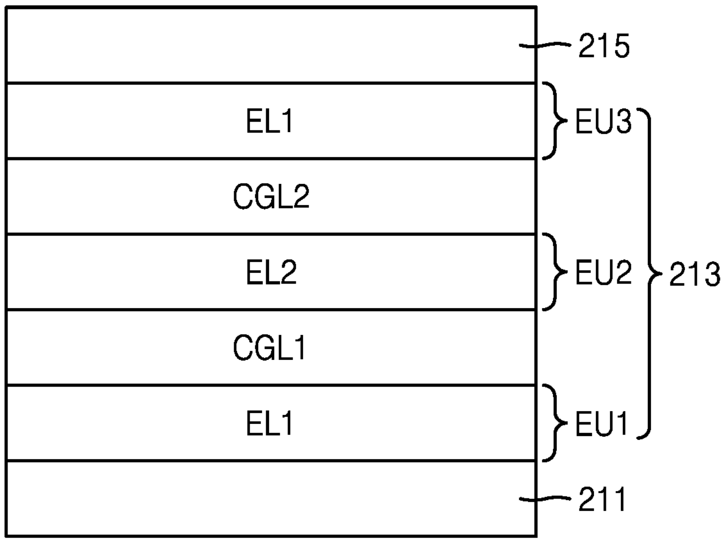

According to an embodiment, as shown in FIG. 39B, the organic light-emitting diode OLED may include the first emitting unit EU1 and a third emitting unit EU3, which include the first emission layer EL1, and the second emitting unit EU2 including the second emission layer EL2. A first charge generation layer CGL1 may be provided between the first emitting unit EU1 and the second emitting unit EU2, and a second charge generation layer CGL2 may be provided between the second emitting unit EU2 and the third emitting unit EU3. In an embodiment, for example, the organic light-emitting diode OLED may include the pixel electrode 211, the first emission layer EL1, the first charge generation layer CGL1, the second emission layer EL2, the second charge generation layer CGL2, the first emission layer EL1, and the opposing electrode 215, which are stacked in the stated order. The first functional layer and the second functional layer may be provided below and on the first emission layer EL1, respectively. The first functional layer and the second functional layer may be provided below and on the second emission layer EL2, respectively. The first emission layer EL1 may be a blue emission layer and the second emission layer EL2 may be a yellow emission layer.

According to an embodiment, in the organic light-emitting diode OLED, the second emitting unit EU2 may further include, in addition to the second emission layer EL2, a third emission layer EL3 and/or a fourth emission layer EL4, which is in direct contact with a bottom and/or a top of the second emission layer EL2. Here, the direct contact may indicate that another layer is not arranged between the second emission layer EL2 and the third emission layer EL3 and/or between the second emission layer EL2 and the fourth emission layer EL4. The third emission layer EL3 may be a red emission layer and the fourth emission layer EL4 may be a green emission layer.

Figure 39C:
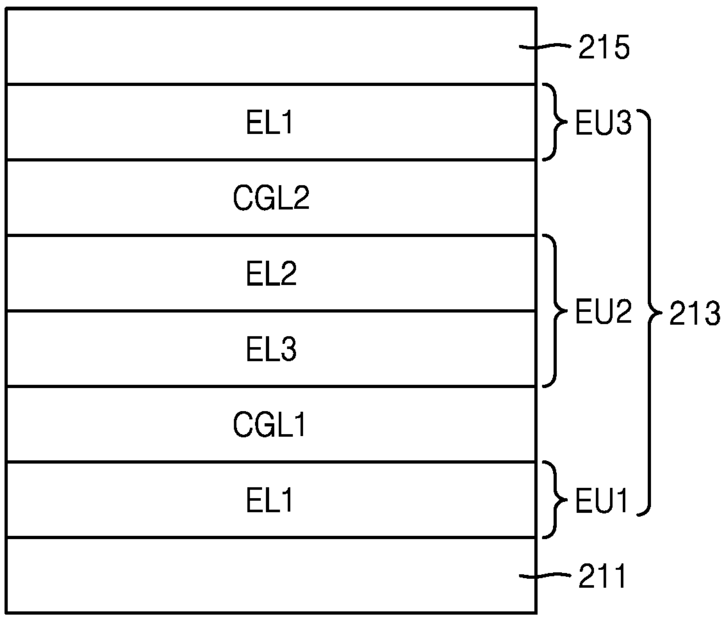

In an embodiment, for example, as shown in FIG. 39C, the organic light-emitting diode OLED may include the pixel electrode 211, the first emission layer EL1, the first charge generation layer CGL1, the third emission layer EL3, the second emission layer EL2, the second charge generation layer CGL2, the first emission layer EL1, and the opposing electrode 215, which are sequentially stacked in the stated order. Alternatively, as shown in FIG. 39D, the organic light-emitting diode OLED may include the pixel electrode 211, the first emission layer EL1, the first charge generation layer CGL1, the third emission layer EL3, the second emission layer EL2, the fourth emission layer EL4, the second charge generation layer CGL2, the first emission layer EL1, and the opposing electrode 215, which are sequentially stacked in the stated order.

Figure 39D:
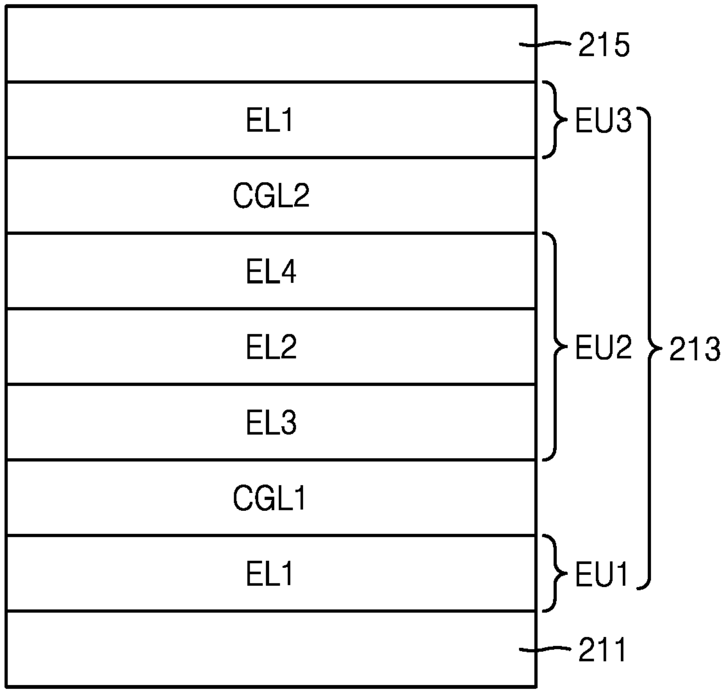
Figure 40A:
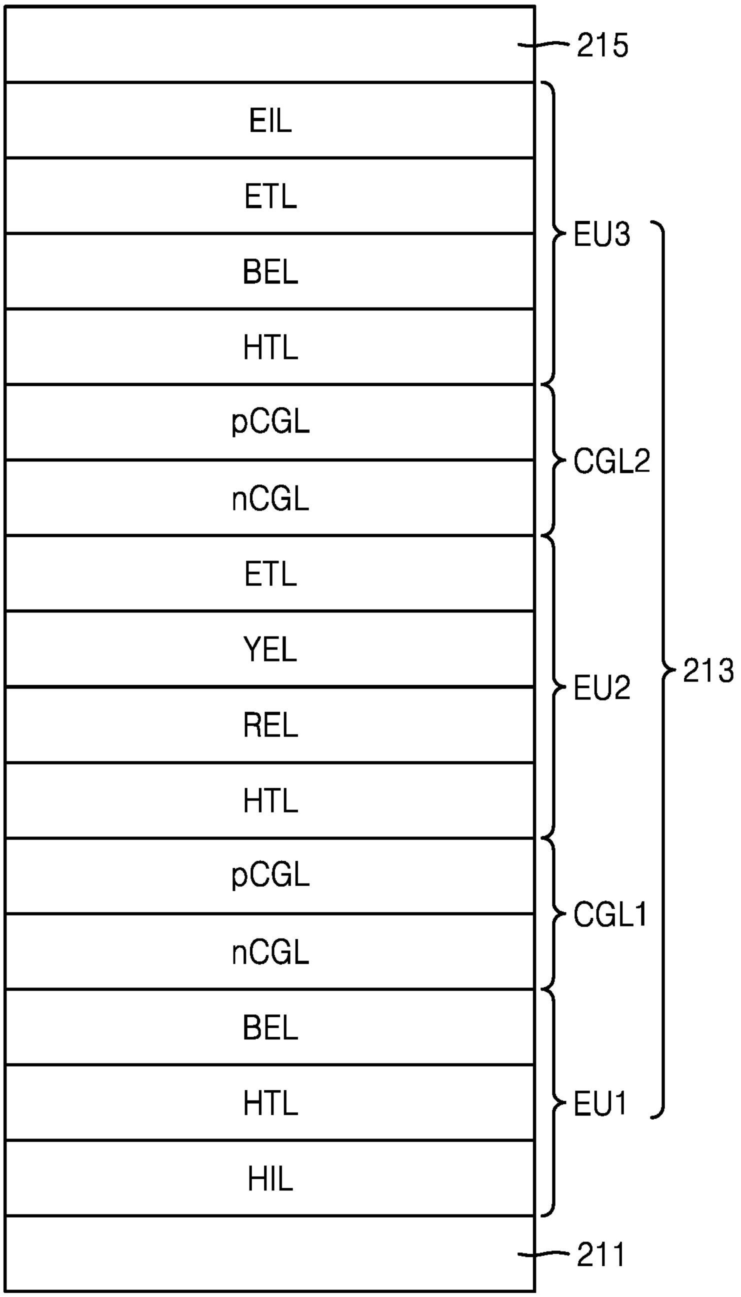
Figure 40B:
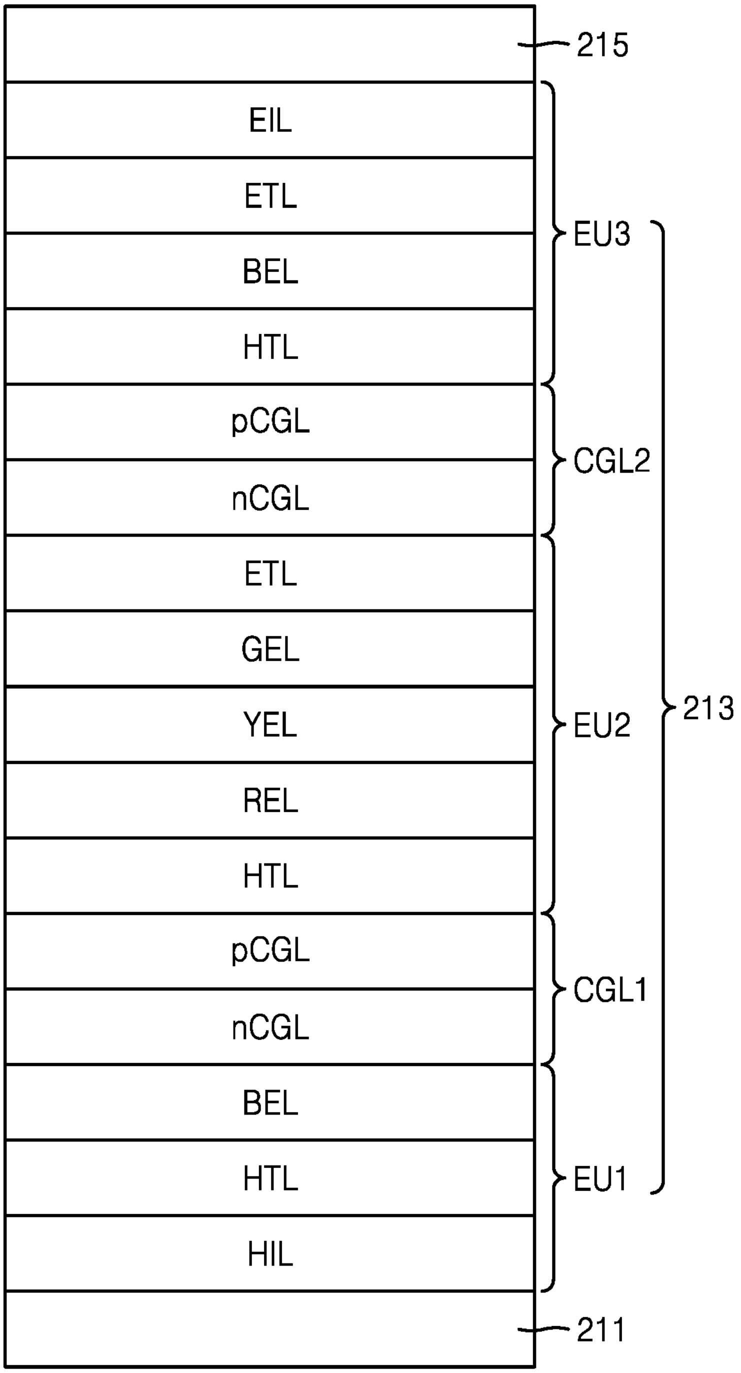

FIG. 40A is a cross-sectional view showing an example of the organic light-emitting diode OLED of FIG. 39C, and FIG. 40B is a cross-sectional view showing an example of the organic light-emitting diode OLED of FIG. 39D.

Referring to FIG. 40A, the organic light-emitting diode OLED may include the first emitting unit EU1, the second emitting unit EU2, and the third emitting unit EU3, which are sequentially stacked in the stated order. The first charge generation layer CGL1 may be provided between the first emitting unit EU1 and the second emitting unit EU2, and the second charge generation layer CGL2 may be provided between the second emitting unit EU2 and the third emitting unit EU3. The first charge generation layer CGL1 and the second charge generation layer CGL2 may each include a negative charge generation layer nCGL and a positive charge generation layer pCGL.

The first emitting unit EU1 may include a blue emission layer BML. The first emitting unit EU1 may further include a hole injection layer HIL and a hole transport layer HTL between the pixel electrode 211 and the blue emission layer BML. According to an embodiment, a p-doping layer further included between the hole injection layer HIL and the hole transport layer HTL. The p-doping layer may be formed by doping the hole injection layer HIL with a p-type doping material. According to an embodiment, at least one of a blue light auxiliary layer, an electron blocking layer, and a buffer layer may be further provided between the blue emission layer BML and the hole transport layer HTL. The blue light auxiliary layer may enhance light-emitting efficiency of the blue emission layer BML. The blue light auxiliary layer may enhance the light-emitting efficiency of the blue emission layer BML by adjusting a hole charge balance. The electron blocking layer may prevent electron injection to the hole transport layer HTL. The buffer layer may compensate for a resonance distance according to a wavelength of light emitted from an emission layer.

The second emitting unit EU2 may include a yellow emission layer YML and a red emission layer RML in direct contact with the yellow emission layer YML below the yellow emission layer YML. The second emitting unit EU2 may further include the hole transport layer HTL between the positive charge generation layer pCGL of the first charge generation layer CGL1 and the red emission layer RML, and an electron transport layer ETL between the yellow emission layer YML and the negative charge generation layer nCGL of the second charge generation layer CGL2.

The third emitting unit EU3 may include the blue emission layer BML. The third emitting unit EU3 may further include the hole transport layer HTL between the positive charge generation layer pCGL of the second charge generation layer CGL2 and the blue emission layer BML. The third emitting unit EU3 may further include the electron transport layer ETL and an electron injection layer EIL between the blue emission layer BML and the opposing electrode 215. The electron transport layer ETL may be a single layer or a multilayer. According to an embodiment, at least one of the blue light auxiliary layer, the electron blocking layer, and the buffer layer may be further provided between the blue emission layer BML and the hole transport layer HTL. At least one of a hole blocking layer and the buffer layer may be further provided between the blue emission layer BML and the electron transport layer ETL. The hole blocking layer may prevent hole injection to the electron transport layer ETL.

The organic light-emitting diode OLED shown in FIG. 40B has the same configuration as the organic light-emitting diode OLED shown in FIG. 40A, except for a stack structure of the second emitting unit EU2. Referring to FIG. 40B, the second emitting unit EU2 may include the yellow emission layer YML, the red emission layer RML in direct contact with the yellow emission layer YML below the yellow emission layer YML, and a green emission layer GML in direct contact with the yellow emission layer YML on the yellow emission layer YEML. The second emitting unit EU2 may further include the hole transport layer HTL between the positive charge generation layer pCGL of the first charge generation layer CGL1 and the red emission layer RML, and the electron transport layer ETL between the green emission layer GML and the negative charge generation layer nCGL of the second charge generation layer CGL2.

Figure 41:
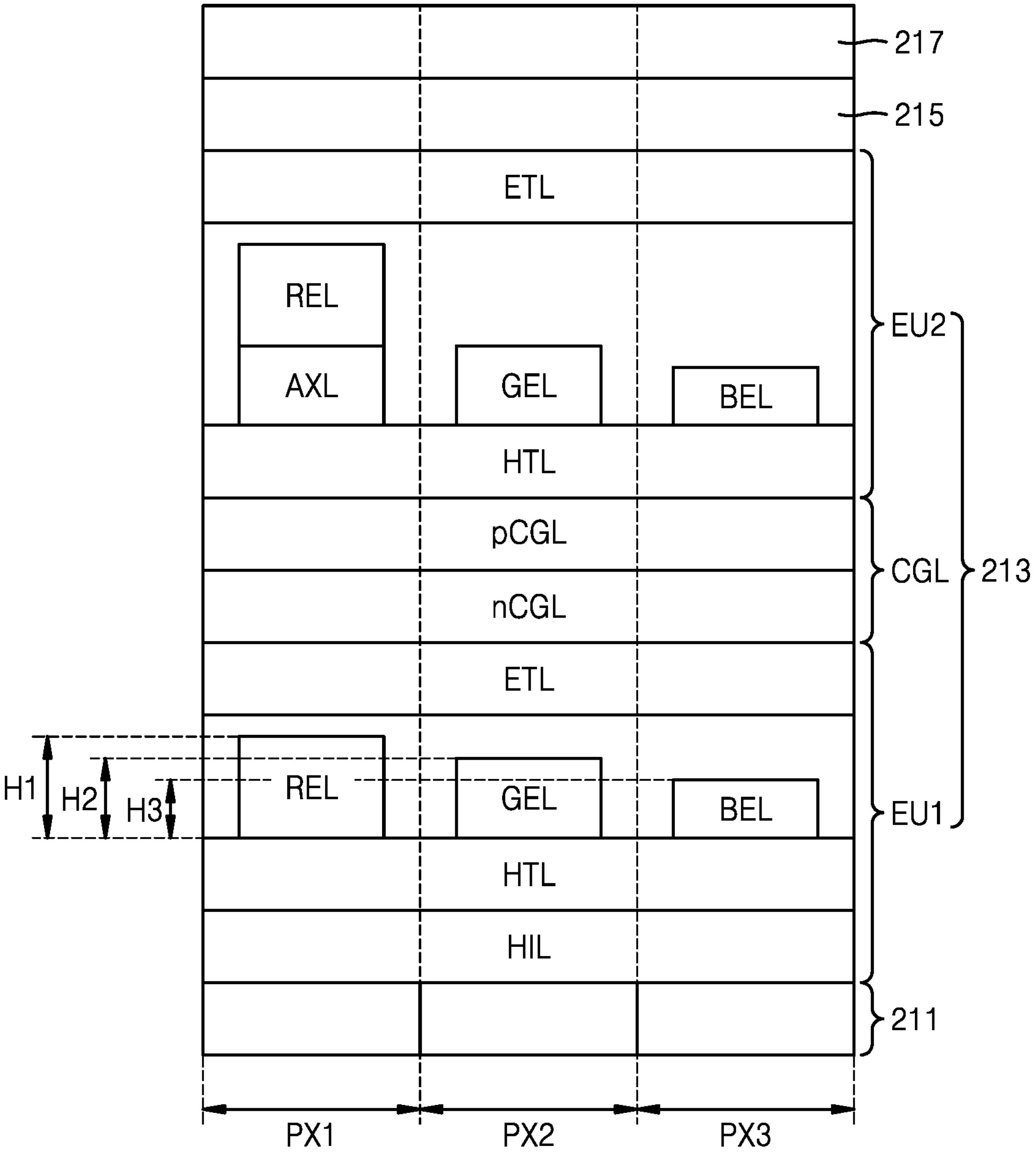

FIG. 41 is a cross-sectional view of a structure of a pixel of a display device, according to an embodiment.

Referring to FIG. 41, the display device may include a plurality of pixels. The plurality of pixels may include the first pixel PX1, the second pixel PX2, and the third pixel PX3. The first pixel PX1, the second pixel PX2, and the third pixel PX3 may each include the pixel electrode 211, the opposing electrode 215, and the intermediate layer 213. According to an embodiment, the first pixel PX1 may be a red pixel, the second pixel PX2 may be a green pixel, and the third pixel PX3 may be a blue pixel. Here, the pixel may include the organic light-emitting diode OLED as a display element, and the organic light-emitting diode OLED of each pixel may be connected (e.g., electrically connected) to a pixel circuit.

The pixel electrode 211 may be provided independently to each of the first pixel PX1, the second pixel PX2, and the third pixel PX3.

The intermediate layer 213 of the organic light-emitting diode OLED of each of the first pixel PX1, the second pixel PX2, and the third pixel PX3 may include the first emitting unit EU1 and the second emitting unit EU2, which are sequentially stacked, and the charge generation layer CGL between the first emitting unit EU1 and the second emitting unit EU2. The charge generation layer CGL may include the negative charge generation layer nCGL and the positive charge generation layer pCGL. The charge generation layer CGL may be a common layer formed consecutively on the first pixel PX1, the second pixel PX2, and the third pixel PX3.

The first emitting unit EU1 of the first pixel PX1 may include the hole injection layer HIL, the hole transport layer HTL, the red emission layer RML, and the electron transport layer ETL, which are sequentially stacked in the stated order, on the pixel electrode 211.

The first emitting unit EU1 of the second pixel PX2 may include the hole injection layer HIL, the hole transport layer HTL, the green emission layer GML, and the electron transport layer ETL, which are sequentially stacked in the stated order, on the pixel electrode 211. The first emitting unit EU1 of the third pixel PX3 may include the hole injection layer HIL, the hole transport layer HTL, the blue emission layer BML, and the electron transport layer ETL, which are sequentially stacked in the stated order, on the pixel electrode 211. Each of the hole injection layers HIL, the hole transport layers HTL, and the electron transport layers ETL of the first emitting units EU1 may be a common layer consecutively formed on the first pixel PX1, the second pixel PX2, and the third pixel PX3.

The second emitting unit EU2 of the first pixel PX1 may include the hole transport layer HTL, an auxiliary layer AXL, the red emission layer RML, and the electron transport layer ETL, which are sequentially stacked in the stated order, on the charge generation layer CGL. The second emitting unit EU2 of the second pixel PX2 may include the hole transport layer HTL, the green emission layer GML, and the electron transport layer ETL, which are sequentially stacked in the stated order, on the charge generation layer CGL. The second emitting unit EU2 of the third pixel PX3 may include the hole transport layer HTL, the blue emission layer BML, and the electron transport layer ETL, which are sequentially stacked in the stated order, on the charge generation layer CGL. Each of the hole transport layers HTL and the electron transport layers ETL of the second emitting units EU2 may be a common layer consecutively formed on the first pixel PX1, the second pixel PX2, and the third pixel PX3. According to an embodiment, at least one of the hole blocking layer and the buffer layer may be further provided between an emission layer and the electron transport layer ETL, in the second emitting units EU2 of the first pixel PX1, the second pixel PX2, and the third pixel PX3.

A thickness H1 of the red emission layer RML, a thickness H2 of the green emission layer GML, and a thickness H3 of the blue emission layer BEML may be determined according to a resonance distance. The auxiliary layer AXL is a layer added to adjust the resonance distance, and may include a resonance auxiliary material. In an embodiment, for example, the auxiliary layer AXL may include the same material as the hole transport layer HTL.

In FIG. 41, the auxiliary layer AXL is provided only in the first pixel PX1, but an embodiment of the disclosure is not limited thereto. For another example, the auxiliary layer AXL may be provided in at least one of the first pixel PX1, the second pixel PX2, and the third pixel PX3, so as to adjust the resonance distance of each of the first pixel PX1, the second pixel PX2, and the third pixel PX3.

The display device may further include a capping layer 217 provided outside the opposing electrode 215. The capping layer 217 may enhance light-emitting efficiency according to the principle of constructive interference. Accordingly, light-extracting efficiency of the organic light-emitting diode OLED may be increased, and thus light-emitting efficiency of the organic light-emitting diode OLED may be enhanced.

One or more embodiments of the disclosure may provide a display device, in which a dead space is minimized and power consumption is reduced. Effects of the disclosure are not limited to the above, and may be variously expanded to the extent that they do not deviate from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel comprising:
a light-emitting diode;
a first transistor;
a second transistor connected to a gate of the first transistor and to a data line;
a third transistor connected to the gate of the first transistor and to a first voltage line;
a fourth transistor connected to the first transistor and to a second voltage line;
a fifth transistor connected to the first transistor and to a third voltage line; and
a sixth transistor connected to the first transistor and to the light-emitting diode,
wherein a gate signal supplied to a gate of the sixth transistor is a signal obtained by shifting a gate signal supplied to a gate of the fifth transistor by a certain time.

2. The pixel of claim 1, wherein a gate signal supplied to a gate of the fourth transistor is a signal obtained by shifting a gate signal supplied to a gate of the third transistor by a certain time.

3. The pixel of claim 1, further comprising a seventh transistor connected to the first transistor and to the third voltage line,
wherein a gate signal supplied to a gate of the third transistor and a gate signal supplied to a gate of the seventh transistor are the same.

4. The pixel of claim 3, wherein a gate signal supplied to a gate of the fourth transistor is a signal obtained by shifting the gate signal supplied to the gate of the third transistor by a certain time.

5. The pixel of claim 3, wherein a gate signal supplied to a gate of the fourth transistor is a signal obtained by shifting a gate signal supplied to a gate of the second transistor by a certain time.

6. The pixel of claim 3, further comprising an eighth transistor connected to the first transistor and to a fourth voltage line,
wherein a gate signal supplied to a gate of the fourth transistor and a gate signal supplied to a gate of the eighth transistor are the same.

7. A pixel comprising:
a light-emitting diode;
a first transistor;
a second transistor connected to a gate of the first transistor and to a data line;

a third transistor connected to the gate of the first transistor and to a first voltage line;

a fourth transistor connected to the first transistor and to a second voltage line;

a fifth transistor connected to the first transistor and to a third voltage line;

a sixth transistor connected to the first transistor and to the light-emitting diode;

a seventh transistor connected to the first transistor and to the third voltage line; and an eighth transistor connected to the first transistor and to a fourth voltage line, wherein a gate signal supplied to a gate of the fifth transistor and a gate signal supplied to a gate of the sixth transistor are the same, and a gate signal supplied to a gate of the fourth transistor and a gate signal supplied to a gate of the eighth transistor are the same.

8. A gate driving circuit for outputting gate signals to a plurality of pixels connected to a first gate line, a second gate line, a third gate line, a fourth gate line, and a fifth gate line, the gate driving circuit comprising:

a first driving circuit configured to output a first gate signal sequentially to the first gate line in a first row and to the first gate line in a second row immediately adjacent to the first row;

a second driving circuit configured to output a fourth gate signal simultaneously to the fourth gate line in the first row and to the fourth gate line in the second row; and a third driving circuit configured to output a third gate signal simultaneously to the third gate line in the first row and to the third gate line in the second row, wherein the fourth gate signal output by the second driving circuit is supplied to the fifth gate line in a third row, the first gate signal output by the first driving circuit or the third gate signal output by the third driving circuit is supplied to the second gate line in a fourth row, and the third row and the fourth row are rows spaced apart from the first row by two or more rows.

9. The gate driving circuit of claim 8, wherein the third row is a row preceding the first row by two or more rows, the second driving circuit includes a plurality of second stages and a plurality of second dummy stages, and the plurality of second dummy stages are located behind a last second stage from among the plurality of second stages.

10. The gate driving circuit of claim 8, wherein, when the first gate signal output by the first driving circuit is supplied to the second gate line in the fourth row, the fourth row is a row succeeding the first row by two or more rows, the first driving circuit includes a plurality of first stages and a plurality of first dummy stages, and the plurality of first dummy stages are located in front of a forefront first stage from among the plurality of first stages.

11. The gate driving circuit of claim 8, wherein, when the third gate signal output by the third driving circuit is supplied to the second gate line in the fourth row, the fourth row is a row succeeding the first row by two or more rows, the third driving circuit includes a plurality of third stages and a plurality of third dummy stages, and the plurality of third dummy stages are located in front of a forefront third stage from among the plurality of third stages.

12. The gate driving circuit of claim 8, further comprising a first gate driving circuit and a second gate driving circuit, which face each other with a pixel unit, in which the plurality of pixels are arranged, therebetween, wherein the first gate driving circuit and the second gate driving circuit each comprise the first driving circuit, the second driving circuit, and the third driving circuit.

13. The gate driving circuit of claim 8, wherein thin-film transistors included in the gate driving circuit are formed simultaneously with thin-film transistors of a pixel circuit configured to drive the plurality of pixels, through a same process.

14. The gate driving circuit of claim 8, wherein thin-film transistors included in the gate driving circuit are N-channel oxide thin-film transistors.

15. A gate driving circuit for outputting gate signals to a plurality of pixels connected to a first gate line, a second gate line, a third gate line, a fourth gate line, and a fifth gate line, the gate driving circuit comprising:

a first driving circuit configured to output a first gate signal sequentially to the first gate line in a first row and to the first gate line in a second row immediately adjacent to the first row;

a second driving circuit configured to output a fourth gate signal simultaneously to the fourth gate line in the first row and to the fourth gate line in the second row;

a third driving circuit configured to output a third gate signal simultaneously to the third gate line in the first row and to the third gate line in the second row; and a fourth driving circuit configured to output the second gate signal simultaneously to the second gate line in the first row and to the second gate line in the second row, wherein the fourth gate signal output by the second driving circuit is supplied to the fifth gate line in the first row or the fifth gate line in a third row.

16. The gate driving circuit of claim 15, wherein, when the fourth gate signal output by the second driving circuit is supplied to the fifth gate line in the third row, the third row is a row preceding the first row by two or more rows, the second driving circuit includes a plurality of stages and a plurality of dummy stages, and the plurality of dummy stages are located behind a last stage from among the plurality of stages.

17. The gate driving circuit of claim 15, wherein, when the fourth gate signal output by the second driving circuit is supplied to the fifth gate line in the first row, the fourth gate signal is simultaneously supplied to the fifth gate line in the second row.

18. The gate driving circuit of claim 15, further comprising a first gate driving circuit and a second gate driving circuit, which face each other with a pixel unit, in which the plurality of pixels are arranged, therebetween, wherein the first gate driving circuit comprises the first driving circuit, the second driving circuit, and the third driving circuit, and the second gate driving circuit comprises the first driving circuit, the third driving circuit, and the fourth driving circuit.

19. The gate driving circuit of claim 15, wherein thin-film transistors included in the gate driving circuit are formed simultaneously with thin-film transistors of a pixel circuit configured to drive the plurality of pixels, through a same process.

20. The gate driving circuit of claim 15, wherein thin-film transistors included in the gate driving circuit are N-channel oxide thin-film transistors.

* * * * *